United States Patent [19]
Ball

[11] Patent Number: 5,109,185
[45] Date of Patent: Apr. 28, 1992

[54] PHASE-CONTROLLED REVERSIBLE POWER CONVERTER PRESENTING A CONTROLLABLE COUNTER EMF TO A SOURCE OF AN IMPRESSED VOLTAGE

[76] Inventor: Newton E. Ball, 1356 Knoxville St., San Diego, Calif. 92110

[21] Appl. No.: 414,691

[22] Filed: Sep. 29, 1989

[51] Int. Cl.⁵ .............................................. G05F 1/70
[52] U.S. Cl. .................................... 323/207; 307/45; 323/247; 330/10; 363/163
[58] Field of Search ................... 330/10; 323/207, 247; 363/8, 10, 163; 318/729, 763; 307/44–45, 66; 388/928.1

[56] References Cited

U.S. PATENT DOCUMENTS

| | | | |
|---|---|---|---|
| 3,517,300 | 6/1970 | McMurray | 363/25 |
| 3,742,336 | 6/1973 | Bedford . | |
| 3,896,366 | 7/1975 | Onogi | 363/90 |
| 3,959,719 | 5/1976 | Espelage . | |
| 3,959,720 | 5/1976 | Bose et al. . | |
| 3,982,167 | 9/1976 | Espelage . | |
| 4,479,175 | 10/1984 | Gille et al. | 363/41 |
| 4,719,550 | 1/1988 | Powell | 363/37 |
| 4,772,994 | 9/1988 | Harada et al. | 363/8 |

*Primary Examiner*—William H. Beha, Jr.
*Attorney, Agent, or Firm*—William C. Fuess

[57] ABSTRACT

A universal phase-controlled reversible power converter having one transformer with multiple windings (i) couples a fixed d.c. voltage to an associated transformer winding through a fixed port having switches controlled for switching by fixed-phase signals, and (ii) couples any number of voltages having any waveform(s) whatsoever each to an associated transformer winding each through an associated variable port that has a filter with an inductor and controllable switches. Variable-phase switching control signals control the variable ports to produce any desired three-state demodulated waveform. A three-state demodulated waveform is filtered to present (i) a corresponding counter emf of any desired waveform to an input source or power, or (ii) any desired output waveform to a sink of power. Controllably producing the counter emf as a picture-of-the-line-input-voltage makes the load factor of the power converter, and all its loads, unity. Controllably producing the counter emf to either lead or lag an input power waveform gives the power converter a correspondingly controllable power factor, and permits it to serve as a power factor corrector. Controllably producing the counter emf as a pure sinusoid causes the power converter to reduce distortion on an a.c. power grid to which it is connected.

22 Claims, 16 Drawing Sheets

PHASE-CONTROLLED REVERSIBLE POWER CONVERTER PRESENTING A CONTROLLABLE COUNTER EMF TO A SOURCE OF AN IMPRESSED VOLTAGE

REFERENCE TO RELATED PATENT APPLICATIONS

The present patent application is related to U.S. patent application Ser. No. 415,101 now U.S. Pat. No. 5,029,064, to the same inventor, entitled PHASE-CONTROLLED REVERSIBLE POWER CONVERSION WITH EQUAL DUTY CYCLE SUBSTANTIALLY CONSTANT AMPLITUDE SQUARE WAVE EXCITATION OF THE POWER TRANSFORMER. The related patent, the contents of which are incorporated herein by reference, particularly discloses that power conversion and power converter circuits, including power conversion and power converter circuits that are in accordance with the present invention, can employ (i) an equal duty cycle substantially constant amplitude square wave excitation within the power transformer simultaneously that (ii) a controllable counter electromotive force (emf) is presented to the impressed voltage of a source of power.

BACKGROUND OF THE INVENTION

1. Field Of The Invention

The present invention relates to power converters (i) using solid state devices to switch currents at high frequency and (ii) functioning as virtual transformers of electrical potentials. The present invention particularly concerns transistorized phase-controlled reversible power converters that present a controllable counter electromotive force (emf) to a source of electrical power that is connected to such power converters.

1.1 General State Of The Art In power Conversion

Modern switching power supplies may be classified in three types. For the past twenty years the dominant power supply design has been based on pulse-width modulation (PWM). In pulse width modulation the amount of time that an input voltage potential is connected to a power transformer is varied in order to keep the output voltage of a power supply constant over varying operating conditions.

Recently, resonant-mode power supplies have come into commercial production. In a resonant-mode power supply energy stored in an inductor is transferred to a capacitor and back again at a rate that is determined by the relative impedance of the components. In a resonant-mode power supply, energy does not pass directly in pulse waveforms to the transformer, as in the pulse-width modulated type. Instead, the incoming current and voltage are stored alternately in an inductor, and in a capacitor, that shape them into sinusoidal waveforms that drive the power transformer. The quasi-resonant supply is the most common type of resonant-mode power supply. In this type of resonant-mode power supply a power switch controls the repetition of the resonant cycles, making the transfer of energy discontinuous.

Therefore both the pulse-width modulated and the resonant-mode power supply regulate the time that a power switch is on and off in order to keep the output voltage constant. The difference between the two types of supplies is that a resonant-mode power supply regulates the output voltage by varying the frequency of the on-off switching, whereas a pulse-width-modulated power supply varies the duty cycle of the on-off switching. Generally feedback control loops are used to detect when adjustments in the output voltage are necessary, and a switching controller is used to carry out the required changes to switching control.

A third, relatively uncommercialized, type of power conversion is called phase-controlled high-frequency power conversion. In phase-controlled power converters the phase of the switching waveforms—which waveforms are simultaneously applied to pairs of switches on each of the primary and secondary sides of a power isolation transformer—are varied in order to control the conversion between the input and output voltage potentials. Power conversion/power converters in accordance with this principle are sometimes called "four quadrant power conversion/converters". The present and related inventions will be seen to preferably be embodied in phase-controlled power converters, and to substantially overcome certain problems that have previously plagued this technology.

Pioneering work on phase-controlled power conversion is attributed to William McMurray of General Electric Company. McMurray's invention is, for example, the subject of seminal United States patent Ser. No. 3,517,300 for POWER CONVERTER CIRCUITS HAVING A HIGH FREQUENCY LINK. McMurray's 1970 patent shows several single phase solid state power converter circuits each having a single high frequency transformer link. Each of the transformer's two windings are connected respectively to (i) a load, and (ii) a d.c., or low frequency a.c., power source, through an associated inverter configuration switching circuit. Each switching circuit employs inverse-parallel pairs of controlled turn-off switches, such as transistors or gate turn-off silicon controlled rectifiers (SCR's). Filter means are connected across the input and output terminals of the power converter circuits. (In the present invention, a filter including an inductor is commonly used with a switching circuit that is variable in its coupling. The combination of the switching circuit and its filter including the inductor is called a "variable port" A switching circuit alone, without a filter or inductor, is called a "fixed port". It is used to directly connect a transformer winding to the terminals of the port under fixed phase switching control, or drive.)

By synchronously rendering conductive one switching device in each of the primary and secondary circuits of the transformer, and by alternately rendering conductive another device in each switching circuit, McMurray's power converters function to couple an input voltage potential to a high frequency waveform, transform the high frequency waveform, and reconstruct from the high frequency waveform a voltage potential at the output terminals. This reconstruction of a relatively low frequency s.a.c. or a d.c. waveform from a relatively higher frequency waveform within the transformer is called "rectification", or "demodulation". A wide range of output voltage control is possible by phase shifting the turn-on of the switching devices on one side of the converter's transformer with respect to the turn-on of the switching devices on the other side. The converter may effect current limiting, current interruption, current regulation, and voltage regulation.

The McMurray power conversion/power converter invention has been the subject of continuing interest because of, among other reasons, (i) its extreme flexibility in converting electrical power potentials having diverse voltage waveforms, and (ii) its efficient use of solid state switching components (transistors or SCR's).

Unfortunately, McMurray's original circuit suffers from efficiency and reliability problems due to high current or high voltage surges that may occur during commutation. This problem is discussed in detail in section 1.5, following. As of 1989, this problem is still being addressed. For example, reference the article PHASE-CONTROLLED D.C.-A.C. CONVERTER WITH HIGH FREQUENCY SWITCHING by Harada, et al. appearing in *IEEE Transactions on Power Electronics* for October, 1988 at pages 406–411.

In the Harada, et al. article the switching-induced voltage surge during commutation is stated to be reduced by virtue of dividing the filter reactance into two parts. This division, which requires extra components, is directed to preventing an unwanted occurrence of currents at bipolar switch pairs performing waveform rectification resultantly from the recovery times of isolation diodes.

The present invention will be seen not to employ isolation diodes to perform rectification. The present invention will be seen to instead perform rectification of (i) a high frequency waveform that is within the windings of the power converter's transformer into (ii) a d.c., or low frequency a.c., waveform of an electric potential applied to, or produced by, the power converter, solely by switching in transistors, and totally without diodes. Accordingly, there are no unwanted currents at the switches due to rectification. (There may be overcurrents at the switches for other reasons, as explained in section 1.4, following. However, the switches of power converters in accordance with the present invention will be seen to connect directly through filters to external sources of voltage potential—an extremely rare form of power converter connection—and not to connect through diodes in order to perform rectification.)

Furthermore, the Harada, et al. converter employs a center-tap connection to the isolation power transformer. This form of transformer connection means that, at most, the transformer utilization efficiency will be limited to 50%—i.e., at any one time one-half of the center-tapped transformer winding carries no current. Even when connection to a transformer winding is across the entire winding by a switching circuit in a bridge configuration, the transformer will not be utilized to its maximum efficiency unless it constantly carrier the maximum voltage excitation waveform of which the transformer is capable. A sinusoidal excitation waveform within a transformer gives, by definition, less than 100% utilization efficiency of the transformer because the waveform is not always at its maximum voltage.

The present invention will be seen to strongly prefer connecting switching circuits in a full bridge configuration across an entire transformer winding, and to constantly excite the transformer with maximum voltage. Power converters in accordance with the present invention will therefore be seen to enjoy a transformer utilization efficiency of 100%.

Even though the individual switching control signals applied to the individual switches (transistors or SCR's) of the switching circuits of McMurray and Harada, et al. may be constant amplitude square waves—and thus admirably suitable to be transformer coupled to the switches—these switching control signals produce, in aggregate, a high frequency a.c. waveform within the power transformer that is not optimal. This a.c. waveform is not optimal because it is undesirably both (i) carries an amplitude modulation that reflects the low frequency of the port voltage, and therefore, by its modulation influences all conversions at other ports and is (ii) customized to a particular type, and to the associated particular voltage waveforms, of the particular power conversion that is being performed. An amplitude-modulated high frequency a.c. waveform within the power transformer carrying the low frequency of a port's voltage is not independent of that port, and thus precludes multiple independent port control. The high frequency amplitude-modulated a.c. waveform within the power transformer is (ii) customized to a particular conversion. It will, by definition, be inapplicable to other conversions, and will prevent such additional conversions from being performed simultaneously, and in parallel, by use of a single power transformer. Power converters in accordance with the present invention will be seen to produce a transformer excitation that is independent of any port's time-varying voltage. Accordingly, these power converters will be seen to support multiple ports, and multiple port control, that is impossible in prior art phase-controlled power conversion/converters.

The present and related inventions will be seen to contemplate power conversion from sources of input power—particularly including alternating current power—with (i) no low frequency component in the transformer excitation waveform, and (ii) a substantially constant amplitude transformer excitation waveform that is universally suitable for diverse power conversions. The excitation waveform will also be of an equal duty cycle, which makes along with the substantially constant amplitude that the excitation waveform is a square wave. It will be seen that use of such an excitation waveform within the transformer is the antithesis of customization, and that diverse useful power conversions can be performed simultaneously and concurrently using but a single power transformer if the transformer excitation waveform is an equal duty cycle substantially constant amplitude square wave.

The present and related inventions will also be seen to (i) substantially overcome previous commutation problems, (ii) much enlarge the scope of application, and (iii) improve the efficiency of phase-controlled power conversion. The aggregate result of these improvements will be sufficient so as to warrant comparison of phase-controlled power conversion in accordance with the present and related inventions with the best power conversion efficiency and densities previously obtainable. Accordingly, the following two sections respectively further discuss (i) density, and (ii) efficiency, aspects of previous power conversion in order that the quantitative performance of the present invention, as later explained, may be more clearly appreciated.

1.2 Size And Density Of Previous Power Conversion Circuits

The present and related inventions will be seen to more significantly improve to the efficiency of power conversion—the state of the art relative to which is discussed in the following section—than minimize the size, and increase the density, of power conversion circuits. Nonetheless, the current state of the art in power supply size, and density, is discussed in this section because the size and density of power converters in accordance with the present invention will be seen to rival the best existing performance in this area. Moreover, power converters in accordance with the present invention have great potential to improve, with advances in semiconductor (as opposed to magnetic) component technology, beyond their current sizes and densities.

There is a present need to simplify the design and construction of low voltage electronic power supplies. Presently-available power supplies often exceed the remaining volume of the systems powered; a rule of thumb is for the power supply's volume not to exceed 25% of the volume of the system. In order to come down in size and so increase power density, it was previously perceived that any type of power supply must operate at frequencies approaching 1 MHz so that very small transformers and output filters may be used. The higher the switching frequency, the smaller the transformer core need be—but the larger the switching losses. In pulse-width modulated power supplies both high voltages and currents coexist during turn-on and turn-off of the power switches, resulting in high switching losses.

The higher the switching frequency, the more a power supply's ripple and transient response are improved. If switching frequency is increased while the components of an output signal filter are kept constant, then the power supply's ripple will be much smaller. Conversely, if the components of the output signal filter are made smaller, then the bandwidth of the feedback control loop, which senses the power supply's output and which signals the controller to make any necessary changes, can be widened dramatically in order to improve the transient response while still providing low ripple and adequate stability.

Resonant-mode power supplies are the current leaders in size, packaging, density and efficiency (this latter factor being more extensively discussed in the following section). Typical prototype resonant-mode power supplies have power densities of 35 watts per cubic inch (573 watts per cubic centimeter). The most advanced resonant-mode power supplies have densities exceeding 50 W/in$^3$. In contrast, the typical density of an advanced pulse-width modulated supply is about 10W/in.$^3$. Even if pulse-width modulated supplies could go higher in frequency, switching losses would bring their efficiency down to about 60 percent at 1 MHz. Because of their minimal switching losses, resonant-mode supplies operate with more than 80 percent efficiency above 1 MHz.

Up to about 2 kw maximum output, phase-controlled power converters (a general term including input-to-output power supplies in accordance with the present invention) will be seen to have competitive power densities, and efficiencies of up to 95%. Appreciation of exactly how power converters in accordance with the present invention achieve these levels, however, requires a more detailed understanding of previous power supplies than the simplistic association of switching frequency with power supply size and density. In particular, and recalling that the size of the magnetic components within an electronic power supply is related to the oscillator frequency, it will later be disclosed that power converters in accordance with the present invention commonly operate at a switching frequency of approximately 80 kHz (although this rate will probably be extended to the region of 120 kHz within five years). At first impression, this rate seems slow relative even to pulse-width modulated power supplies, which regularly operate at frequencies up to 100 kHz, as well as to resonant-mode power supplies which have operated, in experimental form, at frequencies as high as 10 MHz.

In order to understand how power conversion in accordance with the present invention will be seen to use magnetic components of about the same size, and in approximately the same density, as existing PWM and resonant-mode power supplies, a detail knowledge of several factors other than frequency of operation affecting the size of magnetic components in power supplies is required. First, power conversion in accordance with the present invention will be seen to extend to kilowatt (kw) and higher power levels. PWM power supplies operating at this power level typically operate with a switching frequency in the order of 20 kHz-30 kHz. Therefore, for its power level, power conversion in accordance with the present and related inventions at kw power levels is at a somewhat improved frequency over what is typical in the previous art.

Second, power conversion/power converters in accordance with the present invention will be seen to couple (convert from and to) voltage potentials having an a.c. component through the use of three-state demodulated waveforms. These waveforms may be rectified to produce high-quality a.c. waveforms in filter components that are of reduced size compared to filter components used to rectify the two-state waveforms that are commonly produced by PWM and resonant-mode power supplies. Three-state-demodulated signals generally contain only one-half the harmonic power density of two-state demodulated signals commonly produced in the prior art. Accordingly, the size of the filter components, particularly including inductors, that are required to filter these signals is significantly reduced by ratios up to one half.

Third, power conversions/power converters in accordance with the present invention will be seen to make maximally efficient 100% utilization of a high frequency power transformer. Because this optimal 100% utilization figure cannot be improved upon, a power converter in accordance with the present and related inventions will be seen to derive as much efficiency from its primary magnetic component—the high-frequency power transformer link—as is absolutely possible. Previous power supplies of both the PWM, resonant mode, and phase-modulated types make only such utilization efficiency of the power transformer as the excitation waveform(s) therein approach (i) an equal (50%) duty cycle and (ii) a constant, maximum, amplitude. In other words, only square wave excitation is optimal. Non-pulse, sinusoidal, transformer waveforms do not represent an optimal utilization of the transformer. A pulsed, or pulse-width-modulated, waveform is efficient only to the extent that it is balanced. For example, A PWM waveform that spends 75% in one state and 25% in the other state is balanced only to the extent of 25%, and uses the transformer with 25% utilization efficiency. Resonant mode power supplies that are purposely inactive for energy transfer through the transformer during portions of a cycle make inefficient utilization of the transformer. Finally, even a phase modulated power supply will be less than 50% efficient in utilization of an entire transformer if its switches are connected to its transformer in a center-tap configuration where, at any one time, one-half of each transformer winding carries no current.

Fourth, the size of the magnetic components can be traded off for efficiency of operation in power conversions/power converters in accordance with the present and related inventions. Generally it is neither advisable, nor required, to trade off efficiency in order to minimize the size/maximize the density of power conversion/power converters. However, power conversions/power converters in accordance with the present and related inventions will be seen to exhibit marked improvement in efficiency over power supplies of the prior art. Accordingly, if the 95% efficiency of power conversions/power converters in accordance with the present and related inventions is reduced to the maximum efficiency levels—approximately 70–80%—of the prior art, then the size and power density of the power converters is generally superior to such prior art—especially at kilowatt power output levels.

1.3 Efficiency of Power Conversion

Efficiency in previous power conversion is related to the design of the power switch. A zero-voltage switch turns on and off only when the voltage waveform is at zero, and a zero-current switch turns on and off only when the current waveform is at zero. Either type of switch greatly reduces the switching losses in a power supply.

In pulse-width modulated (PWM) power supplies high voltages and currents both exist during turn-on and turn-off of the power switches, resulting in high switching losses.

Resonant-mode power supplies attempt to overcome this problem. The first resonant-mode power supply design to be developed, which is used in most of the resonant-mode power supplies now in production, is a zero-current switching topology. In this configuration energy is transferred only when the power switch is on, so that frequency of switching increases with the load. In order to increase the energy transfer, the power switch must be turned on more frequently. If a full-cycle switch is used, then tank energy storage and recycling may, however, serve to greatly reduce the frequency change. Parasitic junction capacity in the switches causes some switching losses when the power switch turns on, and also requires a high gate current. This generally restricts the operation of zero-current switching topology resonant-mode power supplies to about 1 MHz.

Experimental zero-voltage switching topologies for resonant-mode power supplies are also known. In this topology the frequency of switching decreases as the load increases to a minimum that is specified in the power supply design. This occurs because an increase in the load causes the power switch, instead of being turned on more often as in the zero-current switch topology, to be turned on less often for longer periods of time. The maximum switching frequency, which may be high as 20 MHz, occurs at the minimum load. A major difficulty when zero-voltage switching topology resonant-mode power supplies is the very large voltage stresses that occur in the power supply components.

The two approaches to resonant-mode power supply design—zero-current or zero-voltage switching topologies—give the best currently known efficiencies of power conversion. These efficiencies are on the order of 70%–80% depending upon power levels, voltages, currents, and components.

The present invention will be seen to reject the strategy of switching at zero-current or at zero voltage. In this regard, power converters in accordance with the present invention will be seen to switch non-zero current, non-zero voltage, electrical potentials—similarly to switching occurring at a PWM power supply. At first impression this seems a dubious approach to realizing high efficiency through low switching losses. However, the present invention will be seen to minimize losses occurring during switching by the strategy of making switching occur extremely fast, on the order of nanoseconds. Because the amount of energy lost during switching is a function of the rapidity of such switching, ultra high speed switching produces switching losses that are lower than those commonly encountered in either the prior art PWM and resonant-mode power supplies even though the electric potentials switched are non-zero current, non-zero voltage.

The efficiency of power conversion/power converters in accordance with the present invention will be seen to be on the order of 95%, which is considerably higher than the best obtainable—even by certain experimental quasi-resonant resonant-mode power supplies—in the prior art.

1.4 Limitations Of Prior Art At A Single Phase Line Interface

Among the most serious limitations of prior PWM and resonant power supplies is that such power supplies have no good way to interface with a single phase AC line as a source of power. PWM and resonant-mode power supplies require a DC source. Accordingly, the line voltage is almost universally (i) diode bridge-rectified and (ii) filtered by a capacitor filter. The power factor (the ratio of apparent power to real power) presented to the line is low, typically 0.6, because all of the current is drawn at the tips of the voltage waveform. Use of power supplies having less than unity power factor is so prevalent in military applications such as shipboard applications, or in buildings housing extensive numbers of small computers, that the line voltage itself is severely distorted near the waveform peaks. Power conversion in accordance with the present and related inventions will be seen to totally and directly solve this problem by presenting a perfect, unitary, power factor to a single phase a.c. line interface.

Most previous power supply circuits draw current from a single phase a.c. line in large surges at the voltage peak of each half cycle. This current charges a holding capacitor(s) to a voltage nearly equal to the peak voltage of the input line voltage. The stored voltage dissipates a small amount into the load between peaks. These large current surges are undesirable for several reasons.

First, the resulting product of RMS amperes and RMS volts (VA) is considerably larger than the power actually consumed by the power supply circuit and its associated loads. This difference is defined as the power factor, which equals the total power consumption divided by the VA's. In accordance with the present and related inventions, the power factor of a power converter is normally controlled to be nearly unity. Thus the needed RMS current required to deliver equal power is reduced considerably. The exact reduction is inversely proportional to the power factor, e.g. 10 amps with a power factor of 0.6 produces the same power as 6 amps with a power factor of unity.

Second, the large current surges typical of previous power supply technology also tend to cause distortion of the input line voltage. More specifically, the current surges tend to flatten the peaks of the input power voltage waveform. This flattening not only tends to reduce the peak voltage to the particular power supply device causing the peak reducing current surges, but to all other power supplies on the same circuit. Since most previous power supplies depend on the peak voltage for normal operation, the effect of a reduced peak voltage is the same as reducing the line voltage.

Third, the large surge currents are destructive to electrolytic capacitors. The life expectancy of those capacitors is a function of the internal power dissipation and time. Higher peak currents cause a proportionally high RMS current in the holding capacitors.

Fourth, the high RMS current typical of previous power supplies makes meaningful fusing difficult in that the designed fault current must be a multiple of the normal operating current, e.g. 1.25 times operating current.

With a unity power factor power converters (power supplies) designs delivering higher power can be operated from the same outlet or circuit. Power converters in accordance with the present and related inventions not only permit control of the power factor under normal operating conditions, but will be seen to also usefully control inrush current when initially energized.

1.5 Broadband and Narrowband Conducted and Radiated Noise

Existing PWM, resonant mode, phase-modulated and other "switching" power supplies are notoriously noisy. The high frequency switching, based on a clock oscillator, creates both broadband and narrowband conducted and radiated noise. Because the conversion of a.c. power by switching has previously required that the duration, frequency, and/or phase angle of the switching control waveforms should be related to the waveform of the input a.c. power that is converted, the necessary relationship has been referenced relative to an oscillator clock for which the frequency is fixed. This fixed clock frequency, and the switching control signals and actual switching derived therefrom and timed relative thereto, produce sharp peaks in a plot of conducted and/or radiated electromagnetic noise versus frequency. These peaks are the "signature" of the power supply. They are especially undesirable in military applications where they contribute to the electromagnetic signature, and to the potential location and/or identification, of a platform such as a plane or ship upon which the switching power supply is located.

Power converters in accordance with the present invention will be seen to perform switching at high frequencies that radiate well. However, it will also be seen that the switching is extremely fast, on the order of nanoseconds, and produces only modest noise energy transients. Therefore the radiative energy is modest. Moreover, it will be seen that the frequency of a clock oscillator in the power converter of the present invention—from which power converter all switching waveforms of both fixed and variable phase are derived—is completely independent of the waveforms switched, and may actually be swept or even randomized in frequency. Randomizing the frequency of the fundamental clock oscillator from which all switching signals are derived randomizes the frequencies of the collective switching signals, and thereby essentially reduces both broadband and narrowband conducted and radiated noise in the band over which frequency noise is varied. When this band is many kHz in width, as will be seen to be the case for power converters in accordance with the present invention, then the noise emissions from such power converters will be very low and extremely difficult, or even impossible, to detect.

1.6 Previous Power Converter Circuits Having A High Frequency Link And Functioning As Virtual Transformers of Electrical Potentials Power converters, and power conversion, in accordance with the present and related inventions is related to the phase-controlled power converters/ conversion pioneered by McMurray. As previously mentioned in section 1.1, the power converters of McMurray, and their progeny, suffer greatly from destructive high current or high voltage surges occurring during commutation. It is useful to understand the detail nature of this problem in order that its solution by the present invention may be best appreciated.

It is known from McMurray to construct power converters by connecting form A switches in pairs and by controlling the switching of each form A switch by a signal that is the inverse of a signal controlling switching in the other switch of the pair—forming thereby a form C switch. Two form C switches are connected in a bridge circuit across one of a transformer's windings. Because of this connection, and because of the control of the form C switches, power converters after the model of McMurray have been subject to adverse high currents, or high voltage surges, during commutation. Adverse high current results if both form A switches are simultaneously conducting, even if but momentarily, presenting a short circuit to the transformer winding. Conversely, a high voltage surge results if both form A switches are simultaneously non-conducting, even if but momentarily. In this case a transient voltage spike is produced across at least one of the switches. If this voltage spike exceeds the rated voltage of the switch, and if it lasts sufficiently long so as to contain significant energy, then it can cause the switch to fail.

Power converter circuits in accordance with the present invention will be seen to use the remarkable property of Field Effect Transistors (FETs)—including Metal Oxide Semiconductor Field Effect Transistors (MOSFETs) and power MOSFETs—that they can be turned off as fast as they can be turned on. Power MOSFET switching times are typically tens of nanoseconds, and are very short in relation to the periods of both (i) those a.c. power waveforms which are typically converted (typically in the range of 2.5 to 16.6 msec), and also (ii) a higher frequency carrier waveform (typically a 80 KHz waveform of period 12.5 microseconds) that is commonly used in converter circuits in accordance with the present and related inventions.

It is further known in previous phase-controlled power converters after the model of McMurray to use FETs and MOSFETs as unipolar and bipolar bilateral form A switches, and to control these switches by switching control signals that are coupled to the gate of each FET or MOSFET through a switching signal transformer (which switching signal transformer is not the main transformer used for power conversion). It is still further known to connect two such form A switches together in series and to control each switch by a switching signal that is the inverse of the signal controlling the other switch. The two normal and inverse switching signals are coupled through a switching signal transformer, and create from the two form A switches a form C switch. The transformer coupling of the switching control signals is useful for isolation between switching control, and power, sections of a phase-controlled power converter. The FETs or MOSFETs are reliable, solid-state, devices. However, the mere (i) transformer coupling of switching control signals to some particular (ii) FET or MOSFET switch does not, in of itself, control the switching in the collective FET or MOSFET switches of the power converter so as to best eliminate or alleviate current shorts or voltage surges due to commutation.

SUMMARY OF THE INVENTION

The present invention contemplates improved switching control in a phase-controlled power converter having ports connected to external electrical potentials so that (i) one or more ports will present a controllable counter electromagnetic force (counter emf) to an associated external source of an impressed voltage and/or (ii) one or more ports will present an output voltage of controllable waveform to an associated external load.

In accordance with the present invention the counter emf, or the output voltage, at any of the several variable ports of a multi-ported phase-controlled power converter can be simultaneously controlled to be of any desired voltage waveform whatsoever. (Counter emf is defined as the emf generated by a running motor by virtue of its generator behavior, or by an inductive circuit element, such as the power converter of the present invention, through which current is increasing with time. The counter emf is sometimes called the back emf. The total emf in a circuit is defined as the impressed voltage (sometimes called the impressed emf) minus the counter emf. The current in a circuit is, by definition, the ratio of the net emf to the resistance in the circuit.) (A "variable port" includes (i) a filter, having at least one inductor connected to a pair of terminals in which appears an associated electrical potential, and (ii) a switching circuit, having controllable switches, connected between the filter and an associated winding of a multiple-winding power transformer. The "variable port" variably couples its associated electrical potential to a high frequency a.c. signal waveform in its associated transformer winding under control of variably-phase-shifted switching control signals.)

The counter emf can, for example, be controlled to be a picture of an input line impressed voltage of a source of power that is connected to the terminals of a variable port. In this case the power converter, and all the loads ported thereto whatsoever their complex impedances, will appear to the source of power as a purely resistive load. The power converter will exhibit a unitary load factor to the source of power. This is true regardless of whatsoever particular voltage waveform is impressed by the source of power, the distortion of this waveform, and any variations over time in this waveform and/or its distortion. According to this ability to adapt to any changes in the impressed voltage waveform, the capability of the power converter to appear purely resistive is dynamic, and is not altered by changes in (i) any of the frequency, phase, amplitude, distortion and/or d.c. component of the impressed voltage, or (ii) by the numbers, types, or impedance variations of any loads to which the power converter is connected.

The counter emf can, for example, be controlled to be a phase-shifted version of an impressed voltage waveform received from a source of power. A power converter so controlled becomes a power factor corrector to the source of power to which it is connected. It may, for example, substitute for a large capacitor to improve a lagging power factor of a power grid by presenting a leading load factor wherein current leads voltage to the power grid.

The counter emf can, for example, be controlled to be a pure sinusoid in fixed phase relationship with an input a.c. impressed voltage that is received from a source of power. If the input a.c. impressed voltage waveform is a noisy and distorted sinusoid—as is especially typical of the power grids in developing countries—then the power converter actually serves to reduce distortion on a power grid to which it is connected. The power converter will draw less power from the grid at the flattened tops of the impressed voltage a.c. waveform and will draw more power elsetimes.

At the same time that counter emf is controlled at "input" variable ports of a power converter connecting to sources of power the voltage can also be controlled at "output" variable ports of the power converter that connect to loads consuming power. The words "input" and "output" are set off in quotations because the operation of the power converter is completely reversible, meaning bi-directional. There is accordingly no fundamental distinction, nor immutable directionality, between "input" and "output" Similarly, there is no fundamental distinction between producing a controllable counter emf and a controllable output voltage. If the controllable counter emf is made larger than the impressed voltage at a particular port, then the power converter will supply, as opposed to receive, energy through that port.

For example, an "output" variable port of the power converter can be connected to a d.c. motor/ generator. The power converter can be controlled to present a counter emf to this motor/generator that exactly matches (or leads, or lags, or whatever is desired) the emf (the impressed voltage) of this motor generator. This controlled presentation of output voltage/counter emf transpires regardless of whether the motor/generator is consuming power as a motor or is supplying power as a generator.

The improved switching control for producing the controlled counter emf at the connections to the variable ports of a power converter circuit is developed in a switching control circuit producing switching control signals A, $\bar{A}$, B and $\bar{B}$ in a phase relationship that causes a variable port, when these signals are received by and used to control switching in the switches of the port, to produce in its terminals a three-state demodulated waveform. This three-state modulated waveform filters to the equivalent of a reference waveform, including in the shape and distortion thereof. This switching control circuit includes (i) a source of the reference waveform,
(ii) a carrier frequency waveform circuit for producing a carrier frequency waveform,
(iii) a first inverter for inverting one or the other of the reference waveform and the carrier frequency waveform,
(iv) a switch control signal B generation circuit for detecting (i) a first intersection of a one of the reference waveform and the carrier frequency waveform and the inverse of the other waveform, and (ii) a temporally next-occurring second intersection of the reference waveform and the carrier frequency waveform as a respective beginning and end of switch control signal B,
(v) a switch control signal A generation circuit for detecting (i) a third intersection, between the first intersection, of a one of the reference waveform and the carrier frequency waveform and the inverse of the other waveform, and (ii) a temporally second next-occurring fourth intersection of the reference waveform and the carrier frequency waveform, as a respective (i) beginning and (ii) end of switch control signal A, and (vi) a signal distribution means for communicating control signals A, B in normal A, B and inverted $\overline{A}$, $\overline{B}$ form from the switch control signal A and from the switch control signal B generation means to the switches of the port.

The choice of the reference waveform depends upon the counter emf that is desired to be presented. If a phase-shifted counter emf is desired then the reference waveform is merely a phase-shifted version of the impressed voltage. If a purely sinusoidal counter emf is desired then the reference waveform is a pure sinusoid in fixed phase with the impressed voltage, and is preferably phase-locked to the impressed voltage by action of a phase-locked loop.

Most commonly a picture-of-input-line-voltage is desired to be presented to a source of power so as to produce a unity load factor. In this case the reference waveform is the input line voltage amplitude-modulated by an error signal. The error signal represents the error in net power flow into the power converter at its (potential several) input port(s) and out of the power converter of its (potentially several) output port(s). The error signal is preferably derived as the difference between average voltage on an energy storage capacitor (which capacitor is connected to the power converter circuit through its own port) and a fixed d.c. reference voltage.

The improved power converter producing a unitary load factor to a source of power includes (i) at least three ports, (ii) a first control means for producing fixed-phase switching control (or drive) signals for controlling (driving) the switching within one of the three ports, and (iii) second and third control means, each based on an associated feedback loop, to produce variable-phase switching control signals for controlling the switching within the remaining two of the three ports.

The first port, called an INPUT LINE PORT, includes (i) a filter, having at least one inductor, connected to a first pair of terminals to which is connected the external source of power in which appears the first external electric potential, called an impressed voltage, and (ii) a switching circuit, having controllable switches, connected between the filter and an associated first transformer winding.

The second port, called a FIXED D.C. PORT, includes (i) a second pair of terminals in which appears a second, direct current, electrical potential, called a D.C. VOLTAGE, and (ii) a switching circuit, having controllable (driven) switches, connected between the terminals and an associated second transformer winding.

The third port, called a VARIABLE D.C. PORT, includes (i) a filter, having at least one inductor, connected to a third pair of terminals in which appears a third, variable d.c., electrical potential, and (ii) a switching circuit, having controllable switches, connected between the filter and an associated third transformer winding.

A capacitor, called an ENERGY CAPACITOR, is connected across the third pair of terminals. The variable d.c. third electrical potential appears across this ENERGY CAPACITOR.

A switching control circuit temporally renders conductive at least one switch in each of the ports, and alternately temporally renders conductive another switch in each of the ports, at a switching frequency that is relatively high compared to a frequency of the voltage waveform of the impressed voltage appearing at the first pair of terminals. The switching control circuit includes an oscillator producing an a.c. carrier waveform at a frequency that is relatively high compared to the frequency of the voltage waveform of the impressed voltage. It also includes a D.C. REFERENCE SOURCE producing a substantially constant reference d.c. voltage. It also includes a first subcircuit that is responsive to the a.c. carrier waveform. This first circuit controls (drives) the switches of the FIXED D.C. PORT to couple (connect) the D.C. VOLTAGE to the second transformer winding so as to maintain therein a square wave of a frequency and a phase equal to the a.c. carrier waveform, and of an amplitude equal to the D.C. VOLTAGE.

The switching control circuit next includes a second subcircuit that is responsive to any difference between the D.C. VOLTAGE and the reference d.c. voltage. This second subcircuit controls the switches of the VARIABLE D.C. PORT so that the D.C. VOLTAGE equals the reference d.c. voltage.

Finally, the switching control circuit includes a third subcircuit that is responsive to any difference between the average of the third electrical potential and the reference d.c. voltage. This difference (error) signal controls the amplitude of the picture-of-the-line generated by the switches of the INPUT LINE PORT.

This aggregate control causes a counter emf presented by the power converter circuit to the source of power to have an equivalent waveform to the impressed voltage, whatsoever its shape and distortion. "Equivalent" waveforms are not necessarily equal, but have the same ratio, a real number, at all instances of time. The amplitude only of the counter emf is controlled so as to add or subtract energy from the transformer excitation. The current in the port is proportional to the difference between the impressed voltage and the counter emf. This difference also has the same waveform as the impressed voltage, and is in synchronism with the impressed voltage. Thus the current has the same waveform in synchronism with the impressed voltage. This means that the converter presents a resistive load to the impressed voltage, or that the power factor is unity.

Power converters in accordance with the abovedescribed preferred embodiment of the invention usually include still another, fourth, port. This port, called an OUTPUT LINE PORT, includes (i) a filter, having at least one inductor, connected to a fourth pair of terminals to which is connected a load in which appears a second external electrical potential, called the OUTPUT VOLTAGE, and (ii) a switching circuit having controllable switches, connected between the filter and an associated fourth transformer winding.

When the fourth port is present then the switch control circuit further includes a REFERENCE SOURCE producing a reference voltage, and a fourth subcircuit responsive to the difference between the OUTPUT VOLTAGE and the reference voltage. The fourth subcircuit controls the switches of the OUTPUT LINE PORT so that the waveform of the OUTPUT VOLTAGE is substantially equivalent to the waveform of the reference despite changes in the impedance of the load.

There are still further aspects to the present invention. First, the switching control is not only timed and phased so as to functionally produce the desired counter emf or output voltage, but so as to couple an electrical potential of arbitrary waveform a particular a.c. waveform—to a square wave—that appears in the transformer's windings. The switching control still further possesses an (i) amplitude and (ii) d.c. balance so as to substantially preclude commutation shorts or voltage surges. Moreover, the transistorized switches within the switching circuits of the ports of the power converters are themselves improved in both (i) the characteristics of the components from which they are preferably constructed, and (ii) efficiency in the numbers of these components.

Second, certain power converter ports that are made from the well-controlled and efficiently constructed switches are themselves of improved design. The improved port designs are economical in components, efficient in operation. They are occasionally susceptible of being interactively combined to still further reduce component count.

Third, phase-controlled reversible power conversion in accordance with the present invention not only couples an input electrical potential of absolutely any voltage waveform in order to extract power therefrom while presenting a controlled counter emf thereto, but can perform this extraction to the goal of producing an output electrical potential of absolutely any voltage waveform whatsoever even when the input potential periodically momentarily instantaneously provides zero input power (0 v.d.c. voltage) simultaneously that the output power is non-zero (voltage of the output potential≠0 v.d.c.). This capability is based on the commutating energy storage.

These and other aspects and attributes of the present invention will become increasingly clear upon reference to the following drawings and accompanying specification.

DETAILED DESCRIPTION OF THE INVENTION

Figure 1:
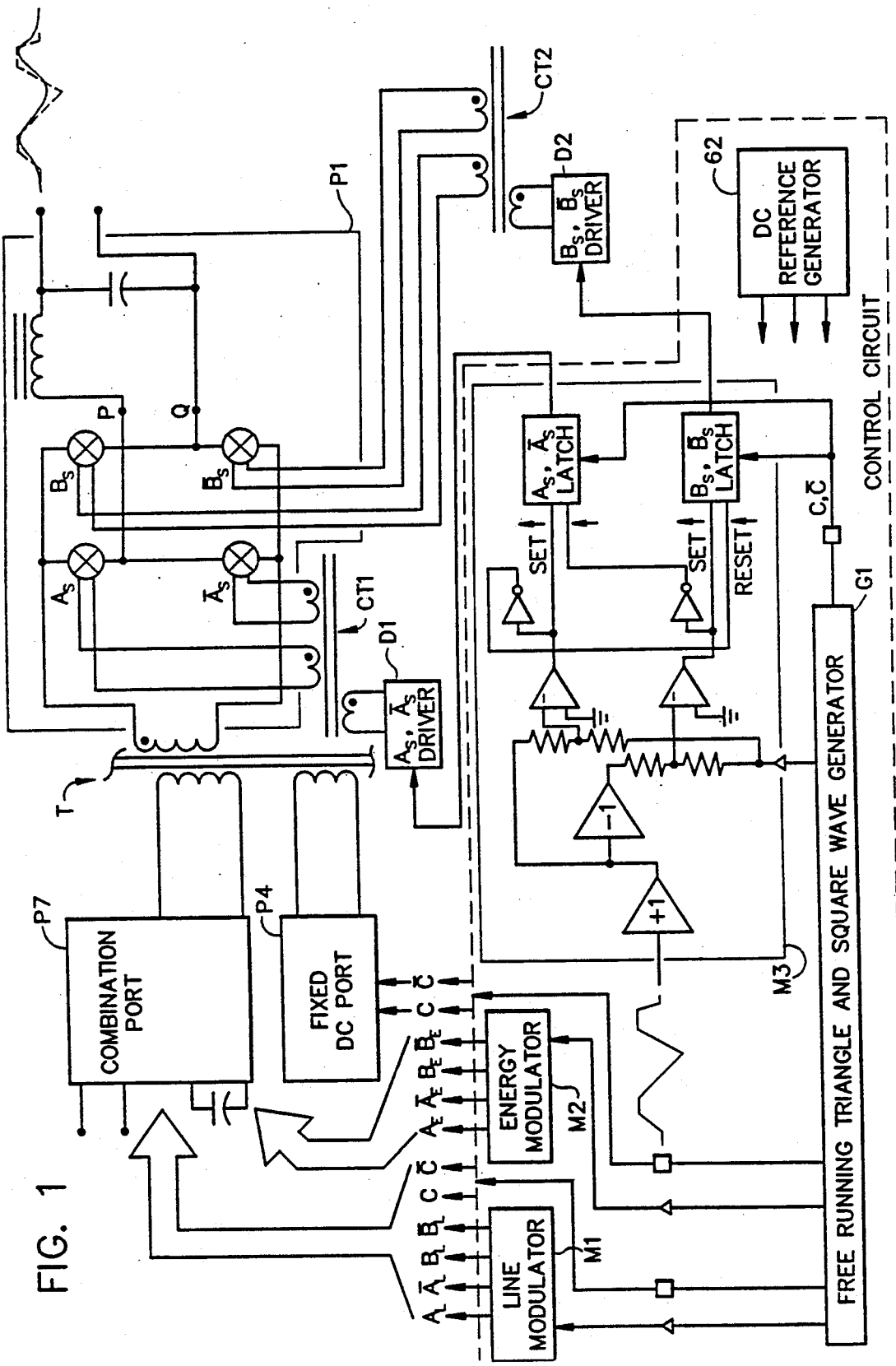
FIG. 1 is a block diagram, including a detailed schematic representation in certain areas, showing, in the example of a simple frequency changer or power (servo) amplifier, certain operational principles of the present invention, and certain aspects of the present invention.

1.0 The Basis Of Phase-Controlled Reversible Electrical Power Conversion Relative To Which The Present And Related Inventions Constitute Improvements The present and related inventions are improvements to conventional phase-controlled power conversion with high frequency switching, originally patented by McMurray in 1970. In conventional phase-controlled power converters the windings of a high frequency transformer link are connected respectively to a load, and to a d.c. or low-frequency a.c. source, through switching circuits employing pairs of controlled turn-off transistor switches as the switching devices.

Filter means are connected across the input and output terminals. The combination of a switching circuit and its filter is called a "port". By synchronously rendering conductive one switching device in each of the primary- and secondary-side ports, and by alternately rendering conductive another device in each port, the input potential is converted to a high frequency wave, transformed, and reconstructed at the output terminals. Wide range output voltage control is obtained by phase shifting the turn-off of the switching devices on one side with respect to those on the other side by 0° to 180°, and is used to effect limiting, current interruption, current regulation, and voltage regulation.

Unfortunately, McMurray's original circuit suffers from efficiency and reliability problems due to high current or high voltage surges that may occur during commutation. As of 1988 this problem was still being addressed. Moreover, even though the individual switching control signals to the individual switches (transistors) of the switching devices may be square waves, and are thus admirably suitable to be transformer coupled, the aggregate waveform produced within the power transformer link by the several phase-controlled switching devices is undesirably both (i) not a constant amplitude square wave, and (ii) customized to the particular type, and particular voltage waveforms, of the particular power conversion that is being performed. Because it is (i) inefficient to produce and use a transformer excitation waveform that is periodically of lesser voltage amplitude than the transformer can couple, and (ii) inefficient to design power converter circuits of narrow applicability, the pioneering circuit design of McMurray still languishes substantially unused—at least for generalized power conversion using transistorized circuits—after nearly twenty years.

The present invention will be seen to substantially (i) overcome prior commutation problems, (ii) much enlarge the scope of application of phasecontrolled power conversion technology, and (iii) improve the efficiency of phase-controlled power conversion. Power conversion in accordance with the present and related inventions permits practical realization of new and significant forms of power conversion, and new and significant benefits, heretofore neither effectively nor efficiently realized. A short introduction to these new forms and benefits of power conversion in accordance with the present and related inventions is presented in the following Section 1.1. The next five sections present a longer summary of the multiple inventive aspects of power converter circuits in accordance with the present and related inventions. By this presentation the scope of the collective inventions may best be appreciated.

1.1 Effects Of The Present And Related Inventions

Power converter circuits in accordance with the present and related inventions function to efficiently convert a first electrical potential having any one of an (i) alternating current, (ii) direct current, (iii) composite alternating current and direct current, and (iv) stochastic voltage waveform simultaneously into a number of selected second electrical potentials each having any selected one of an (i) alternating current, (ii) direct current, (iii) composite alternating current and direct current, or (iv) stochastic voltage waveform. The power converter circuit accordingly performs as a virtual transformer simultaneous between and among any number of electrical potentials of any waveforms. In the virtual transformer—as in a real transformer—all of the conversions are reversible, and pass smoothly through zero power transfer (zero current). All conversion(s) is (are) under continuous small signal control.

As an example of a significant new form of power conversion, single phase a.c. power can be simultaneously converted into multiple phase, for example three phase, a.c. power. The input a.c. frequency need not even be at the output a.c. frequency; for example, single phase 60 Hz a.c. power can be converted to 3-phase 400 Hz a.c. power.

As an example of a significant benefit, a power converter circuit in accordance with the present and related inventions is normally controlled so as to present a load having a unity power factor to a source of a.c. power that is input to the power converter circuit—regardless of the types or number of output voltage waveforms that the power converter converts the input power into, and regardless of the inductive or capacitive nature of the load(s) receiving these output voltage waveforms.

Power converters in accordance with the present and related inventions are efficient in the numbers and costs of their components. All simultaneous reversible conversion(s) is (are) through a single high frequency transformer—no matter how complex nor how numerous the conversions. Bidirectional, reversible, input/output communication of power both to and from the transformer is through switching circuits and filters, called in combination variable ports, that employ controllable form A switches made from power Metal Oxide Semiconductor Field Effect Transistors (MOSFETs). Only modest numbers of form A switches are used in various switching circuits within ports of various types. Some types of ports, and a particular port that is formed as a combination of two other ports, are particularly economical in the number of switches used. Filters that are required for semi-regulated a.c. and fixed d.c. outputs of the power converters use much smaller inductors and capacitors then those previously employed in Pulse Width Modulated (PWM) power conversion systems.

Power converters in accordance with the present and related inventions are efficient in converting power, typically ranging to 95% efficient. The converters are intrinsically operationally efficient because significant losses are due essentially to the $R_{DS}$ (ON) of MOSFET's, and are very low. Switching is extremely fast—on the order of nanoseconds. Accordingly, extremely little energy is wasted in transients occurring during switching. The ports of the power converter connect directly to external voltage potentials. They do not employ power diodes for rectification as is necessary in previous PWM and resonant-mode power conversion, and which is also previously common in phase-controlled power conversion (e.g., reference the previously-mentioned article of Harada, et al.). Rectification from a high-frequency waveform appearing within the transformer windings to the d.c. or low frequency a.c. appearing at the ports, terminals is virtual, and is not actual. The rectification is performed by action of switching within the ports. Accordingly, because there are no power diodes in the power conversion/power converters in accordance with the present and related inventions, significant power losses in these diodes and power losses caused by slow reverse recovery of these diodes, are completely avoided and efficiency is improved.

Components within power converters in accordance with the present and related inventions are used efficiently. The a.c. waveform that appears within, and that is inductively coupled by, the converter's transformer is a continuous, equal duty cycle, substantially constant amplitude square wave -giving an optimal 100% transformer duty cycle.

The power conversions performed by power converters in accordance with the present and related inventions facilitate that energy should be recovered and not wasted. When a load exhibits temporary power storage in the form of any of mechanical energy, capacitive charge, or inductive current—which power storage is common—then fully bidirectional power conversion in accordance with the present and related inventions returns this power to the input system or line.

Power converters in accordance with the present and related inventions are stable and reliable. Form A switches within the converters are controlled for switching in a manner that effectively alleviates adverse high currents, or high voltage surges, resultant from imperfect sequencing and phasing of switching control. Because a power converter circuit in accordance with the present and related inventions does not appreciably suffer commutation problems, it is stable and long-lived in operation.

Power converters in accordance with the present and related inventions produce superior waveforms. In the quite common use of a power converter to convert to or from a.c. power, certain variable ports of appropriate types within the power converter are controlled so as to produce a three-state demodulated signal. This three-state demodulated signal has only one-half the distortion of a two-state demodulated signal that was previously commonly produced by PWM power supplies or power converters. It is of superior efficiency to deliver power into a resistive load. It may readily be filtered by an inductor-capacitor circuit of reduced component size in order to produce low distortion a.c. power.

Because power conversion in accordance with the present invention reaches new levels of performance and attains new benefits—even though it has a distant antecedent in the pioneering work of McMurray and others circa 1968—it is best explained incrementally so that it may be most clearly understood how an old and consistent line of electrical circuit design has finally yielded fruition.

1.2 Current Switching within Three Or More Ports Of Power Converters In Accordance With The Present And Related Inventions Collectively Produces An Equal Duty Cycle Substantially Constant Amplitude Square Wave In The Converter's Transformer, And From This Many Benefits Flow One aspect of the present and related inventions is an equal duty cycle, substantially constant amplitude square wave appearing within the inductively coupled windings of a transformer within a power converter.

Save for a simple embodiment of the invention as a rudimentary a/c to d/c converter, battery charger, or battery powered inverter where only two ports are used, the invention is embodied in power converters having at least three ports. Each port usually connects to its own transformer winding, and couples the equal duty cycle substantially constant amplitude square wave appearing therein to an electric potential that appears across a pair of terminals associated with the port. (The exception is that two ports of certain types may sometimes be combined, and the resulting combination port may couple two electrical potentials to the same transformer winding.)

One of the at least three ports is always a fixed d.c. port, meaning that it couples (connects) a fixed d.c. voltage appearing across a pair of terminals to a transformer winding within which appears the square wave. The word "fixed" also refers to the switching control of switches within the port, which switching control is fixed-phase and time-invariant. The fixed d.c. port does not include an inductor, and includes only controllable switches in a switching circuit, normally four such switches in a bridge configuration. The relatively simple fixed d.c. port connects directly, and without intermediary circuits or components of any nature whatsoever, to a source of the fixed d.c. voltage and to an associated transformer winding. It is selectively controllable to switch connect the d.c. voltage at either polarity to the transformer winding, thereby to produce a square wave of (i) frequency and (ii) phase determined by the fixed-phase switching control single, and of (iii) amplitude equal to the d.c. voltage, therein.

Two of the remaining ports are commonly, but not necessarily, called an "input" port and an "output" port. These variable ports may be of any of a large number of forms, and may couple any selected one of an infinite number of voltage waveforms. Because all energy flow within the converter is fully reversible—i.e., bi-directional—the ports are called "input" and "output" only because a source of electric power which supplies energy is (but not invariably, or necessarily continuously) connected to the terminals of the so-called "input" port while a sink of electric power which (but not invariably, or necessarily continuously) consumes energy is commonly connected to the terminals for the so-called "output" port.

A variable port includes (i) a filter, having at least one inductor, connected to (ii) a pair of terminals in which appears the associated voltage waveform, and (iii) a switching circuit, including controllable switches, connected between the filter and an associated winding of the transformer. The word "variable" refers both to (i) the voltage waveform that is coupled—which waveform may variably be any waveform that is coupled—which waveform may variably be any waveform and which waveform may vary in any of shape, a.c. or d.c. nature, or distortion during continuing uninterrupted operation of the power converter, and to (ii) the variable-phase switching signals that control switching in the switches.

The switching within the fixed d.c. port causes that it absolutely, and without further assistance, fixes the (i) frequency and (ii) phase of the square wave within the transformer's windings. Because the switching control of the fixed d.c. port is by switching control signals that are complementary (i.e., one such signal C is the inverse of the other such signal $\overline{C}$), the duty cycle of the square wave is equal, and each polarity of the square wave is 50%.

However, the fixed d.c. port may either (i) generate, or (ii) help to generate, the constant amplitude of the square wave within the transformer's windings. If it is sufficient in of its own behalf to (i) generate the square wave of the constant amplitude, then it needs be controlled (driven) in only its own switching to do so. If it can only (ii) help to generate the constant amplitude of the square wave, then it is controlled (driven) in its own switching, and additionally the switching of one or more additional ports (e.g., the "input" port and/or the "output" port) is also controlled. This switching control of the additional port(s) is ultimately in response to the extent that the fixed d.c. port needs assistance in maintaining the square wave to be of constant amplitude. It transpires so as to help produce and maintain the square wave to be of a constant amplitude.

As previously stated the fixed d.c. port itself, alone, determines absolutely both the frequency and phase of the square wave transformer excitation. However, the fixed d.c. port is able to (i) control the amplitude by itself, and without assistance, only when it the fixed d.c. voltage to which it connects is stiff, meaning of low internal resistance and large energy capacity. A large battery may serve as the source of such a stiff d.c. voltage. (Therefore the simple battery charger embodiment to the invention arises when the fixed d.c. port functions as either the "output", or the "input", port, and connects to a battery.)

The fixed d.c. port is commonly neither able to, nor intended to, generate and maintain the constant amplitude of the square wave within the transformer's windings solely by itself. Instead, the voltage of the fixed d.c. voltage coupled (connected) by the fixed d.c. port is sensed, compared with a reference d.c. voltage, and the difference (error) is fed back to control switching in one or more of the remaining ports. The feedback control causes the controlled port to add or subtract energy so as to maintain the square wave at an amplitude that substantially equals the reference d.c. voltage (to the limits of the ability of the controlled port, and the source of energy to which it connects, to do so). (Because a feedback loop always requires a small error voltage to operate, the amplitude of the square wave is spoken of as being "substantially" equal to the reference d.c. voltage, and "substantially" constant.)

Great benefits accrue from the equal duty cycle substantially constant amplitude square wave within the power converter's transformer. The transformer's utilization duty cycle is an optimal 100%. No direct current component is required to be coupled by the transformer.

The power converter's single transformer having an equal duty cycle substantially constant amplitude square wave excitation permits universal coupling of external electrical potentials—any number of ports coupling any voltage waveform may be connected to an associated winding of the same transformer. The ports of the power converter that are commonly associated with "input" produce no special, nor any custom, waveform within the transformer as with previous phasecontrolled power converters. The "input" ports thus become divorced from such number of ports of the power converter as are commonly associated with "output" The ports, and the voltage waveforms that they couple, are relatively independent and may be added to or subtracted from the power converter as desired. ("Relatively" independent means only that certain ports such as the fixed d.c. port or its equivalent are necessary, and that "input" ports receiving energy must be part of the power converter if "output" ports supplying energy are to function.) The variable ports are relatively independently controllable and controlled, both by open-loop transfer functions and by closed feedback loops. ("Relatively" independently controlled means only the common sense concepts that multiple feedback control loops, or combinations of feedback control loops and transfer functions, can logically not be set in opposition to each other, and that one single output cannot be simultaneously controlled in accordance with each of two independent inputs.)

Each and every port, and all conversions, are fully and completely bidirectional, and reversible.

As a practical example of this universality, single phase a.c. power, such as 60 Hz power supplied from a power grid, may be converted into multi-phase a.c., such as 3-phase a.c. power used to power an induction motor. The induction motor may be used, for example, to drive a train. When the train is braked against the motor then power is returned to the single phase a.c. power grid.

1.3 Power Converter Circuits In Accordance with the Present And Related Inventions Control Switching in Rugged MOSFET Form A Switches So As To Preclude Shorts, And So As To Render Voltage Surges Inconsequentially Negligible In accordance with the present and related inventions, the switching control waveforms that cause switching of FET or MOSFET form A switches are (i) asymmetrical about non-zero switching threshold voltages to the switches, and (ii) symmetrical about 0 v.d.c. The switching control waveforms are further (iii) of very nearly equal duty cycle one cycle to the next, and are accordingly very nearly square waves. Finally, (iv) the rise and fall times of the switching control waveforms are very fast, typically less than 30 nanoseconds and preferably less than 10 nanoseconds.

The switching control waveforms do not exhibit equal voltage excursion on either side of the FET or MOSFET switching threshold voltage. This switching threshold voltage is typically approximately +3 v.d.c. for a preferred N-channel FET or MOSFET or −3 v.d.c. for a P-channel FET or MOSFET. Instead of being symmetrical about the switching threshold voltage, the switching control waveforms are symmetrical about 0 v.d.c. They are of equal duty cycle, and therefore contain no d.c. component. This is advantageous because a d.c. component of a switching waveform cannot be coupled through a transformer without auxiliary demodulation circuitry, and all switching waveforms used in the present invention are preferably so coupled through transformers in order to provide isolation between the switching, and the switch control, circuitry. The preferred switching waveform is a ±10 v.d.c. equal duty cycle square wave.

The reason that the preferred FET (or MOSFET) switching waveform is asymmetrical relative to the switching threshold voltage is so as to always cause one form A switch to turn "off" (become non-conducting) before its companion form A switch (making together a form C switch) turns "on" (becomes conducting). This desired sequence results because it takes longer for the switching waveform to transit from −10 v.d.c. to approximately +3 v.d.c., and thereby turn "on" an N-channel FET (or MOSFET) form A switch, than it does for the inverse of the switching waveform to transit from +10 v.d.c. to an approximately same +3 v.d.c. and thereby turn "off" a companion N-channel FET (or MOSFET) form A switch. The simultaneous "on", or conducting, condition of both form A switches is effectively impossible; current shorts across a power transformer winding are effectively precluded.

The same desired sequence transpires if the FET (or MOSFET) is a P-channel device with a switching threshold voltage of approximately −3 v.d.c. In such a case it takes longer for the switching waveform to transit from +10 v.d.c. to −3 v.d.c.—thereby turning "on" a P-channel FET (or MOSFET) form A switch then it does for the inverse of the switching waveform to transit from −10 v.d.c. to −3 v.d.c.—thereby turning "off" a companion P-channel FET (or MOSFET) form A switch.

Because of its fast rise time and its fast fall time, the switching waveform transits so fast in the region of +3 v.d.c. that any two series-connected FET (or MOSFET) form A switches controlled by the waveform, and by its inverse, are not simultaneously off (nonconducting) for period of more than a few nanoseconds. Not much energy is contained within a resulting voltage surge, or spike, of but a few nanoseconds duration.

Even such a small voltage spike as does result from imperfect commutation can be controlled by voltage snubbers. However, in accordance with the present and related inventions a new type of power MOSFET is employed for switching. These new MOSFETs are called "rugged". They are substantially immune to nanoseconds duration over-voltage transients. Accordingly, such minor voltage surges, or spikes, as do occur in power converters in accordance with the present and related inventions are substantially inconsequential to the operation of such power converters.

1.4 Power MOSFET Form A Switches Are Used To Construct Switching Circuits, Or Ports Including Ports Of Improved Configurations Power converter circuits in accordance with the present and related inventions are constructed in accordance with the general model of McMurray. Each power converter circuit functions as a virtual transformer between external electrical potentials. It includes (i) a transformer including a plurality of inductively coupled windings, (ii) a first port including switches connected in some manner between a first transformer winding and a first pair of terminals in which appears a first external electric potential, (iii) a second port including switches connected in some manner between a second transformer winding and a second pair of terminals in which appears a second external electrical potential, and (iv) a switching control means for temporally rendering conductive at least one switch in each of the ports, and for alternately temporally rendering conductive another switch in each of the ports, at a switching frequency that is relatively high compared to a frequency of the electrical potential appearing at the first pair of terminals.

The switches within the ports are connected in both center tap and bridge configurations. Switching circuits employing switches in a center tap configuration represent a generally inferior alternative for use within power converters constructed in accordance with the present and related inventions. Switching circuits within the ports of power converters in accordance with the present and related inventions are preferably constructed from groups of four switches, normally from one such group. Each group of four switches is connected as a bridge between a pair of terminals in which appears a voltage potential and a transformer winding in which appears an a.c. waveform. The transformer's a.c. waveform is preferably an equal duty cycle substantially constant amplitude square wave, and is inductively coupled within all the windings of the transformer.

For example, one such port, called a "general purpose port", employs as its switching circuit four MOSFET form A switches connected in a bridge configuration between a transformer winding and a filter including at least one inductor, in turn connected to a pair of terminals in which appears a voltage potential. Each MOSFET form A switch is a bipolar bilateral switch consisting of two series-connected, common-gate-signal-controlled, power MOSFETs.

The present and related inventions contemplate several different, improved, ports that employ form A switches in new configurations. In one such improved port, called a "general purpose port alternate form", a first set of four unipolar bilateral switches are connected as a first bridge between a filter connected to a pair of terminals while a second set of four unipolar bilateral switches are connected as a second bridge between the first bridge and a transformer winding.

In another improved port, called a "variable d.c. port", two bipolar bilateral switches and two unipolar bilateral switches are connected as a bridge between a transformer winding and a filter including at least one inductor connected to a pair of terminals. Each bipolar bilateral switch is opposed to a unipolar bilateral switch in the bridge.

In still another improved port, called a "fixed d.c. port", four unipolar bilateral switches are connected as a bridge between a transformer winding and a pair of terminals.

In accordance with a major feature of the present and related inventions a greater number than two ports may be connected to a single transformer. Each port is controlled to couple a prescribed voltage potential. In certain cases two or more of switching circuits, or ports, may be effectively merged in order to save on the total number of components required, and in order to ensure an optimal joint response to switching control.

One port merges the circuit of the "general purpose port alternate form" with another circuit called a "variable d.c. port". This particular merged port includes (i) a first set of four solid state unipolar bilateral switches connected as a first bridge between a filter including at least one inductor connected to a first pair of terminals, and a second set of four solid state unipolar bilateral switches connected as a second bridge between the first bridge and a transformer winding, (ii) two series-connected solid state bipolar bilateral switches connected in a half-bridge circuit relationship across the transformer winding, and (iii) a ladder inductor(s) connected on either or both sides of a second pair of terminals between the center of the half-bridge and one of two points of connection of the first bridge and the second bridge. In use of this merged, or combined, port an external electrical potential normally appears across the first pair of terminals while a capacitor, across which appears a variable d.c. voltage, is normally connected to the second pair of terminals.

1.5 Commutating Energy Storage

If a power converter is to convert any kind of electrical power having any of a.c., d.c., composite a.c. and d.c., or stochastic voltage waveform to any other kind(s) of electrical power having any of an a.c., d.c., composite a.c. and d.c., or stochastic voltage waveform—as is possible in power converters of the present and related inventions—then there regularly arises, at least when the input power is single phase a.c., a dilemma. This dilemma occurs when the voltage of the input power a.c. waveform is too close to zero volts, or is at zero volts, while there is an instantaneous requirement for a non-zero power output.

No power converter can produce instantaneous power out in the absence of any power in forebearing that it stores energy. One aspect of the present and related inventions is based on the insight that energy storage is required if a power converter is to invariably, and at all instances of time, produce any selected output power voltage waveform(s) from an input a.c. power voltage waveform that is sometimes insufficient, and may even be zero volts, so as to instantaneously provide the power instantaneously required by the output. This energy storage of the present invention is called "commutating energy storage".

In accordance with the present and related inventions a commutating energy storage port is a variable d.c. port connected between a set of terminals and one of the plurality of transformer windings. This one of the transformer windings may, or may not be, a winding to which a switching circuit serving another purpose is also connected.

The commutating energy storage port provides necessary commutation energy to one or more ports of the power converter that are connected to loads at times when another, "input", port of the power converter which is connected to a source of electrical power cannot instantaneously supply the necessary energy. This inability to supply necessary energy occurs when, and because, an instantaneous alternating current electrical potential supplied to the "input" port from the source of electrical power is too close to zero volts, or is zero volts.

The commutating energy storage port is connected to an energy storage element, normally a capacitor but potentially a battery or an inductor. The energy storage element both stores, and provides, electrical power. The commutating energy storage port includes a filter and switches controllable for bidirectionally transferring electrical power between the storage means and the transformer winding to which the commutating energy storage circuit is connected.

In the operation of the commutating energy storage port, the switches of its switching circuit are controlled by a switching control circuit. The switches are controlled so as to maintain the square wave excitation within the power transformer excitation to be of constant amplitude. This is accomplished by comparing the terminal voltage of a fixed port with a d.c. reference voltage and by using the amplified difference (error) to phase modulate the square wave gate drive to the commutating energy storage port. This control is performed by a fast-acting negative feedback loop with a response time of approximately 30 microseconds.

Switching control of the commutating energy storage port causes it to provide power to the square wave excitation of the power transformer when the single phase a.c. line power is inadequate. It also provides for replenishing power to the commutating energy storage element itself. Replenishment of power in the storage element is provided by measuring the average stored energy in the element and controlling switching within the "input" port so that the magnitude of the "picture of the line" counter emf presented to the single phase a.c. line will serve to stabilize the average stored energy in the storage element. A negative feedback loop accomplishing this control is much slower than the first feedback loop, and has a response time of approximately 5 milliseconds.

Commutating energy storage is particularly necessary for conversion of single phase alternating current into multiple phase alternating current. A power converter circuit performing such a conversion includes (i) a transformer having a multiplicity of inductively coupled windings, and (ii) several variable ports.

A first port includes (i) a filter including at least one inductor connected to a source of single phase alternating power and (ii) switches connected as a bridge between one of the transformer's windings and the filter. The first port uses single phase alternating current power received from the source to help to sustain a square wave alternating current waveform in the transformer's inductively coupled windings, and thus the average level of stored energy at the commutating energy storage port.

The power converter circuit further includes (iii) a multiplicity of second variable ports connected to a like multiplicity of the transformer's windings. Each second variable port includes a filter including an inductor connected to an associated pair of terminals and switches connected as a bridge circuit between an associated one of the transformer's windings, at least one inductor and the filter. Each second port uses the square wave alternating current waveform that is inductively coupled to and which appears within its associated transformer winding to produce an alternating current waveform at the associated terminals. The alternating current waveform produced by each second variable port is normally of a different phase to those alternating current waveforms that are simultaneously produced at other pairs of terminals by a other ones of the multiplicity of second variable ports.

Finally, the power converter circuit includes a commutation-energy-storing means. This commutation-energy-storing means includes (i) a port including a filter inductor and switches connected as a bridge between one of the transformer's windings, and (ii) an energy storage element for storing electrical energy. The commutation-energy-storing means operates to (i) regulate the magnitude of the transformer excitation, and thus provide stored electrical power to any of the multiplicity of second variable ports that require power upon such times as the first variable port is temporarily unable to do so because the voltage level of the single phase alternating current from the source is temporarily insufficient, and (ii) receive and store electrical power from the source and through the first port upon such times as the source is able to provide such power and as the level of electrical power currently stored requires replenishment.

By this operation the multiplicity of second variable ports produce, from a single square wave alternating current waveform in each of the transformer's windings, a multiplicity of different phases of alternating current. Simply stated, single phase alternating current received from a source of power has been converted in a single transformer into multiple phase alternating current.

1.6 Switching Control Of Certain Ports May Make The Counter emf Of The Power Converter Circuit Have The Same Waveform As The Impressed Voltage, Thereby Making The Power Converter Circuit Exhibit A Unitary Power Factor When a certain number of ports—normally four such ports but two of these ports may be combined so as to give three total ports—of certain selected types—for example two general purpose variable ports plus one fixed d.c. port plus one variable d.c. port—within a power converter are controlled for switching in accordance with certain predetermined negative feedback loops, then major benefits accrue. Mainly, the general purpose variable ports are controlled to present any desired counter emf of any waveform to a source of power, or a voltage (an "impressed emf") of any desired waveform to a sink of power.

For example, the counter emf of the power converter to a source of power may be controlled so that the power factor presented by the power converter to the source of power will be unity—regardless of the numbers, or types, of conversions that the power converter simultaneously performs. A unitary power factor means that the power converter, and all its connections and all its loads, appears as a purely resistive load to a source of power—regardless of the waveform, waveform distortion, and/or waveform changes of this source of power.

The preferred square wave excitation waveform within the power converter's transformer is universal in form, and is completely dissociated from any particular power conversion. Accordingly, any number of variable ports coupling any number of selected a.c., d.c., a.c. and d.c., or stochastic voltage waveforms may be attached to the same transformer, and any electrical potential(s) whatsoever can be converted to any other electrical potential(s) whatsoever with full bidirectional energy flow as required to maintain the potentials—all at the same time. Meanwhile, at the same time that these electrical potentials are coupled and converted by the power transformer, the counter emf presented to the input(s) electrical potential(s), or the waveforms of the voltage(s) that constitute the output electrical potential(s), may be controlled. Roughly speaking, the power converter not only couples to and from any electrical potentials desired, it presents any desired emf to the electrical potentials to which it couples. No electronic circuit can do more than this: to interface and to interface controllably.

To perform its flexible interfacing and controlled emf of interfacing the power converter will produce, at its various ports where waveforms having a time variant component are required and desired, quality a.c. waveforms from three-state demodulated output signals. Universal, efficient and effective quality reversible power conversion is therefore realized.

For purposes of explaining the relatively complex switching control scheme, and switching, that simultaneously realizes all these benefits, this section 1.6 will describe the relationship of the switching control in terms of the counter emf presented to a source of power by the power converter. The next following section 7 describes the relationship of the selfsame switching control to the three-state demodulated output signals produced thereby. It is still further possible to describe the switching control based on (i) its maintenance of the square wave within the transformer of the power converter, (ii) the shepherding of the energy flows within the power converter during power conversion and (iii) still other factors. The alternative descriptions and characterizations merely serve to show that many different aspects and attributes of the present invention may be simultaneously realized by one basic underlying, scheme of feedback control of switching within the several ports of a multiple-port power converter.

Characterization of switching control in accordance with the present invention in terms of its effect on the load factor presented by the power converter to a source of power is as follows. Counter-electromotive force, sometimes called back electromotive force, is defined as the emf generated by a running motor by virtue of its generator behavior, or by an inductive circuit element through which the current is increasing with time. The total emf in a circuit is the impressed voltage minus the counter emf; the current is given by the ratio of this total emf to the resistance in the circuit. The counter emf may be observed as a voltage at the terminals only when there is no terminal current (open circuit).

A unitary load factor results when the counter emf presented by a circuit is of an equivalent waveform to the impressed voltage of a source connected to the circuit. The waveforms are seldom identical, in which case the circuit consumes no power. (If the counter emf is greater than the impressed voltage—as may occur when the power converter in accordance with the present and related inventions feeds power reversibly backwards into what is normally a source of power—then the circuit produces power.) The waveforms are merely equivalent, meaning that the ratio of their instantaneous voltages is always the same real number.

One aspect of the present and related inventions is based on the insight that a power converter circuit produces a counter emf, and that a power converter circuit may be made to produce a controllable counter emf. If the counter emf is controlled to be the same waveform as an impressed voltage that is supplied to the power converter circuit by a (typically relatively stiff, relatively low resistance) external source of power, then the power converter will appear purely resistive to the external source of power, and will exhibit a unitary load factor.

In accordance with the present invention, switching control of a power converter's ports is improved so that the power converter will show a unitary power factor to an impressed voltage of a power source. The power source is connected across a pair of terminals of a first port of the power converter. Meanwhile, a load, which may be either resistive or reactive, is connected across a pair of terminals of a second port of the power converter.

The improvement makes use of the commutating energy storage means discussed in the previous sections. The commutating energy storage means will be recalled to consist of a third port including a filter having inductor and a switching circuit, and also an energy storage element, normally a capacitor. The improvement additionally requires use of still another, fourth, fixed port for coupling a d.c. voltage potential.

Accordingly, a power converter with the improvement normally includes four different ports—one fixed port and three variable ports—connected to windings of the same transformer.

Accordingly, an improved power converter in accordance with the present and related inventions, functioning as a virtual transformer between external electrical potentials, first includes a transformer including a plurality of inductively coupled windings.

The improved power converter second includes a first, "fixed", port that is driven by first fixed-phase switching control signals for coupling a d.c. first voltage to a transformer winding in which appears on equal duty cycle substantially equal amplitude square wave. Notice that the operative word describing the function of the first port is "coupling". Either voltage to which the port connects is converted, fully bi-directionally and reversibly, into the other. Generally, however, it may be considered that the fixed d.c. first voltage is an independent source. It serves to "produce" by operation of the first port the square wave (the complete origins of which are yet to be explained) that is within the transformer winding.

The improved power converter third includes a commutating energy storage means. This commutating energy storage means includes (i) an energy storage element, normally a capacitor across which appears a variable d.c. second voltage and (ii) a second, commutating energy storage, variable port controllable by second control signals for coupling the variable d.c. second voltage to a transformer winding in which appears the square wave. Again the operative word is "coupling". In actual use of the second port energy flow is very much bidirectional, and each voltage is at different times "produced" from the other. The commutating energy storage means is, under control of switching signals as will be explained, often integral to effective creation and maintenance of the square wave within the transformer's windings.

The improved power converter fourth includes a third, "input", variable port controllable by second modulated carrier signals for coupling a first external electrical potential having any of an a.c., d.c., or stochastic third voltage waveform to a transformer winding in which appears the square wave. The operative word is "coupling" because all conversion is bidirectional and reversible. Normally a source of power presenting a stiff voltage waveform is connected to this third, "input", variable port. The source of power generally supplies power. It may generally be considered, when ported through the third port under control of the third control signals, to contribute to "producing" the square wave within the transformer's windings. Of course, it is possible that, at times, power may actually flow into the source of power.

The improved power converter fifth includes a fourth, "output", variable port controllable by third modulated carrier signals for coupling a second external electrical potential having any of an a.c., d.c., combination a.c. and d.c., or stochastic fourth voltage waveform to a transformer winding in which appears the square wave. The operative word is "coupling" because all conversion is bidirectional and reversible. Normally a load that generally consumes power is connected to this fourth, "output", port. The fourth variable port may generally be considered, under control of the third modulated carrier signals, to be producing a selected voltage waveform across a load from demodulation of the square wave that appears in the associated transformer winding. Of course, it is completely possible, and normal, that power may flow from the load through the fourth port and into the transformer's square wave, and may further flow through the third port to the source of power, through the second port to the energy storage element, or even through the first port to the fixed d.c. first voltage.

It is obvious by this point that all ports work together under unified control. Such unified control is based on at least two, and typically on three, feedback control loops.

Accordingly, a power converter in accordance with the present invention sixth includes a control circuit for producing the switching control signals that are received by the first through fourth ports. The switching control signals are used by these ports to collectively produce (i) the equal duty cycle substantially constant square wave in the windings of the transformer, and also (ii) the second through fourth voltages—each to the extent that the stiffness of these voltages enables the power converter circuit to do so.

The control circuit includes (i) an oscillator producing an invariant square wave and an invariant triangular carrier wave, (ii) a source of a fixed d.c. first reference voltage, and (iii) a source of a selected second reference voltage having any of an a.c., d.c., combination a.c. and d.c. or stochastic voltage waveform.

The control circuit further includes (iv) a first drive signal generator, responsive to the fixed carrier wave, for producing first, fixed-phase, drive signals that cause the first port to couple the d.c. first voltage so as to maintain a square wave having equal frequency and constant relative phase to the carrier waveform within a transformer winding. Moreover, the fixed-phase first drive signals will cause the first port to couple the d.c. voltage to maintain to such extent as is possible the amplitude of the square wave to be constant, and to be equal to the d.c. voltage. Herein lies a nucleus of the invention. The d.c. voltage source is, or becomes, immutably fixed. It may be a fixed voltage source, for example a battery or a regulated power supply. This fixed d.c. voltage source becomes the standard to which the amplitude of the square wave within the transformer's windings—the hallmark of the invention—will, by operation of the several ports of the power converter, be fixed. Meanwhile, the frequency, phase, and preferred 50% duty cycle of the carrier waveform provides the absolute standard by which the frequency, phase, and duty cycle, of the square wave is fixed.

If the source of the d.c. first voltage has adequate capacity then it alone, as coupled in the first port under control of the first drive signals, can maintain the desired constant amplitude of the square wave in the transformer's windings. However, in normal use, and normal connection, of the power converter, the d.c. voltage has no such capacity. The power to maintain the amplitude of the square wave within the transformer's windings must, at least in part, come from somewhere else—another port or ports. However, it should always be remembered that the first port alone, operating under control of the fixed-phase first drive signals, completely defines the frequency and phase of the square wave within the transformer's windings.

The control circuit still further includes (v) a second control signal generator, responsive to any difference between the d.c. first voltage and the fixed d.c. first reference voltage, for producing phasemodulated signals that cause the second port to couple the variable d.c. second voltage to the square wave so as to maintain, to such extent as possible, the amplitude of the square wave—which amplitude is equal to the d.c. first voltage—to be equal to the fixed d.c. reference voltage. In other words, control of switching within the second port which connects to the commutating energy storage element is directed to maintaining the square wave within the transformer's windings.

Momentarily return to thinking about the first port that bidirectionally couples the square wave that appears within the transformer's windings to the d.c. first voltage. It has just been stated that the second port will, under variable-phase control signals from the second control signal generator, contribute to maintaining the amplitude of the square wave to be equal to the fixed d.c. reference voltage. It commences to become understandable as to how the d.c. voltage—which is normally of low capacity—will become "fixed", and "fixed" at the level of the d.c. reference voltage. It will so become "fixed" because, under control of feedback loops operating in the control circuit, the amplitude of the square wave within the transformer windings will likewise become "fixed".

Meanwhile, the control circuit still further includes (vi) a third control signal generator, responsive to any difference between the average d.c. second voltage and the fixed d.c. first reference voltage, for producing phase-modulated control signals that cause the third port to couple the first external electrical potential to the square wave so as to maintain, to such extent as is possible, the average d.c. second voltage to equal the fixed d.c. first reference voltage. In other words, switching within the third, input, port is controlled for the sake of the average voltage on the capacitor of the commutating energy storage circuit.

Again the concept is that all ports of the power converter "lock" into an equal duty cycle square wave within the transformer's windings that becomes substantially constant, or "fixed", at an amplitude equal to a d.c. reference voltage by collective operation of the collective ports. One port in particular—the fixed d.c. first port—will itself "lock" into coupling a d.c. voltage that likewise becomes "fixed" at the amplitude of the d.c. reference voltage. It makes no sense to ask what comes first, and where is the "input" to the power converter and where in the "output". Starting from a fixed d.c. reference voltage, usually the voltage drop across a zener diode, the power converter will smoothly, and without great current inrush, ramp up to "lock" on to all the voltages that it converts, and to the steadfast production of the equal duty cycle substantially constant amplitude square wave within its transformer.

Amazingly, the power converter will "lock" on to converting any input source of power having any waveform. It is the signal flow to, and within, the several feedback control loops or open loop transfer functions of the power converter that determine what it will do, and not the particular components of the power converter nor any particular, customized, connection thereof. For example, all the variable ports are completely general purpose, and serve equally well to couple voltages having any waveforms whatsoever. This universality means, for example, that a power supply producing some preselected output(s), for example 3 phases of 60 v.a.c. 400 Hz, where the outputs are "preselected" by generation in tank circuits of small signal 400 Hz reference waveforms that control the switching in three variable output ports, could be universally connected and reconnected to sources of input power having any waveforms. For example, the power converter's input port could be connected to 120 v.a.c. 60 Hz, unplugged, and reconnected to 60 v.d.c. (or vice versa) totally without alteration and would, in both cases, produce the 3 phase 60 v.a.c. 400 Hz outputs.

Continuing with the improved control within a phase-controlled power converter in accordance with the present invention, a key element of the control circuitry is a modulator. A single-input modulator produces a the square-wave gate drive signal having a phase shift from null-phase that is proportional to the instantaneous value of the input signal. At a port, the switches controlled by this phase-modulated gate drive produce an output (or back) voltage that (averaged over a half cycle of carrier) is proportional to the phase shift and thus to the input signal. The modulator-switch combination is thus a conformal voltage amplifier with tremendous power gain.

A two-input modulator produces a square-wave gate drive signal having a phase shift from null-phase that is proportional to the ratio (or in alternative form, the product) of its two inputs.

When a two-input modulator is used to control a port to be connected to a utility line (typically single phase 60 hz a.c.), then the scaled line voltage itself is suitably coupled to one modulator input. A slow error voltage is coupled to the other input. The counter emf produced by the port is thus, controlled to be a power-amplified picture of the line, with the amplitude of the counter emf controlled by the error voltage. The current in the line port is proportional to the difference between the impressed voltage and the counter emf, and therefore has the same waveform as the line voltage. A current waveform that is the same as the line voltage waveform constitutes a resistive equivalent circuit possessing a unity power factor. In the most usual case the slow error voltage is deceived as the amplified difference between the average voltage on the energy capacitor (suitably scaled) and the d.c. reference voltage.

When this action is understood, it becomes apparent that if the utility line were suddenly to be changed from a.c. to d.c. of either polarity, then the third, input line, port and its control would still function to extract, or to return, the proper current so as to maintain the energy capacitor at the desired average voltage.

Still further switching control permits a picture-of-the-a.c.-reference-voltage output voltage to be presented by the fourth output line, port, and to be maintained constant despite changes in load.

In order to implement this further switching control the power converter circuit still further includes (vii) a fourth control signal generator, responsive to any difference between the second external electrical potential and the selected second reference voltage, for producing variable-phase fourth control signals that cause the fourth port to couple the square wave to the second external electrical potential so as to maintain, to such extent as is possible, the voltage waveform of the second external electrical potential to be equivalent to the voltage waveform of the selected second reference voltage.

In other words, switching within the fourth, output port is controlled for the sake of the output voltage.

1.7 Switching Control Of Ports Within A Power Converter Of The Invention Produces A.C. Waveforms From Three-State Demodulated Signals The sequence, and phasing, of the switching control of the ports within the power converters of the present and related inventions is fundamental in permitting such power converters (i) to work flexibly and reliably without destructive current shorts or voltage pulses resultant from imperfectly coordinated commutation, and (ii) to produce (when called for) a.c. waveforms that are exceptionally clean (meaning exact, which can mean undistorted if the application so dictates) by virtue of being filtered versions of three-state demodulated waveforms.

In accordance with the present and related inventions, a power converter functioning as a virtual transformer between external electrical potentials includes (i) a transformer that has a plurality of inductively coupled windings. The power converter also includes (ii) a first variable port having four form A switches respectively controllable by switch control signals $A$, $\overline{A}$, $B$, and $\overline{B}$ to switch on and off. The four form A switches are connected by pairs that are respectively controllable by switch control signals $A$, $\overline{A}$ and $B$, $\overline{B}$ to create two form C switches. The two form C switches are connected as a first bridge circuit between a first one of the plurality of transformer windings, a filter including at least one inductor and first pair of terminals in which appears an electrical potential.

Some means must produce an essentially equal duty cycle constant amplitude square wave in the plurality of windings at the transformer, which equal duty cycle constant amplitude square wave will be inductively coupled to the first one of the plurality of transformer windings. In accordance with the general principles of the invention, this means is normally simply one or more additional, second, port(s) that is (are) properly controlled in its (their) switching so as to convert whatever voltage potential(s) (a.c., or d.c., or whatever) to which it (they) is (are) connected into the proper square wave within the transformer. One of the one or more second ports is a fixed d.c. port that couples a d.c. voltage into the square wave within the transformer. Note that the square wave beneficially causes the transformer duty cycle to equal 100%.

The switching control for both the first and one or more second ports, and for still additional ports, is produced in a switching control circuit. The switching control circuit includes three modulators and a free running signal generator. The free running signal generator produces simultaneously three types of outputs that are used by all three of the modulators.

A square wave signal output $C$ and its inverse $\overline{C}$ produced by the signal generator serve as gating signals used in all modulators. Signals $C$ and $\overline{C}$ also directly drive the at least one fixed d.c. port and are the source of the frequency and the phase of the power transformer excitation. Only the amplitude of the excitation can be influenced by other ports.

Signals $E$ and its inverse $\overline{E}$ produced by the signal generator are triangular waves with peaks at the transitions of $C$. One or both signals are used in single-input modulators.

Default drive signals produced by the signal generator are short pulses that occur at the time of the square wave ($C$) transitions. These are used in all modulators to insure proper treatment of off-scale modulator inputs.

The switch control circuit also includes an inverter producing the inverse of the reference voltage waveform so that both the reference voltage and its inverse can be used in the modulator. In an alternative form each modulator can instead use both signals $E$ and $\overline{E}$, and not use the inverted reference.

Continuing with the switching control circuit, a first modulator produces switch control signals $A_1$, $\overline{A}_1$, $B_1$ and $\overline{B}_1$ shifted from null-phase so that, when these signals are received by and used to drive the switches in the first port, the first port will produce at its output a three-state waveform that is demodulated from the square wave. When filtered and presented to the terminals of the first port, this three-state demodulated waveform is substantially equivalent to a reference waveform that is input to the modulator.

Within the first modulator, a switch drive signal $B_1$ generation subcircuit detects (i) a first intersection of the reference waveform and the carrier frequency waveform, and (ii) a temporally next-occurring second intersection of a one of the reference waveform and the carrier frequency waveform and the inverse of the other. The two intersections demark a respective beginning and end of switch control signal $B_1$. A switch drive signal $A_1$ generation subcircuit detects (i) a third intersection, temporally between the first and the second intersections, of a one of the reference waveform and the carrier frequency waveform and the inverse of the other waveform, and (ii) a temporally next-occurring fourth intersection of the reference waveform and the carrier frequency waveform. These two intersections demark a respective beginning and end of switch control signal $A_1$.

The control signals $A_1$, and $B_1$ are communicated in normal ($A_1$, $B_1$) and inverse ($\overline{A}_1$, $\overline{B}_1$) from the first modulator to the four switches of the first switching circuit. They are normally so communicated by being coupled through two switching control signal transformers.

The second and the third modulators, producing switch control signals that are respectively used to control switching in the commutating energy port and in the output port, function equivalently.

From the composite switch control a three-state, demodulated waveform—having when filtered an equivalent waveform to the reference waveform—is produced.

If the reference waveform input to the modulator is a picture-of-the-input-line waveform then the three-state waveform produced filters to yield a counter emf waveform that is equivalent to the waveform of the impressed voltage of an a.c. source.

If the reference waveform input to the modulator is a pure sinusoid, then a three-state waveform produced will filter to yield a substantially pure sinusoid, and so on.

The average amplitude, over any half cycle of the carrier waveform, of the produced three-state modulated waveform, and any filtered versions of such three-state modulated waveform, is controllable by varying the amplitude of either (i) the reference waveform or (ii) the carrier frequency waveform E. This duality is very useful; particularly because it is sometimes difficult and expensive to obtain a scaled version of a stochastic reference waveform with an electronic multiplier circuit.

In its preferred embodiment, a two-input modulator generates its own carrier frequency triangular wave from the square wave C input by using the second modulator input as an amplitude control for the triangular waveform. Variation in the amplitude of the triangular wave causes a corresponding variation in the phase of the switch control signals produced therefrom, and a corresponding variation in the duty cycle of the individual of the three-state demodulated waveform. This variation in the duty cycle of the pulses of three-state demodulated waveform will, if the three-state demodulated waveform is filtered, result in a corresponding variation in the amplitude of the resulting filtered waveform.

In order to make an amplitude control respond to load changes a negative feedback loop and a two-input modulator is employed.

Typically a filter circuit is used to filter the three-state demodulated waveform in order to produce the filtered waveform presented at the terminals of the power converter. An error signal is generated in an error circuit proportionately to the difference between the waveform presented at the terminals and the reference waveform that is produced by the reference waveform circuit. The variation in the amplitude of the triangular waveform is responsive to this generated error signal. Variation in the amplitude of the triangular waveform causes, as before, a corresponding variation in the phase of the switch control signals produced therefrom, and a corresponding variation in the duty cycle of the individual pulses of the three-state demodulated waveform. This duty cycle variation will, if the three-state demodulated waveform is filtered, result in a corresponding variation in the amplitude of the filtered waveform.

The entire process works alternatively, and equivalently, for amplitude scaling of the reference waveform instead of the triangular carrier waveform. In an alternative embodiment the two-input modulator will include a reference waveform amplitude scaling circuit. This circuit serves to vary the amplitude of the reference waveform produced by the reference waveform means. Variation in the amplitude of the reference waveform causes a corresponding variation in the phase of the switch control signals produced therefrom, and a corresponding variation in the duty cycle of the levels of the three-state demodulated waveform which will, if this three-state demodulated waveform is subsequently filtered, result in a corresponding variation in the amplitude of the filtered waveform.

2.0 Overview Of Power Conversion

Power converters in accordance with the present invention function to efficiently bidirectionally (i.e., reversibly) convert power between an electrical potential having any waveform to any number of other electrical potentials each having any desired waveform.

An exemplary power converter in accordance with the present invention is shown in a combined block and simplified schematic diagram within FIG. 1 in order that certain principles, and certain aspects, of the present invention may be introduced. The power converter includes a single power transformer T1 having at least three windings's, for example windings W1-W3. Each transformer winding is connected to an input/output port of the converter. Within the power converter of FIG. 1, a port P7 of a first type, called a "COMBINATION PORT" couples a voltage potential having a first waveform, called a "SINGLE PHASE A.C. LINE" to the transformer T of the power converter. A port P1 of a second type, called a "GENERAL PURPOSE PORT" couples a voltage potential of a determinable second waveform, called a "SIGNAL OUTPUT" to the transformer T of the power converter. A third port P4 of a type called "FIXED D.C. PORT" couples still another voltage potential, a FIXED D.C. VOLTAGE, to an associated winding of the transformer T.

To describe in the previous paragraph that the voltage potential is "called" something, and that it is "coupled", may seem stilted. It would be simpler to say that "an input single phase a.c. line waveform received at combination port P7 is switched under switching control within such combination port PT to produce a waveform in an associated winding of transformer T that, when inductively coupled to another winding connected to general purpose port P1 under its switching control, produces a signal output of a desired waveform."Unfortunately, a simplistic description of this type—although occasionally roughly accurate during operation of the power converter circuit—is inadequate to explicitly describe (i) the variety of waveforms with which the power converter circuit deals, and (ii) the bidirectional, i.e., reversible, manner in which it deals with such waveforms. Port P7 connects an electrical potential that is "called" a "SINGLE PHASE A.C. LINE" because such "SINGLE PHASE A.C. LINE" may be literally any waveform. It may be any a.c., d.c., combination a.c. and d.c., or stochastic voltage waveform. Similarly, the port P1 connects to a voltage potential that is "called" a "SIGNAL OUTPUT" because this "SIGNAL OUTPUT" may be of any waveform. Furthermore, the "SINGLE PHASE A.C. LINE" is not necessarily the "input", and the "SIGNAL OUTPUT" is not necessarily the "output". The power converter operates fully and completely bidirectionally, meaning reversibly. Therefore the ensuing explanation must be understood not in terms of "inputs", "outputs", and the "producing" of outputs from inputs, but rather as a dynamic process for the reversible transformation of electric potentials, and electric power, by a power converter functioning as a virtual transformer.

Figure 3A:
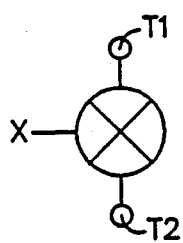
FIG. 3a and FIG. 3b respectively show a simplified schematic symbol and a corresponding electrical schematic of a bipolar bilateral switch that is used in ports, or switching circuits, of power converters in accordance with the present invention.
Figure 3B:
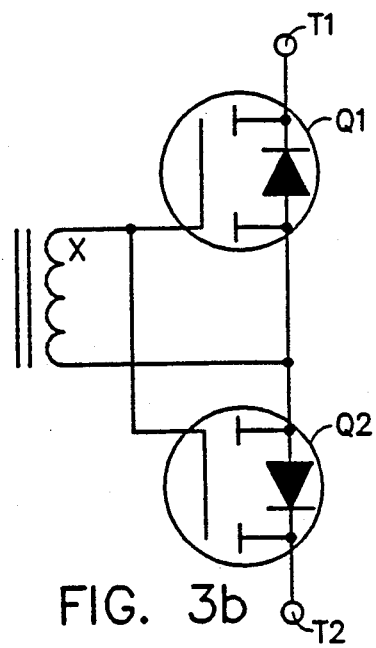
Figure 4:
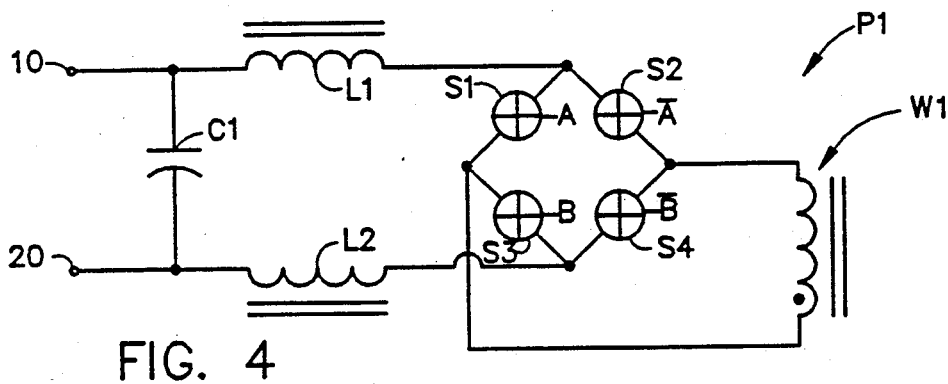
FIG. 4 is a simplified schematic of a particular port, called a "GENERAL PURPOSE PORT", used in certain embodiments of power converters in accordance with the present invention.
Figure 7:
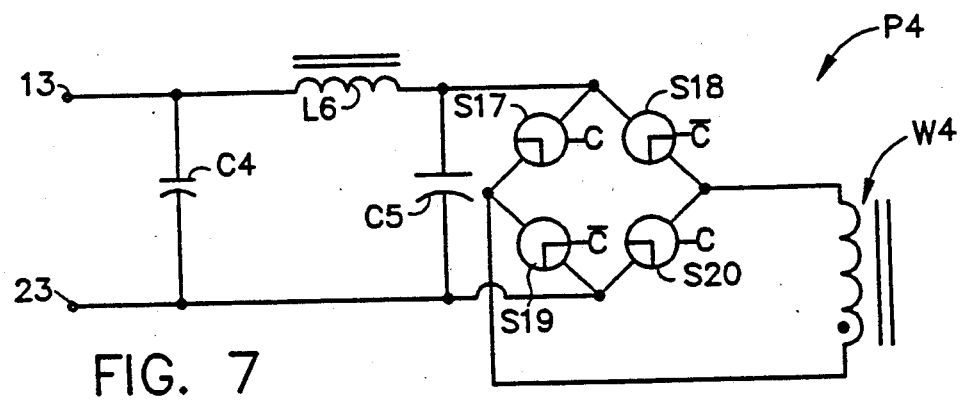
FIG. 7 is a simplified schematic of a particular port, called a "FIXED D.C. PORT", used in certain embodiments of power converters in accordance with the present invention.
Figure 9:
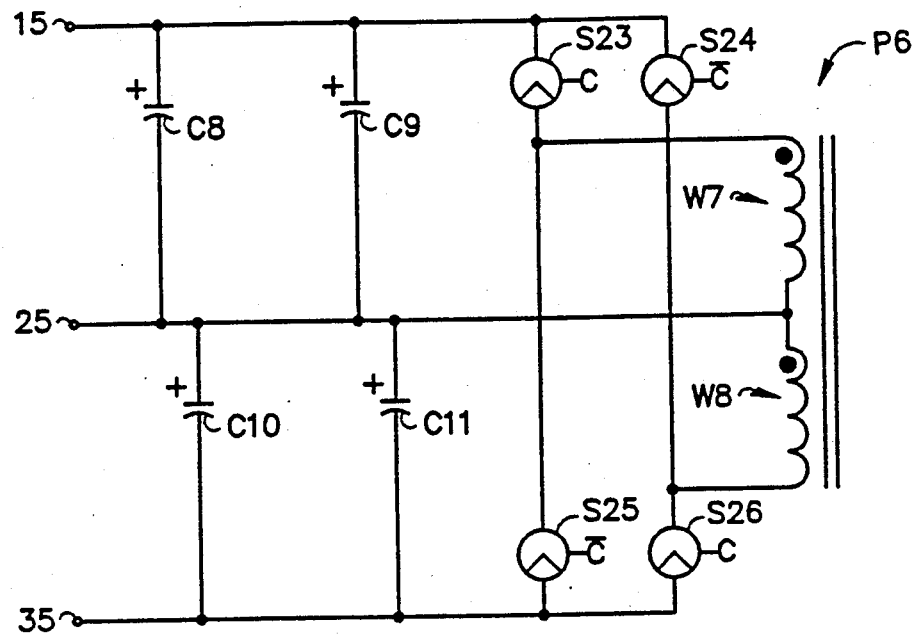
FIG. 9 is a simplified schematic of a particular port, called a "FIXED D.C. PORT ALTERNATE FORM DUAL OUTPUT", used in certain embodiments of power converters in accordance with the present invention.

The ports P1, P4, and P7 are respectively shown in the schematic diagrams of FIGS. 4, 7, and 9. The switches used within such parts are shown in FIGS. 2 and 3. Within FIG. 1 only the variable port P1 is shown in detail.

The switching control signals for the MOSFET switches within each of the ports P1, P4, and P7 are respectively developed in LINE MODULATOR M1 in combination with ENERGY MODULATOR M2, by direct extraction (detail circuit not shown) from a square wave developed by FREE RUNNING TRIANGLE AND SQUARE WAVE GENERATOR G1, and in modulator M3. The communication of the switching control signals from modulator M3 to port P1 is typical. Mainly, the switching signals—which in the case of $A_S$, $\overline{A}_S$ and $B_S$, $\overline{B}_S$ developed in modulator M3 are of variable phase—are driven in drivers D1, D2 and transformer-coupled in transformers CT1, CT2 to be applied to complementary form A switches. One switching control signal is applied, by the sense of the couplings transpiring in the coupling transformer, to two complementary switches in both a normal ($A_S$, $B_S$) and inverted ($\overline{A}_S$, $\overline{B}_S$) form.

The development in modulators M1–M3 of the switching control signals may be in response to open loop transfer functions, or closed loop feedback control. The modulator M3 is a single input modulator producing switching control signals to control switching in the switches of port P1 in accordance with a transfer function. This transfer function causes that a small voltage signal of arbitrary input reference waveform received at modulator M3 (an arbitrary voltage waveform is illustrated) will control switching in port P1 so as to cause such port to develop an output voltage waveform that is equivalent, meaning of the same shape but potentially greatly magnified in voltage and/or power, to the arbitrary input reference waveform. In the case of an output port P1, the arbitrary input reference waveform obviously contains the waveshape, frequency, amplitude, and phase that is desired to be output by the power converter.

Development of the switching control signals in modulator M3, and also in modulators M1 and M2, transpires by comparison of two signals to determine the intersections thereof. In modulator M3 the arbitrary input reference waveform is compared in both its normal, and inverted, forms with a carrier frequency waveform having a linear slope, preferably a triangular wave. The detected intersections of the two waveforms in voltage comparators determines the beginning, and the end, of each pulse of each of the switching waveforms $A_S$, $B_S$. The successive detections are used to toggle latches. The normal, and inverted, outputs of each latch are the variable-time-phased switching signal and its inverse.

The D.C. REFERENCE GENERATOR G2 is used to supply a d.c. reference voltage that is used in modulators M1 and M2 for controlling switching of the input line voltage, and the variable voltage across the energy capacitor, in COMBINATION PORT P7.

2.1 Switches Based On Rugged Power MOSFET Switching Elements

Ports within converters in accordance with the present invention are made from switches and sometimes, in the case of variable ports, also from an LC lowpass filter. Each port is electrically connected between a transformer winding and a terminal pair. Each terminal pair is an input/output to the power converter. A commutating energy port presents a special case where the terminal pair of a variable port is internally connected within the power converter to an energy-storing capacitor, inductor, or battery.

Switches used in the ports, or switching circuits, of power converters in accordance with the invention are defined as unipolar or bipolar depending on the voltage that they can block without conduction when the switch is OFF. Switches are defined as unilateral or bilateral depending on the direction of the current that they can conduct with a low voltage drop when the switch is ON. There are four possible combinations of these two characteristics. Only two types are used in the present invention. They are shown together with their block-diagram symbols and schematics in FIGS. 2 and 3.

Figure 2A:
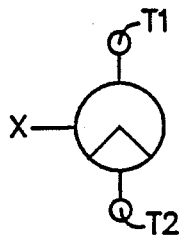
FIG. 2a and FIG. 2b respectively show the simplified schematic symbol, and a corresponding electrical schematic, of a unipolar bilateral switch that is used within ports, or switching circuits, of power converters in accordance with the present invention.
Figure 2B:
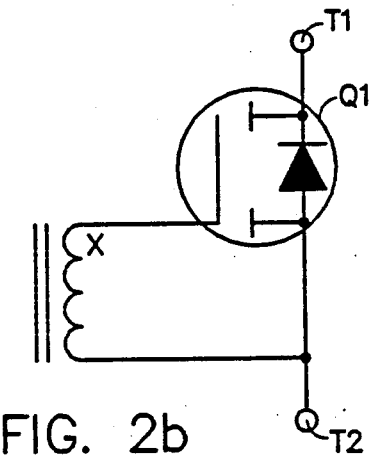

The symbol for a unipolar bilateral switch is shown in FIG. 2a. The schematic for the unipolar bilateral switch is shown in FIG. 2b. In both FIGS. 2a and 2b X represents a switching control signal A, $\overline{A}$, B, $\overline{B}$, C, or $\overline{C}$. A rugged Metal Oxide Semiconductor Field Effect Transistor (MOSFET) Q1 is connected at its source and drain between terminals 1 and 2, and is controlled for switching by the signal X coupled in transformer T and applied to its gate. When the switching signal X is as great as the specified (on) voltage of the MOSFET which will be the case when the switches of the present invention are desired to be turned on, then the unipolar bilateral switch will conduct in either direction between terminals 1 and 2.

The symbol for a bipolar bilateral switch is shown in FIG. 3a. The schematic for the bipolar bilateral switch is shown in FIG. 3b, where X represents a switching control signal as before. Two rugged MOSFETs Q1, Q2 are connected source-to-source between terminals 1 and 2. Note that the switching signal X coupled in transformer T is applied in a same sense to the gates of the two MOSFETs Q'sl's, Q2. As with the unipolar bilateral switch shown in FIG. 2, the bipolar bilateral switch shown in FIG. 3 conducts current in both directions between terminals 1 and 2 when switched "on".

As shown in FIGS. 2 and 3, power MOSFETs are the preferred switching elements used in the switches of ports of power converters in accordance with the present invention. They are the only power switching elements of which the inventors are aware of that turn off as fast as they turn on. N-CHANNEL MOSFET devices are preferred because all switching circuits within all ports of power converters in accordance with the invention will work with only one polarity of device, and N-CHANNEL parts have a better trade-off among $R_{ds}(on)$, gate capacitance, and price than do P-CHANNEL parts.

Currently available power MOSFETs have an internal intrinsic diode between drain and source. This diode is shunted by $R_{ds}(on)$ when the MOSFET is turned on. The normal current is through $R_{ds}(on)$ in all switching circuits. The intrinsic diode conducts significant current only during start-up, fault, or overload conditions. In the schematic representations to follow, the intrinsic diode is not shown, and the source can be distinguished from the drain as the element closest to the gate lead exit. A circle representing the MOSFET's case is shown for high current MOSFETs mounted on a heatsink, and is omitted for small signal MOSFETs. It is important to understand that $R_{ds}(on)$ is not discontinuous at zero voltage or at zero current. Like all resistors, the MOSFET conducts equally well for either polarity of voltage or current.

3. Ports or Switching Circuits

Ports used in power converters in accordance with the present invention are made from an LC lowpass filter and two or more, typically in groups of four, unipolar bilateral or bipolar bilateral switches described in the previous section. Variable ports are electrically connected between a transformer winding in which appears a relatively higher frequency square wave voltage waveform and a terminal pair in which appears an electrical potential having a relatively lower frequency voltage waveform, or even d.c. The switches are connected in a bridge, or in a center tap, configuration to the transformer winding. The LC lowpass filter is connected between the switches and the port's terminal pair.

When a voltage waveform having an a.c. component appears between the terminal pair, the switches are controlled with variable-phase switching control signals so as to couple the square wave appearing within the transformer winding into a three-state modulated signal. This three-state modulated signal must be filtered in order to appear as an a.c. waveform, and is so filtered by the LC lowpass filter. Accordingly, if a voltage waveform having an a.c. component is to be coupled, then the LC lowpass filter may be considered "necessary" insofar as any device connected to the terminal pair cannot be depended upon to itself filter the three-state modulated waveform. Conversely, if only a d.c. voltage waveform appears between the terminal pair then the LC lowpass filter is not necessary.

Generally, however, each variable port contains an LC lowpass filter as well as its switches, generally configured as a bridge, in order to (i) "filter" high frequency transients occurring in the electrical potential appearing at the terminal pair from being coupled to the square wave that appears within the transformer winding and, vice-versa, to (ii) filter the high frequency switching transients of the transformer winding's square wave from the electrical potential appearing at the terminal pair.

Fixed ports have no filter or at least no inductor at the switch end of the filter. The terminal voltage is always d.c. of substantially constant amplitude. The "coupling" consists of connecting the d.c. terminal voltage to the transformer winding in alternating sense at the carrier rate. The switch drive is always the C and $\overline{C}$ fixed phase signals.

The ports are accordingly very simple and economical: switches predominately in bridge configurations and an LC lowpass filter that is necessary only for variable ports.

Some typical ports used in power converters in accordance with the present invention are shown in FIGS. 4-10. Each port is controlled by a switching control signal, or gate drive, the origin of which, and the relationship of which to other control signals, is to be discussed later. For the moment, the general appearance of switching control signals A, B, and C may be momentarily observed in FIG. 12. Switching signal C is a fixed-phase gate drive signal that is in-phase with the square wave on any power transformer winding (dot end with respect to undot end). Signal $\overline{C}$ is its inverse. Signal A is a variable-phase gate drive signal whose home, null, or zero phase lags signal C by 90°. Signal $\overline{A}$ is its inverse. Signal B is variable-phase. It's home phase is the same as signal A. When carrying modulation, it lags home phase by as much as signal A leads, and vice versa. Signal $\overline{B}$ is its inverse.

(Strictly speaking, phase applies only to sinusoids. Because no corresponding term is in common use for square waves, phase lag (lead) for square waves is defined in this specification as: [360×per-unit-period] times delay (advance) expressed in degrees [°].)

3.1 General Purpose Port

A GENERAL PURPOSE PORT P1 is shown in FIG. 4. can provide input/output connection for d.c. of either polarity, a.c. of any frequency or phase, or any composite a.c. and d.c. The waveform of the output voltage or of the counter emf presented between the terminal pair 10, 20 depends on the modulation of the phase angle of the A, $\overline{A}$, B and $\overline{B}$ gate drive signals.

In the GENERAL PURPOSE PORT P1 four MOSFET form A switches S1-S4 are connected in a bridge configuration between a transformer winding W1 and a filter connected to a pair of terminals 10, 20 in which appears a voltage potential. Each MOSFET form A switch S1-S4 is a bipolar bilateral switch consisting of two series-connected, common-gate-signal-controlled, power MOSFETs. The LC lowpass filter is implemented from capacitor C and inductors L1, L2. The inductor L2, shown in phantom line, may be omitted (replaced by a short) depending on second order effects such as stray capacitance.

A typical MOSFET in a GENERAL PURPOSE PORT connected to a 120 v.a.c. 60 Hz line would be GE Semiconductor type IRFP 250 R, a rugged 30A 300V N-channel power MOSFET in a TD-247AB case. MOSFETs of this performance cost approximately ten dollars each circa 1989.

A typical inductor L1 for filter service is wound to order on a powdered iron core. One suitable type is Micrometals part no. T200-2.

3.2 General Purpose Port Alternate Form

Figure 5:
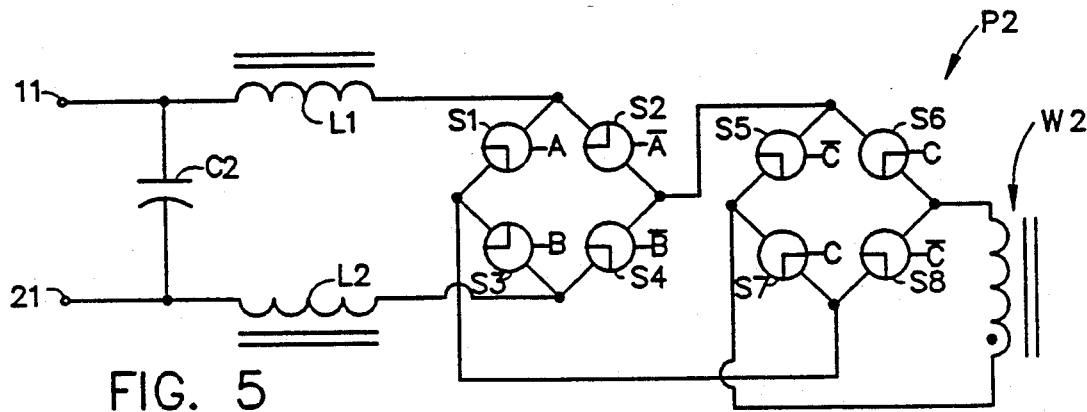
FIG. 5 is a simplified schematic of a particular port, called a "GENERAL PURPOSE PORT ALTERNATE FORM", used in certain embodiments of power converters in accordance with the present invention.

A GENERAL PURPOSE PORT ALTERNATE FORM P2 is shown in FIG. 5. This port P2 can do all of the same things as the GENERAL PURPOSE PORT. It uses eight unipolar switches instead of four bipolar switches, resulting in the same MOSFET count. It has two advantages over the GENERAL PURPOSE PORT P1 and one known disadvantage.

One advantage is that the bridge demodulator waveform spends about half of its time in the null state. In this state, the inductor current flows through two (2) FETs in series instead of four (4).

The other advantage occurs when a commutating energy port and a general purpose port are combined to run from a single transformer winding. In this case, to be shown in FIG. 10, fewer total FETs are used if the general purpose port is of the alternate form.

The disadvantage to the GENERAL PURPOSE PORT ALTERNATE FORM P2 is that more gate drive transformer windings are required.

In the GENERAL PURPOSE PORT ALTERNATE FORM P2, a first set of four unipolar bilateral switches S5-S8 are connected as a first bridge to an LC lowpass filter that in turn connects to a pair of terminals 11, 21. Meanwhile a second set of four unipolar bilateral switches S9-S12 are connected as a second bridge between the first bridge and a transformer winding W2. As with the GENERAL PURPOSE PORT P1, an LC lowpass filter is made from a capacitor C2, a first inductor L2, and a second inductor L4 (shown in phantom line) which may be omitted (replaced by a short) depending on second order effects such as stray capacitance.

3.3 Variable D.C. Port

Figure 6:
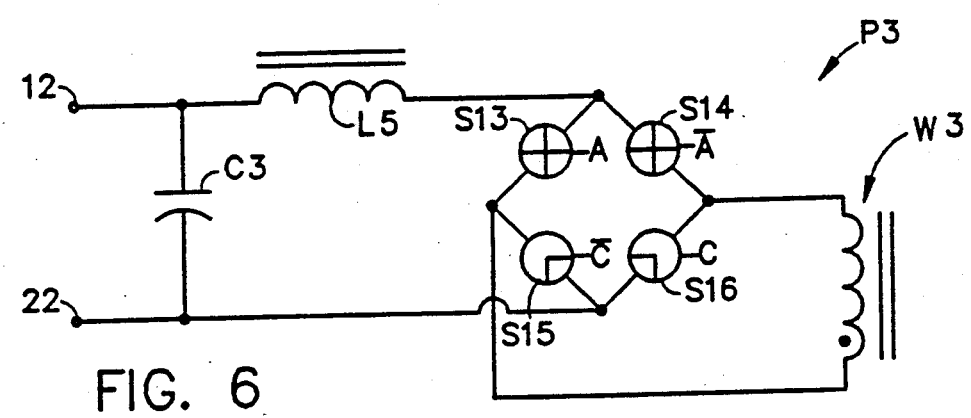
FIG. 6 is a simplified schematic of a particular port, called a "VARIABLE D.C. PORT", used in certain embodiments of power converters in accordance with the present invention.

A VARIABLE D.C. PORT P3 is shown in FIG. 6. The polarity of this port is fixed. Null modulation of this port produces half of the maximum output. This form of port may be used for commutating energy storage.

In the VARIABLE D.C. PORT P3 two bipolar bilateral switches S13, S14 and two unipolar bilateral switches S15, S16 are connected as a bridge between a transformer winding W3 and a pair of terminals 12, 22. Each bipolar bilateral switch S13, S14 is opposed to a unipolar bilateral switch S15, S16 in the bridge. Capacitor C3 and inductor L5 form a lowpass filter.

3.4 Fixed D.C. Port

A FIXED D.C. PORT P4 is shown in FIG. 7. This is the most efficient port. The output or back voltage across terminals 13, 23 is related by the turns ratio of the high frequency power transformer (of which one only winding W4 is shown) to the output of every other FIXED D.C. PORT P4, and to the maximum peak output of every GENERAL PURPOSE PORT P1. The filter element closest to the switches is a shunt capacitor C5. The optional inductor L6 and capacitor C4 are much smaller than those in the other port circuits, and are so illustrated, since the ripple is slight and has a very high frequency spectrum. Only one FIXED D.C. PORT P4 per power converter can be regulated against port current.

In the FIXED D.C. PORT P4 four unipolar bilateral switches S17-S20 are connected as a bridge between a transformer winding W and a pair of terminals 13, 23.

3.5 Fixed D.C. Port Alternate Form

Figure 8:
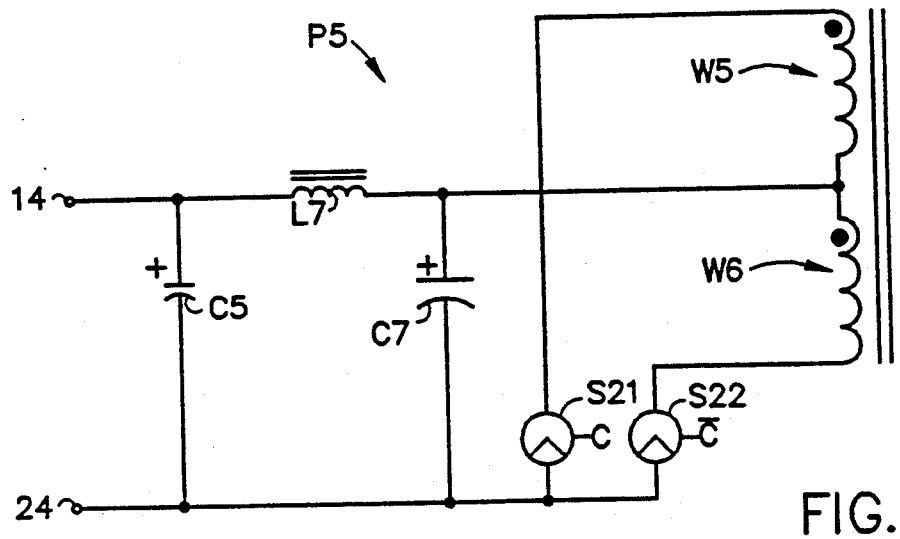
FIG. 8 is a simplified schematic of a port, called a "FIXED D.C. PORT ALTERNATE FORM", used in certain embodiments of a power converter in accordance with the present invention.

A FIXED D.C. PORT ALTERNATE FORM P5 is shown in FIG. 8. This form of port has poorer transformer utilization but fewer MOSFETs. In use as an output port to a power converter it cannot be turned off by removing the gate drive due to the intrinsic diodes.

The FIXED D.C. PORT ALTERNATE FORM P5 uses two unipolar bilateral switches connected in a center tap configuration between transformer windings W5, W6 and terminals 14, 24. Capacitor C2 is the filter element closest to the switches. Optional filter elements L and C1 are relatively small.

3.6 Fixed D.C. Port Alternate Form Dual Output

A FIXED D.C. PORT ALTERNATE FORM DUAL OUTPUT P6 is shown in FIG. 9. This form of port uses only four MOSFETs and a center-tapped winding to produce complimentary equal outputs. It cannot be turned off by removing gate drive.

In the FIXED D.C. PORT ALTERNATE FORM DUAL OUTPUT P6 unipolar bilateral switches S23-S26 are connected by pairs S23, S24 and S25, S26 in center tap configuration between transformer windings W7, W8 and respective terminals pairs 15, 25 and 25, 35. Capacitor C1 smooths the d.c. signal at terminal pair 10, 20 while capacitor C2 do likewise for the d.c. signal at terminal pair 25, 35. Optional additional filtering is not shown.

3.7 Combined Commutating Energy And General Purpose Port

Figure 10:
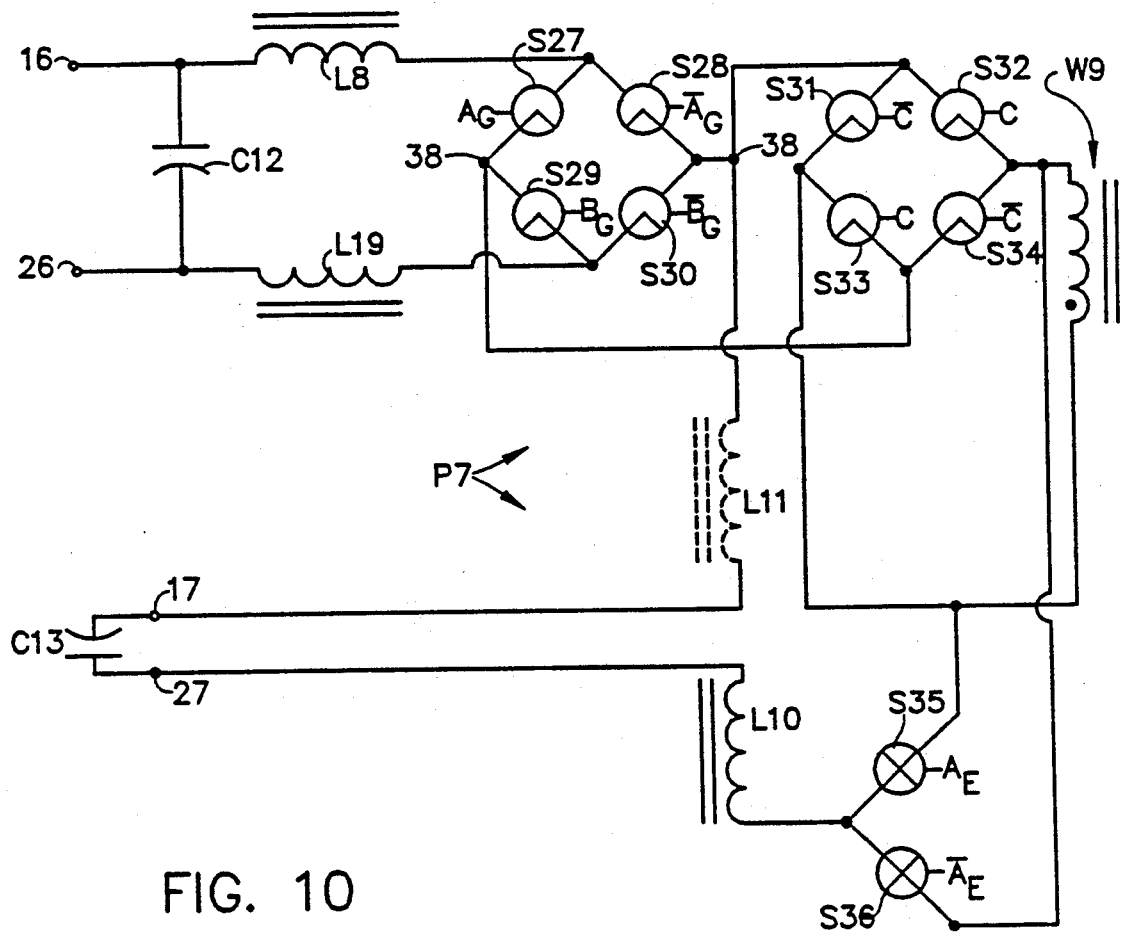
FIG. 10 is a block diagram of a particular port, called a "COMBINED COMMUTATING ENERGY AND GENERAL PURPOSE PORT", used in certain embodiments of power converters in accordance with the present invention.

A COMBINED COMMUTATING ENERGY AND GENERAL PURPOSE PORT P7 is shown in FIG. 10. Note that the functions of both ports run from a single winding of the transformer and that the two switches at the lower right have counterparts in both the VARIABLE D.C. PORT P3 (shown in FIG. 6) and in the GENERAL PURPOSE PORT ALTERNATE FORM P2 (shown in FIG. 5). Note further that current delivered from the energy capacitor C13 (not part of port P7) to the line terminals 17, 27 does not flow through the transformer winding W9.

In the COMBINED COMMUTATING ENERGY AND GENERAL PURPOSE PORT P7 a first set of four solid state unipolar bilateral switches S27-S30 are connected as a first bridge circuit between a first pair of terminals 16, 26 and a second set of four solid state unipolar bilateral switches S31-S34 that are connected as a second bridge circuit between the first bridge circuit and transformer winding W9. Two series-connected solid state bipolar bilateral switches S35, S36 are connected in a center-tap circuit relationship to the transformer winding W9. An inductor L3 is connected between the center tap of the bipolar bilateral switches S8, S9 and a one point 38 of the two points 38, 39 of connection between the first bridge circuit and the second bridge circuit. The inductor(s) L10 (L11) may be connected to either side of terminals 17, 27 and capacitor C13, or may be split between both sides. Capacitor C13 serves as an energy storage capacitor. As before, capacitor C13 and inductor(s) L40 (41) (optional second inductor L11 being shown in phantom line) form a lowpass filter.

A typical energy storage capacitor C2 is 2200 μF of approximate size 1.38" diameter by 1.57" length. Spague Electric Co. part no. 81D222M100MD2 is suitable.

A typical MOSFET used in the switches S27-S34 of the COMBINED COMMUTATING ENERGY AND GENERAL PURPOSE PORT P7 is GE Semiconductor type IRFP150R, a 40A 100V N-channel rugged power MOSFET in a TD-247AB case.

4.0 Fixed-Phase And Variable-Phase Switching Control

The ports P1, P4, and P7 shown in FIG. 1, and the ports P1-P7 shown in the FIGS. 2-10 discussed in the previous section 3, include switching circuits that are controlled for switching in order to couple an electric potential, which may be an external electric potential, of any voltage waveform into a winding of a transformer in which appears an equal duty cycle substantially constant amplitude square wave.

The block diagram of the POWER (SERVO) AMPLIFIER shown in FIG. 1 shows three separate modulators M1-M3 and an associated three separate sets of drive signal names e.g.: $A_L$, $A_E$, $A_S$ for each of the three control loops.

The present section 4 discusses the drive signals, or switching waveforms, in greater detail, and shows their effect to produce three-state demodulated waveforms (which may be filtered to produce waveforms with an a.c. component).

Figure 11:
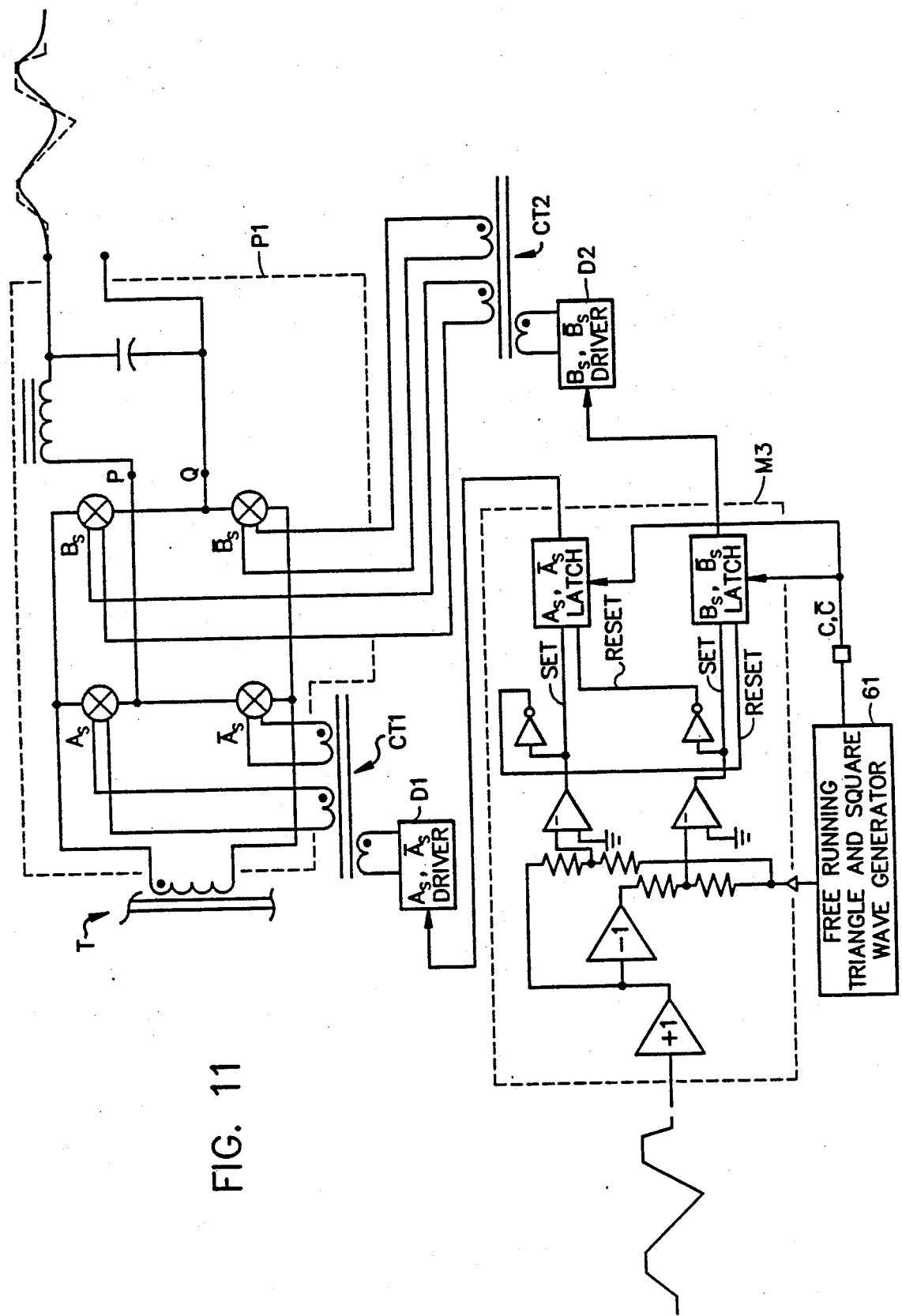
FIG. 11 is a schematic diagram of a signal modulator, of a general purpose port, and of their surrounding circuitry, all previously seen in FIG. 1, for purpose of explaining the control of the general purpose port by the signal modulator in order to demodulate a power waveform into a selectable output voltage waveform in accordance with the present invention.

4.1 Exemplary Switching Control Of A General Purpose Port To Couple An Arbitrary "Output" Voltage Waveform FIG. 11 is a subset of previous FIG. 1 particularly showing the (output) signal modulator M3 of the control circuit controlling switching within a general purpose port P1 particularly in use for producing an "output" voltage. (Because all coupling, and all power transfer, in power converters in accordance with the present invention will be understood to be fully bidirectional, words like "output" are only relative, and suggestive, and are not delimiting.)

As explained in conjunction with FIG. I, the modulator M3 compares an arbitrary input reference waveform with a triangular carrier waveform received from FREE RUNNING TRIANGLE AND SQUARE WAVE GENERATOR GI to develop the switching control signals $A_S$, $\overline{A}_S$, $B_S$ and $\overline{B}_s$ that are transformer-coupled to the switches of output variable port P1.

4.2 Timing Diagram Of The Exemplary Switching Control

Figure 12:
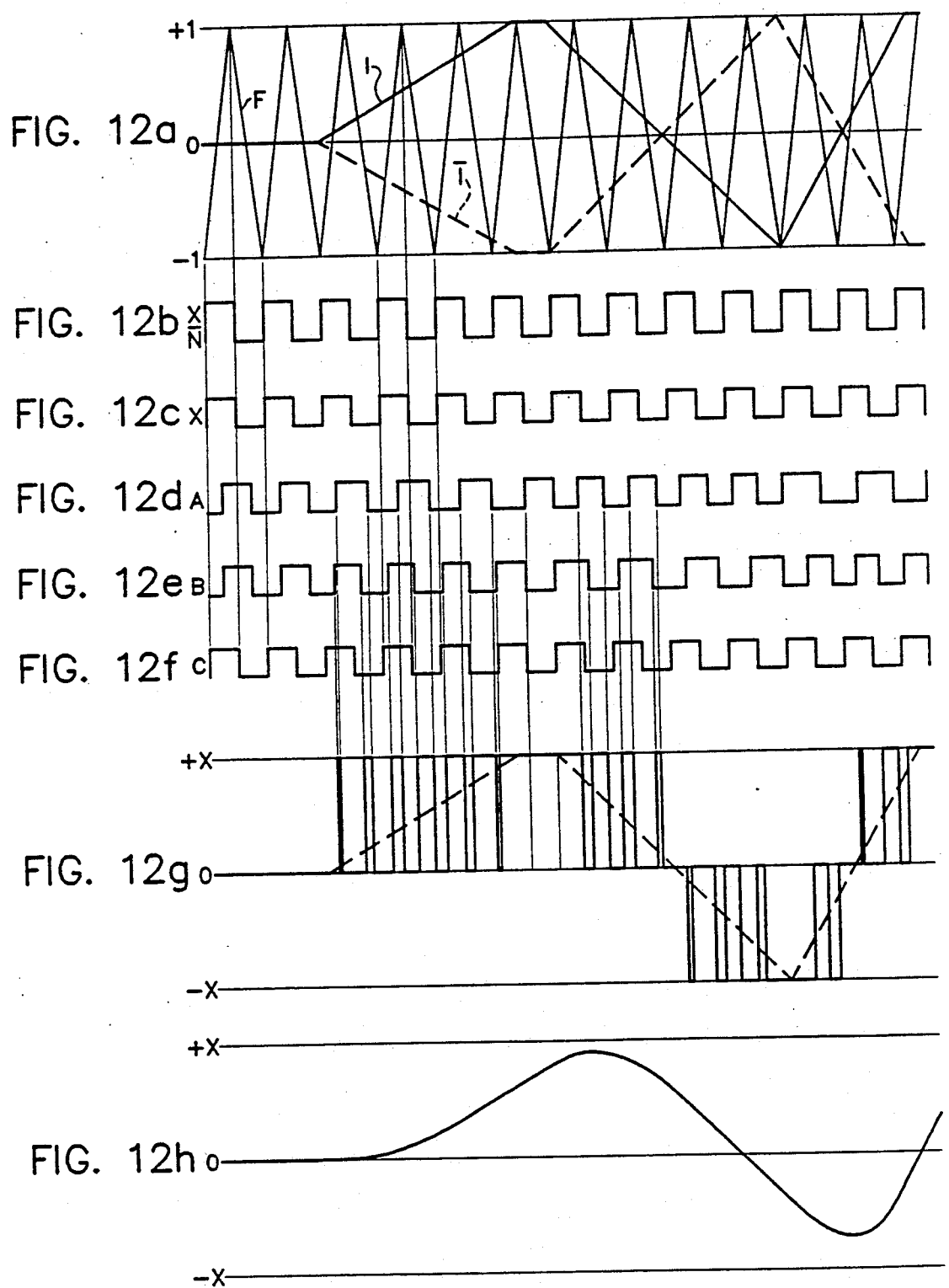
FIG. 12, consisting of FIG. 12a through FIG. 12h, is a timing diagram, showing in FIG. 12a a triangular carrier waveform F together with an arbitrary reference waveform I and its inverse Ī, showing in FIG. 12b a first, X/N, transformer excitation voltage appearing in a first winding of the transformer, showing in FIG. 12c a second, X, transformer excitation voltage appearing in a second winding of the transformer, showing in FIG. 12d a first variable-phase gate drive waveform A generated from certain intersections of the carrier waveform F with the normal I and inverse Ī reference waveforms shown in FIG. 12a, showing in FIG. 12e a second variablephase gate drive waveform B generated from certain other intersections of the carrier waveform F with the normal I and inverse Ī reference waveforms shown in FIG. 12a, showing in FIG. 12f a fixed-phase gate drive waveform C, showing in FIG. 12g a three-state demodulated output voltage, or counter emf, produced by power demodulator switches together with a phantom line representation of the arbitrary waveform that such three-state modulated signal represents, and showing in FIG. 12h a filtered output voltage, or counter emf, waveform with exaggerated smoothing and lag because the frequency of the carrier waveform F, shown in FIG. 12a, is much lower than would normally be used for a reference waveform I, also shown in FIG. 12a, of the indicated frequency.

FIG. 12, consisting of FIG. 12a thru FIG. 12h, is a timing diagram of the action of the signal modulator M3 previously seen in FIGS. 1 and 11.

FIG. 12 a shows the arbitrary input waveform I (suitably amplified) and the inverse $\overline{I}$ of the input waveform. The inverse $\overline{I}$ waveform is shown because the time of the "equal but opposite" intersection of this waveform with carrier frequency waveform F is the same as the time of the intersection of the waveform I with the inverse $\overline{F}$ of the carrier waveform F (not shown), and the intersection is much easier to see on the graph.

The intersections of one of the carrier F or input I waveforms and the inverse of the other waveform, i.e., either $\overline{F}$ or $\overline{I}$, will determine the beginning, and the end, of each of the gate control switching signals A (shown in FIG. 12d) and B (shown in FIG. 12d). In the modulator circuit M3 shown in FIGS. 1 and 11 it is the input waveform I that is inverted (to $\overline{I}$). The carrier waveform F is not inverted in development of gate control switching signals A, B. However, it is not always easy to invert or input waveform I, especially if it is stochastic. An expensive electronic inverter may be required. Therefore it must be realized that the exact same intersections, defining the switching signals A and B, are determined if input signal I is not inverted, but instead has its intersections with both the carrier waveform F and the inverted carrier waveform $\overline{F}$ determined. The one case of waveforms F, I, and $\overline{I}$ shown in FIG. 12a is thus equivalent to the other case (not shown) of waveforms F, $\overline{F}$, and I.

The carrier frequency waveform F is a preferably triangular waveform having an equal frequency and a 50% duty cycle, as shown. Its peaks define the switching signal C (shown in FIG. 12f) in a manner that is illustrated for one cycle of each waveform F, C. The frequency of carrier waveform F is normally many times the frequency of the fastest time-variable component of the input waveform I, and is typically approximately 80 kHz. The frequency multiple between waveforms F and I is much reduced in FIG. 12 in order that time relationships may be more clearly observed.

The carrier waveform F normally has equal or greater amplitude to the input waveform I ($\overline{I}$) at the comparators where the waveforms are compared. If this condition does not prevail then the power converter continues to work only a slight clipping, or distortion, of its counter emf, or output voltage, produced in accordance with the input waveform may occur.

By action of the FIXED D.C. PORT P4 (shown in FIG. 1) the switching waveform C produces an equal duty cycle substantially constant amplitude square wave, of which waveforms X/N and X respectively shown in FIGS. 12b and 12c are exemplary, within the several windings of the power transformer. The relative amplitude of the square wave of any winding will be in proportion to the turns ratio of that winding to the turns of the winding with maximum turns.

The variable-phase switching control signal A (shown in FIG. 12d) has a null phase that lags the phase of the square waves X, X/N across the transformer windings by 90°. The switch control signal A is generated by detecting (i) an intersection of a one of the reference waveform and the carrier frequency waveform and the inverse of the other waveform, and (ii) a temporally second next-occurring intersection of the reference waveform and the carrier frequency waveform, as a respective (i) beginning and (ii) end of switch control signal A.

The variable-phase switching control signal B has a null phase that lags the null phase of the square waves X, X/N by as much as the null phase of signal A leads the null phase of square waves X, X/N. The switch control signal B is generated by detecting (i) a first intersection of a one of the reference waveform and the carrier frequency waveform and the inverse of the other waveform, and (ii) a temporally next-occurring second intersection of the reference waveform and the carrier frequency waveform as a respective (i) beginning and (ii) end of switch control signal B.

Both the switch control signals A, B are communicated in normal A, B and inverted $\overline{A}$, $\overline{B}$ form from their generation to the switches of the port. The switch control signals A, $\overline{A}$, B and $\overline{B}$ are in a phase relationship so that, when received by and used to control switching in the switches of the port, the port will produce in its pair of terminals the three-state modulated waveform shown in FIG. 12g. This three-state modulated waveform that filters to be equivalent to the to the reference waveform I including in the shape and distortion thereof. The filtered three-state modulated waveform is shown in FIG. 12h.

The three-state modulated waveform shown in FIG. 12g is the output produced at point P with respect to point Q in FIG. 11 by the switches driven by switch control signals A and B.

The effect of the low pass filter is shown in FIG. 12h. As previously stated, the frequency of carrier waveform F shown is much lower than would really be used with the input waveform I. Therefore, the filter delay and distortion shown in much greater than would be the case in a typical real system.

Figure 13:
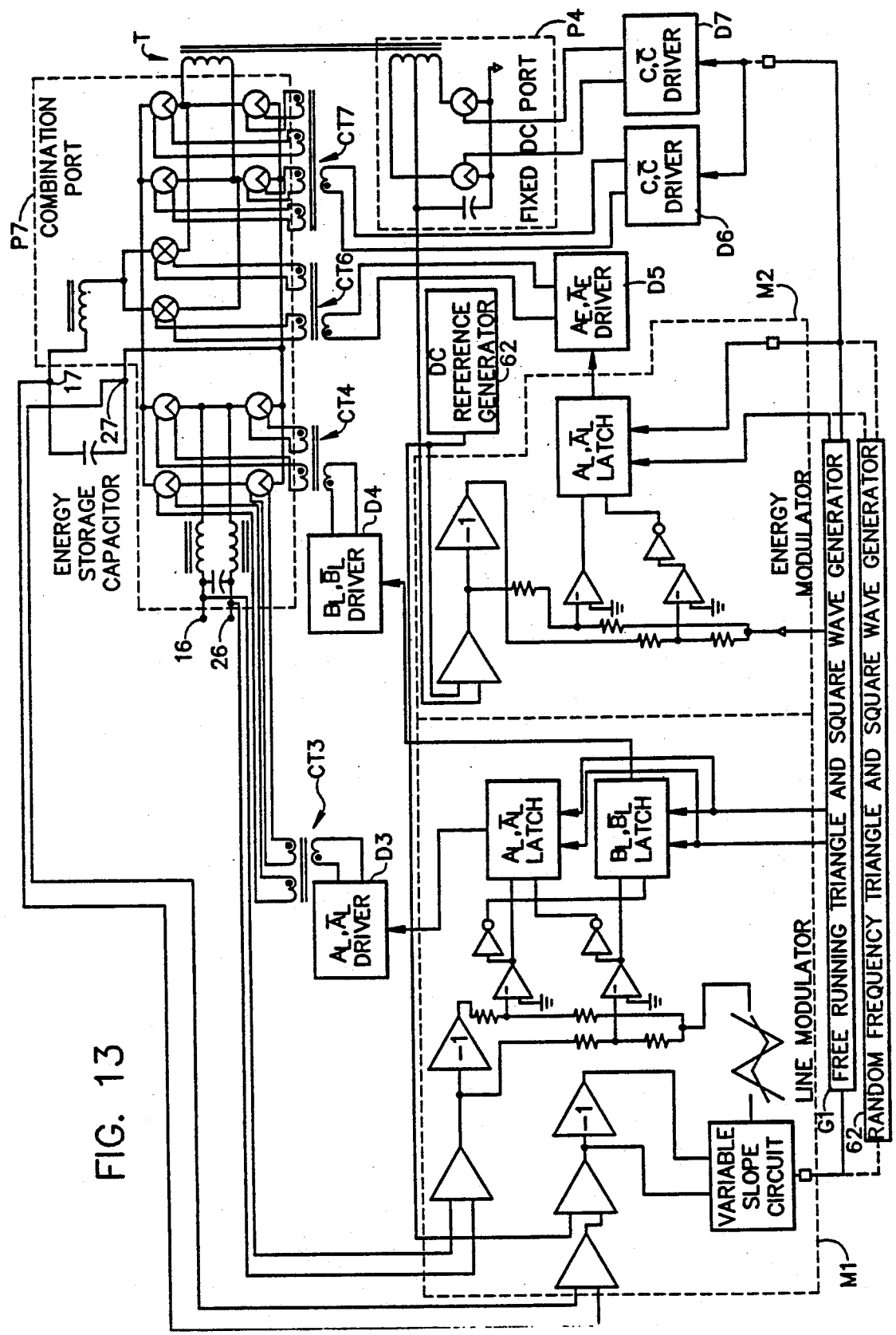
FIG. 13 is a combination block and simplified schematic diagram of the line and energy storage portion of a particular power converter, mainly a power (servo) amplifier, in accordance with the present invention, which converter was previously seen, in part, within FIGS. 1 and 12.

4.3 Schematic Diagram Of The Signal Modulators Controlling The Combination Port, And Of The Combination Port And The Fixed D.C. Port FIG. 13 is a schematic diagram of the modulators M1 and A2, and of the COMBINATION PORT P7 and the FIXED D.C. PORT P4, previously seen in FIG. 1. The LINE MODULATOR M1 is a two-input modulator comparing a scaled alternating current input voltage at terminals 16, 26 to a triangular carrier wave that is of adjusted slope. The slope adjustment of the triangular wave is performed in a VARIABLE SLOPE CIRCUIT in accordance with an error voltage (and the inverse of this error voltage) that is developed as the difference between the voltage on the ENERGY STORAGE CAPACITOR and an immutably fixed d.c. reference voltage output from the D.C. REFERENCE GENERATOR. The switching control signals $A_L$, $\overline{A}_L$ and $B_L$, $\overline{B}_L$ developed in LINE MODULATOR M1 are respectively driven by DRIVERs D3, D4 and respectively coupled in coupling transformers CT3, CT4 to drive the switches of a first section of COMBINATION PORT P7. As may be noted by momentary reference to FIG. 10, these switches connect through an LC filter to terminals 16, 26 in which appear an alternating current input voltage.

The ENERGY MODULATOR M2 is a single input modulator directly developing an error voltage as the difference between the d.c. voltage coupled to, and by, FIXED D.C. PORT P4 and the immutably fixed d.c. reference voltage developed by D.C. REFERENCE GENERATOR G2, normally a simple zener diode.

The switching control signals $A_E$, $\overline{A}_E$, are developed by comparison of this error voltage, appropriately scaled, with the triangular carrier waveform, are driven in DRIVER D5, and are transformer coupled in coupling transformer CT6 to drive two more of the switches within COMBINATION PORT P7.

The final two switches of COMBINATION PORT P7, and the two switches of the FIXED D.C. PORT P4, are driven directly by control signals C as developed in the FREE RUNNING TRIANGLE AND SQUARE WAVE GENERATOR GI as the peaks of the triangular carrier waveform, and as driven respectively by DRIVERS D6, D7.

A RANDOM FREQUENCY TRIANGLE AND SQUARE WAVE GENERATOR shown in phantom line is an alternative to the FREE RUNNING TRIANGLE AND SQUARE WAVE GENERATOR and produces carrier frequency waveforms of swept, or preferably randomized, frequency over a band. Operation of power converters in accordance with the present invention is insensitive to carrier (clock) frequency, and to variations in this frequency, over a broad range—so long as the carrier frequency remains suitably, normally many multiples, higher than the highest frequency component of any electric potential to be converted. Obviously the absolute timing of all switching control waveforms, and the switched signals produced therefrom, is ultimately dependent upon the carrier frequency, as illustrated in FIG. 12. Randomizing the carrier frequency within a band causes the power converter to produce only white noise within a corresponding band. Power converters in accordance with the present invention can thus be controlled so as not to exhibit pronounced spectral peaks in their broadband or narrowband conducted or emitted noise. Their almost total lack of any electromagnetic signature makes them suitable for military purposes where they evade easy remote detection by either their conducted, or as is more common radiated, noise profiles.

Figure 14:
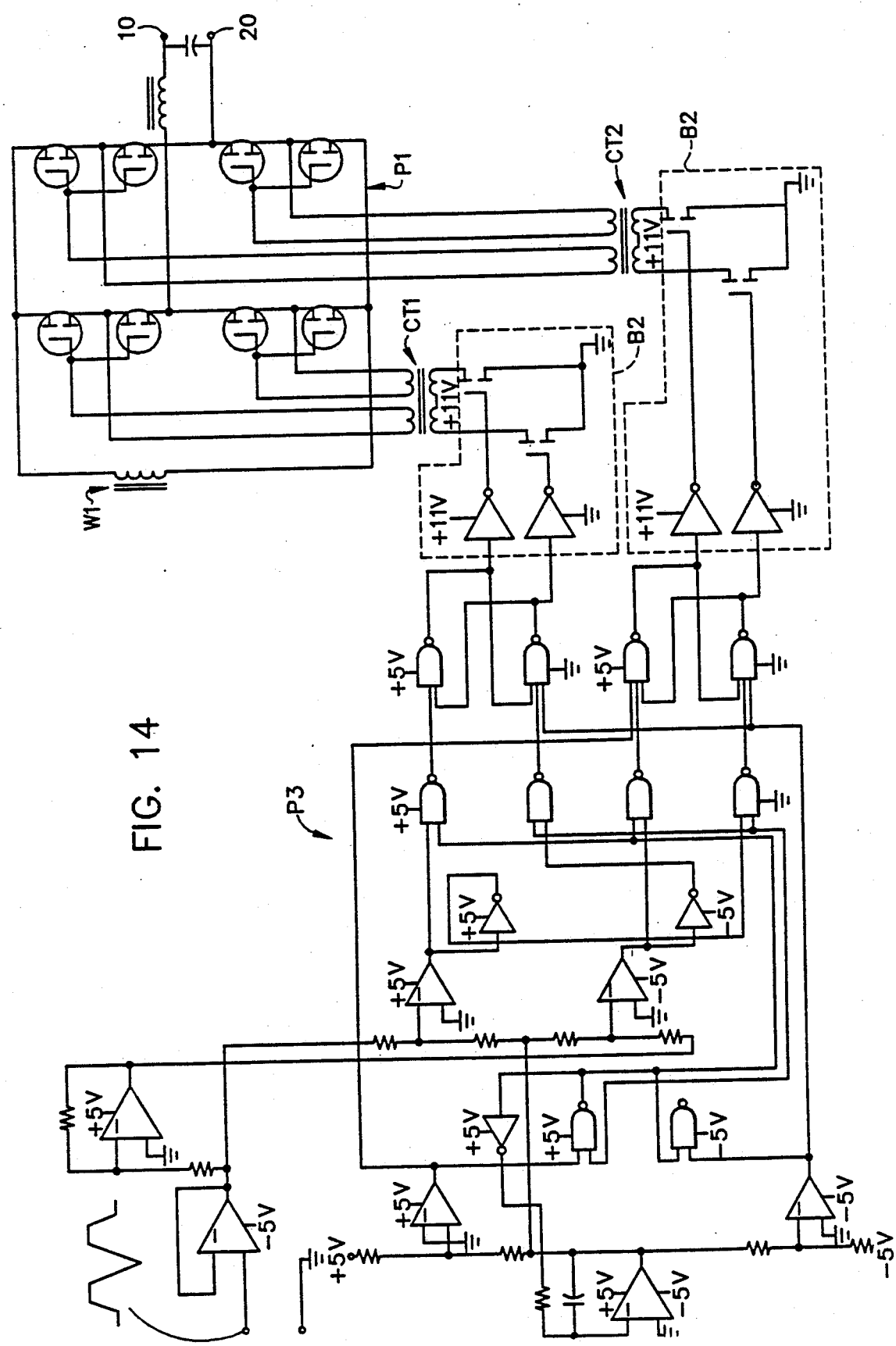
FIG. 14 is a detailed schematic diagram of the control circuitry of the power (servo) amplifier previously seen in FIGS. 1 and 13.

4.3 Detail Schematic Diagram Of The Signal Modulator Producing The Exemplary Switching Control, And Of The General Purpose Port Controlled Thereby FIG. 14 is a detail schematic of a circuit in conformance with the block diagram of FIG. 11. The best comparators known for use in this circuit use plus and minus 5 volt supplies for their operation, but their outputs are confined to the zero to plus 5 volt range. Accordingly, digital circuitry that runs from the plus 5 volt supply only, and analog circuitry that runs from plus and minus 5 volts, is used. In the one case shown in the schematic of FIG. 14 where a digital output drives analog circuitry, a special level translating inverter is used.

The analog signals may occupy almost all of the power supply range. The comparators do not have sufficient common mode input range to extract differences (crossings) directly. Accordingly, summing comparators formed by grounding one comparator input and attaching two resistors to the other input are used. These comparators switch at "equal but opposite inputs" rather than at equal inputs (crossings).

5.0 Embodiments Of Power Converters, Including Discussion Of The Multiple Control Loops For Controlling Switching Operations In Each Such Embodiment The block diagrams of this section 5 are highly simplified. No attempt is made to describe the current limit functions some of which may be local to some of the switches. All of the block diagrams describe embodiments of power converter circuits in the full "RUN" state. Most of the power converter circuits need an auxiliary power supply for housekeeping power and a startup sequencer to get to the "RUN" condition. Control circuits, in particular modulators, have been discussed in detail in previous section 4.

5.1 Embodiment Of The Power Converter As A SIMPLE FREQUENCY CHANGER

Figure 15:
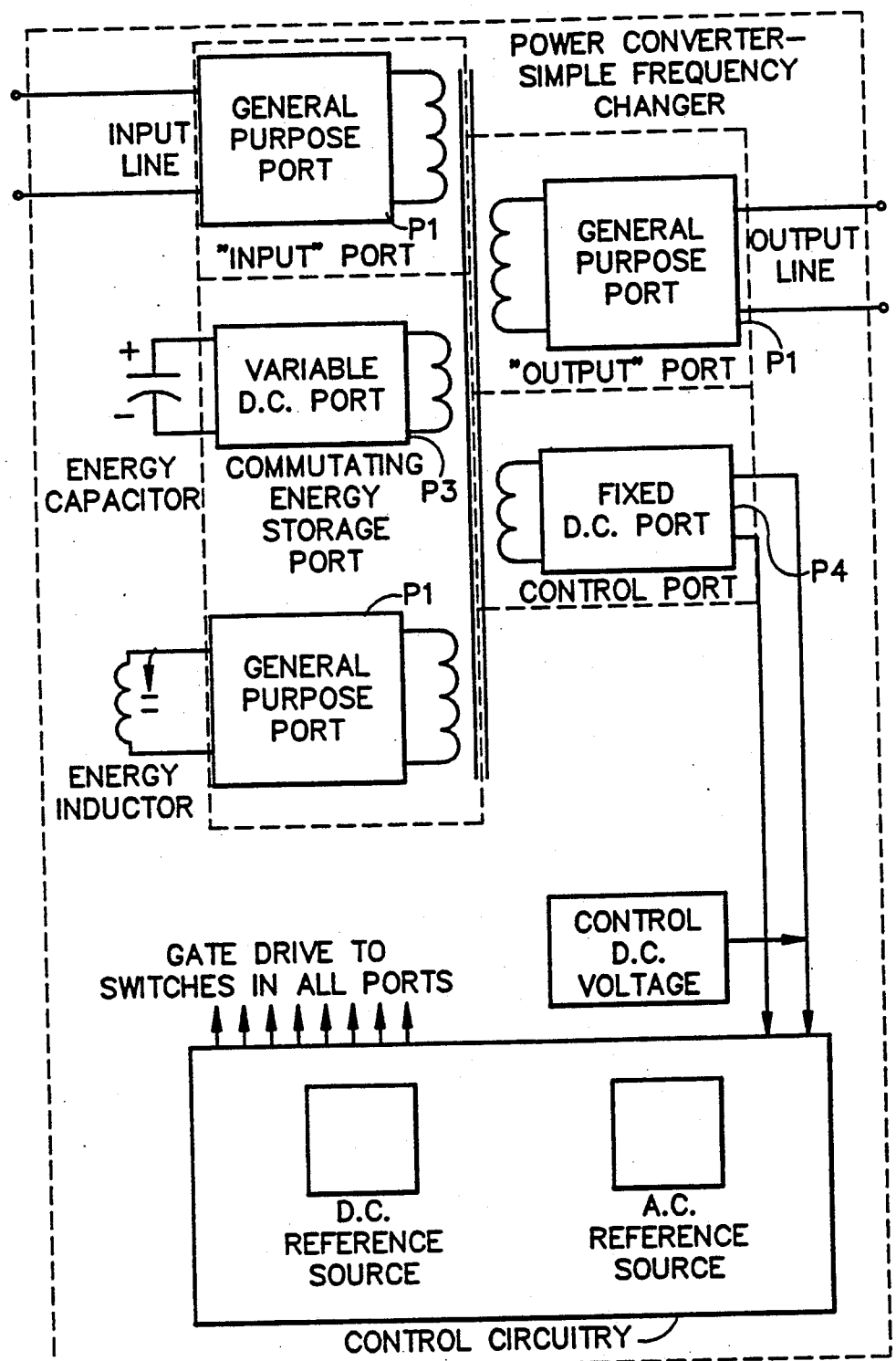
FIG. 15 is a block diagram of a particular embodiment of a power converter, called a "SIMPLE FREQUENCY CHANGER", in accordance with the present invention.

A BLOCK DIAGRAM of an embodiment of the power converter in accordance with the present invention as a SIMPLE FREQUENCY CHANGER is shown in FIG. 15. This embodiment illustrates the need for commutating energy storage and some of the uses of multiple control loops. This same embodiment has previously been shown in FIG. 1, and, in certain of its portions, in FIG. 11.

Since the frequency of the output line may be different than that of the input line, there will be periods of time when the instantaneous voltage at the input is not sufficient to supply the power required by the output at that instant. During these periods, power is extracted from the commutating energy storage (from the energy capacitor, to be specific). During times that there is plenty of instantaneous voltage on the input line, the energy in the capacitor is replenished.

The way that this is accomplished is that there are three negative feedback control loops, one for each variable port:

First, the d.c. output of the FIXED D.C. PORT is compared with the D.C. REFERENCE. The difference (error) is amplified and the amplified signal changes the modulation in the VARIABLE D.C. PORT. This delivers energy to or from the energy capacitor to cause the FIXED D.C. PORT output to approach the D.C. REFERENCE, reducing the error voltage to a small residual (null). This is a relatively fast loop with perhaps 25 μsec response time. By regulating the output of a fixed port, the system is regulating the amplitude of the square wave voltage on every winding of the transformer. This entire action can be expressed by the statement, "The modulation at the energy port is controlled for the sake of the HOUSEKEEPING POWER".

Second, the average level of the voltage on the ENERGY CAPACITOR is compared with the D.C. REFERENCE and the error is amplified by a much slower error amplifier (typical response time: 10 msec). The amplified error controls the amplitude of the picture-of-the-line counter emf presented to the line input by the general purpose port. This stabilizes the average voltage on the energy capacitor at the desired level. This action can be abbreviated by the statement, "The modulator at the INPUT LINE port is controlled for the sake of the average stored energy".

Third, the panel-variable AC REFERENCE SOURCE is compared with the loaded OUTPUT LINE by the summing junction of this control loop. The gain of the modulator that produces a picture-of-the-reference output of the OUTPUT LINE port is controlled to produce a nearly constant output despite load changes. The response time of this loop is about 1 mSEC. Its action can be expressed as, "The modulator in the output line port is controlled for the sake of the output line".

In the sections that follow, the short form descriptions will often be used.

In the embodiment of the power converter in FIG. 15 the reversibility of the two general purpose ports comes into use whenever the load on the OUTPUT LINE is inductive, capacitive, or stores inertial energy. In such cases, excess energy is returned to the INPUT LINE.

Figure 16:
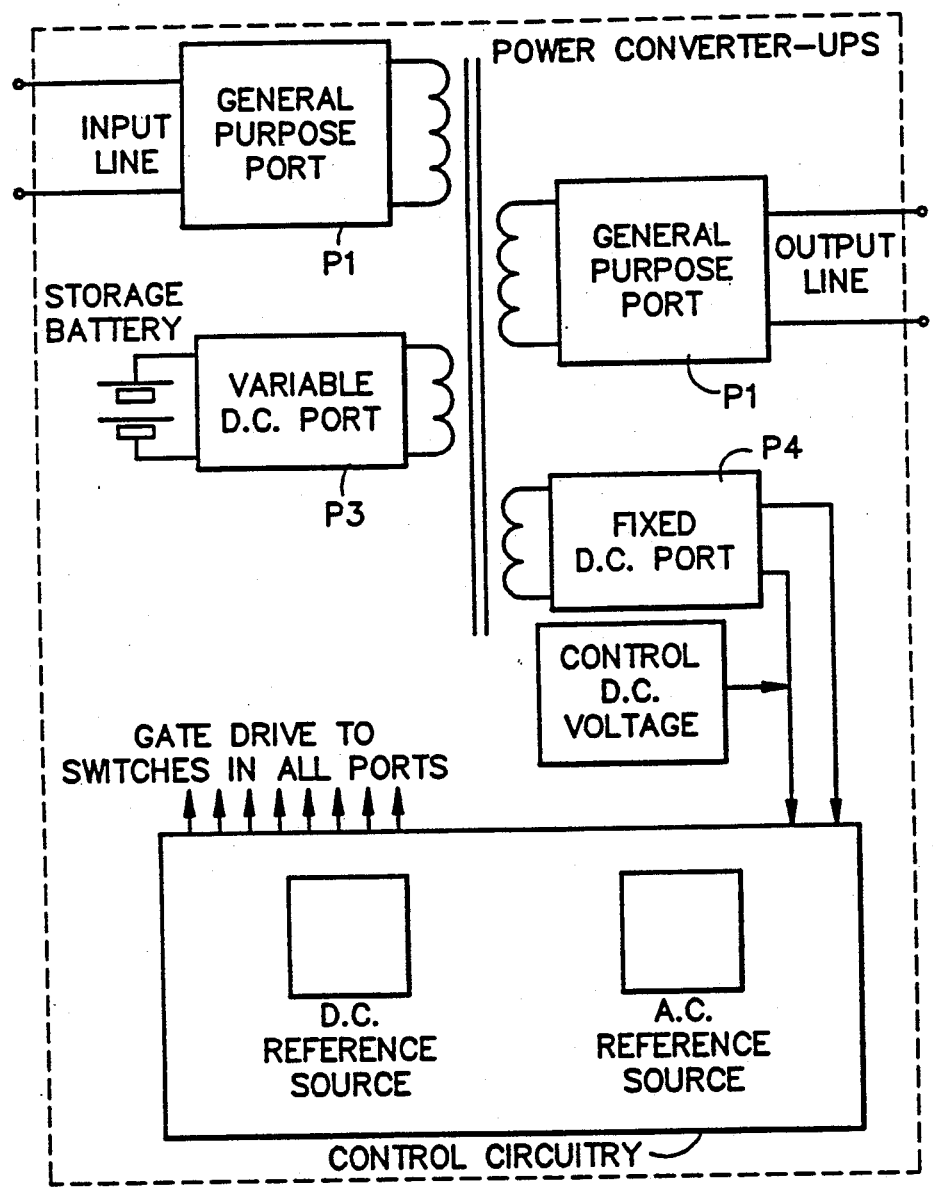
FIG. 16 is a block diagram of a particular embodiment of a power converter, called an "ON-LINE UNINTERRUPTABLE POWER SUPPLY", in accordance with the present invention.

5.2 Embodiment Of The Power Converter As An On-Line Uninterruptable Power Supply A block diagram of the power converter in accordance with the present invention as an Uninterruptable Power Supply (UPS) is shown in FIG. 16. The UPS does not have any changeover function when the line voltage goes bad. Further, it (i) extracts power from the line at unity power factor and (ii) extracts at least part of the needed power from the line even under severe brownout conditions.

This embodiment of the power converter as an UPS differs from the embodiment of the power converter as a SIMPLE FREQUENCY CHANGER (previously seen in FIG. 15) in only two ways. First, the energy storage element is a STORAGE BATTERY instead of an ENERGY CAPACITOR. Second, the output of the A.C. REFERENCE SOURCE is fixed amplitude, fixed frequency and is phase locked to the INPUT LINE.

The control loops of the embodiment of the power converter as a UPS are the same as in the embodiment of the power converter as a SIMPLE FREQUENCY CHANGER. That is: First, the modulation at the energy port (VARIABLE D.C. PORT with STORAGE BATTERY) is controlled for the sake of the housekeeping power supply. Second, the modulation at the INPUT LINE port is controlled for the sake of the STORAGE BATTERY "float voltage". Third, the modulation at the OUTPUT LINE port is controlled for the sake of the loaded OUTPUT LINE.

5.3 Embodiment Of The Power Converter As A COMPLEX FREQUENCY CHANGER

Figure 17:
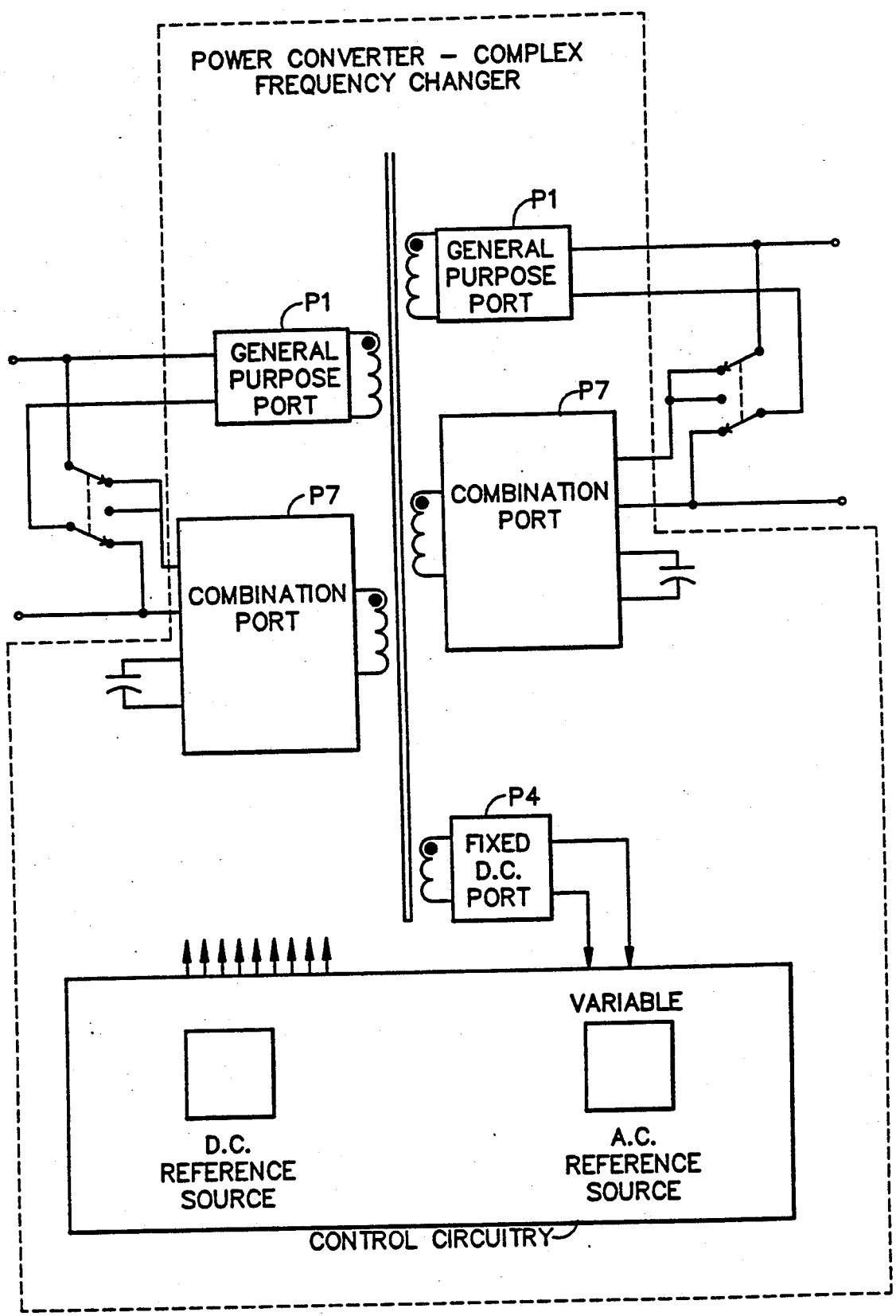
FIG. 17 is a block diagram of a particular embodiment of a power converter, called a "COMPLEX FREQUENCY CHANGER", in accordance with the present invention.

A block diagram of a power converter in accordance with the present invention as a COMPLEX FREQUENCY CHANGER is shown in FIG. 17. The embodiment shown in FIG. 17 has the following features not in the simple frequency changer.

First, the two windings shown at the left of the transformer have an identical number of turns. The switch arrangement and drive signals of the general purpose port are the same as in the general portion of the combination port. Therefore the two ports may be connected in parallel, for 120 V operation, or in series, for 240 V operation by the two-pole switch shown.

Second, the two windings shown at the upper right of the transformer have an identical number of turns. The switch arrangement and drive signals of the general purpose port are the same as in the general purpose portion of the combination port. Therefore the two ports may be connected in parallel, for 120 V operation, or in series, for 240 V operation by the two-pole switch shown.

Third, the energy capacitor at the right is used to supply the fast peak load currents required if the user drives a high current rectifier load.

The control loops within the embodiment of the power converter as a COMPLEX FREQUENCY CHANGER function as follows.

First, the modulation for the energy portion of the left COMBINATION PORT is controlled for the sake of the housekeeping power supply.

Second, the modulation for the left GENERAL PURPOSE PORT and the general purpose portion of the left COMBINATION PORT is controlled for the sake of the average voltage on the left ENERGY CAPACITOR.

Third, the modulation for the right GENERAL PURPOSE PORT and the general purpose portion of the right COMBINATION PORT is controlled for the sake of the fundamental component of the output line voltage.

Fourth, the modulation control for the energy portion of the right COMBINATION PORT is divided into two portions. The high frequency portion is controlled to supply the high frequency current required by the load on the OUTPUT LINE. The low frequency portion is controlled for proper average voltage on the right ENERGY CAPACITOR.

Figure 18:
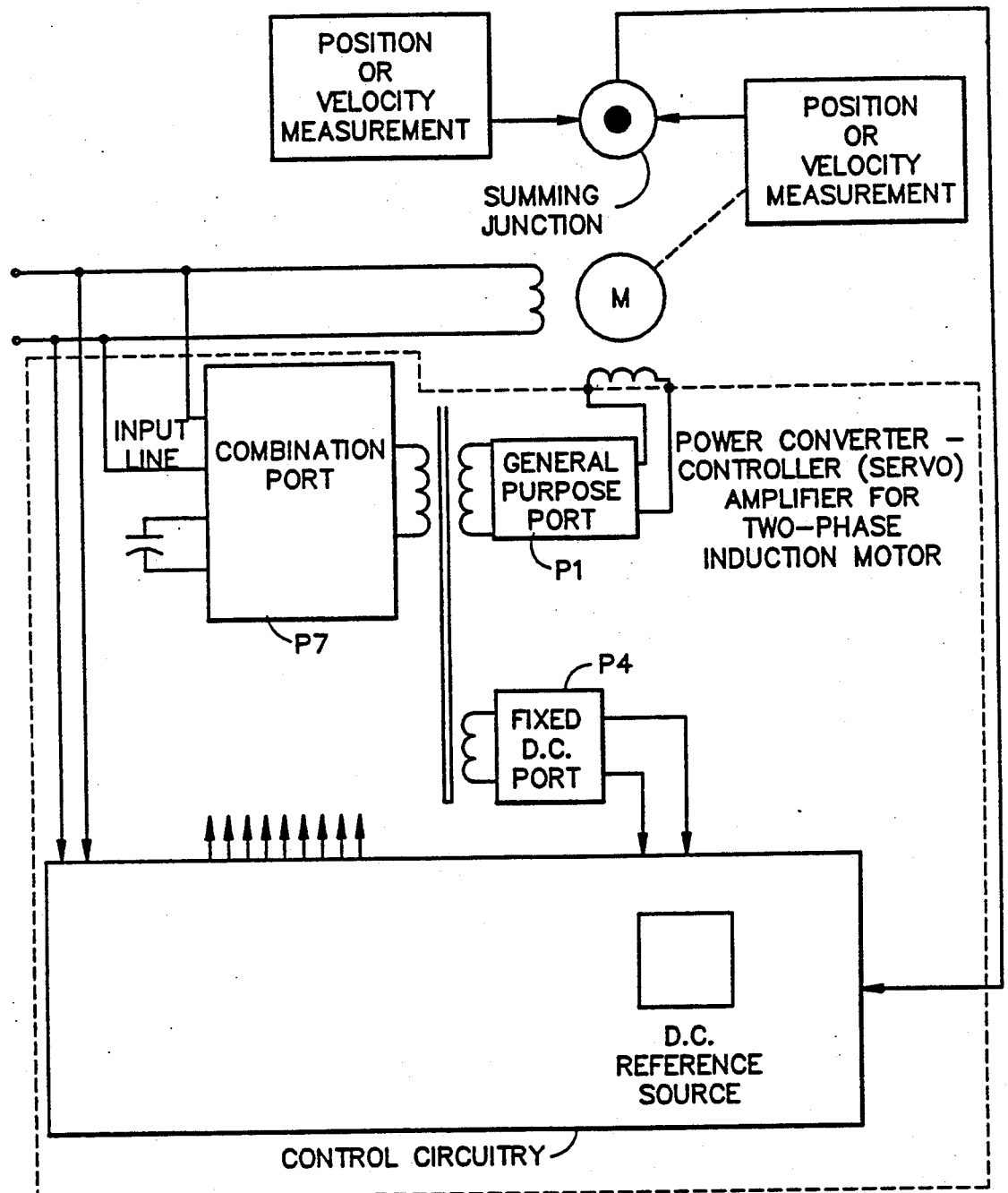
FIG. 18 is a block diagram of a particular embodiment of a power converter, called a "CONTROLLER (SERVO) AMPLIFIER FOR A TWO-PHASE INDUCTION MOTOR (FIXED FREQUENCY)", in accordance with the present invention.

5.4 Embodiment Of The Power Converter As A CONTROLLER FOR A TWO-PHASE INDUCTION SERVO MOTOR A block diagram of an embodiment of a power converter in accordance with the present invention as a CONTROLLER FOR A TWO-PHASE INDUCTION SERVO MOTOR is shown in FIG. 18. This simple embodiment provides the power amplification for a mechanical closed loop control system of fixed frequency. The control loops of this embodiment are as follows.

First, the modulation for the energy portion of the COMBINATION PORT is controlled for the sake of the housekeeping power.

Second, the modulation for the line port portion is controlled for the sake of the average voltage on the ENERGY CAPACITOR.

Third, a portion of the CONTROL CIRCUITRY not shown generates an a.c. reference signal that leads or lags the INPUT A.C. LINE by 90° depending on desired direction of the rotating magnetic field in the motor. The amplitude of this signal is the amplified ERROR SIGNAL. This a.c. reference signal is then used in the modulator to generate the switch drives for the GENERAL PURPOSE PORT.

Figure 19:
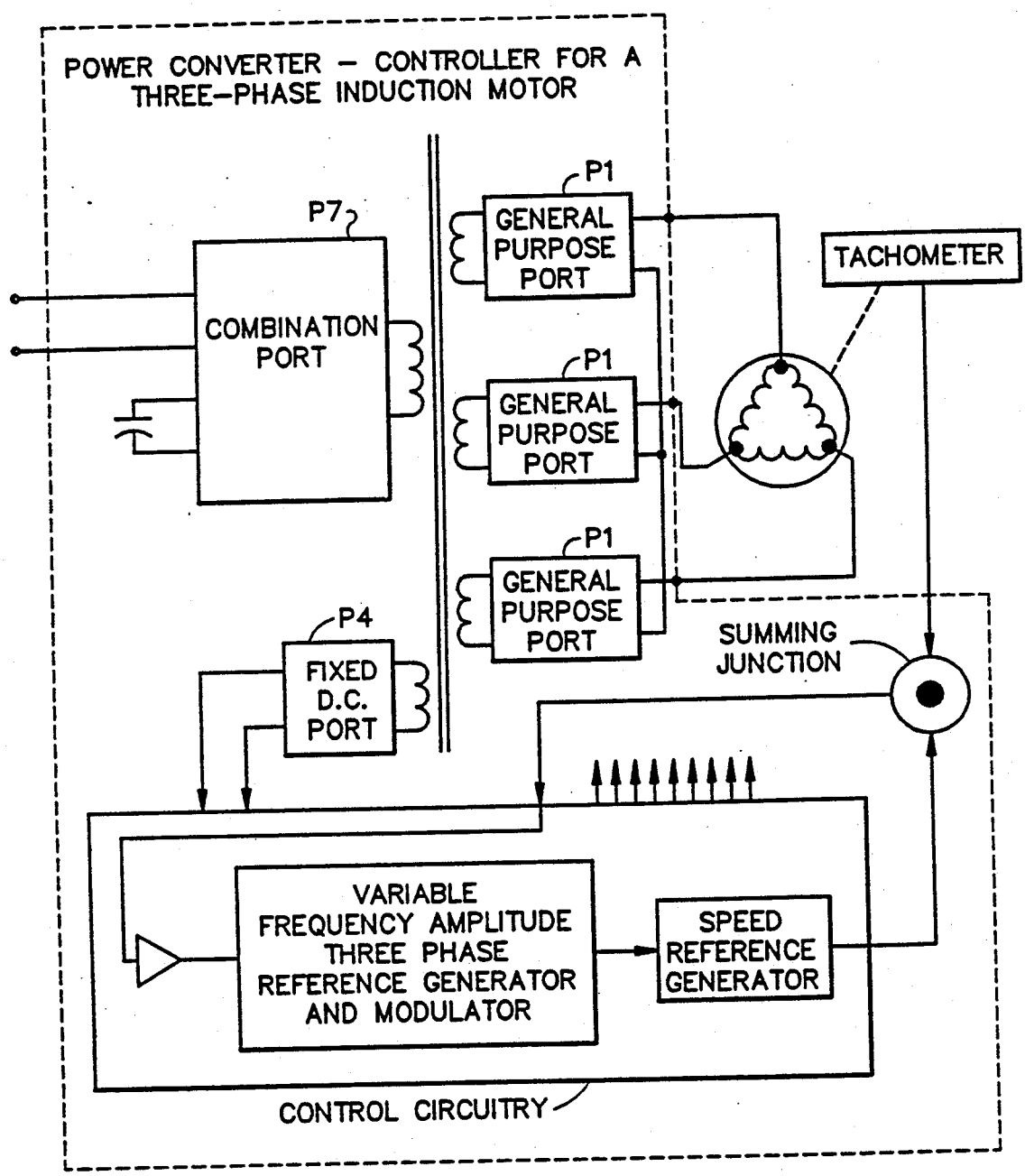
FIG. 19 is a block diagram of a particular embodiment of a power converter, called a "CONTROLLER FOR A THREE-PHASE INDUCTION MOTOR USED AS A VARIABLE SPEED DRIVE", in accordance with the present invention.

5.5 Embodiment Of The Power Converter As A CONTROLLER FOR A THREE-PHASE INDUCTION MOTOR WITH VARIABLE SPEED DRIVE A block diagram of an embodiment of the power converter in accordance with the present invention as a CONTROLLER FOR THREE-PHASE INDUCTION MOTOR WITH VARIABLE SPEED DRIVE is shown in FIG. 19. This embodiment develops a very sophisticated drive for the three phase motor. The amplitude and frequency are linked so as to provide a constant flux level for optimum usage of the motor iron the sinusoidal shape generates lower losses in the motor than square wave or six-step drive. The ports are ordinary GENERAL PURPOSE PORTS.

The complication is in the small-signal control circuitry the control loops of the embodiment are as follows.

First, the energy portion of the COMBINATION PORT is controlled for the sake of the HOUSEKEEPING POWER.

Second, the line portion is controlled for the sake of the average voltage on the ENERGY CAPACITOR.

Third, all three GENERAL PURPOSE PORTS are driven with signals from modulators whose inputs are the outputs of the VARIABLE FREQUENCY/AMPLITUDE THREE PHASE REFERENCE GENERATOR which gets its control from amplified speed error. The motor drive so generated corrects the motor speed so as to reduce the speed error signal to a small null.

5.6 Embodiment Of The Power Converter As A COMPUTER SYSTEM POWER SUPPLY

Figure 20:
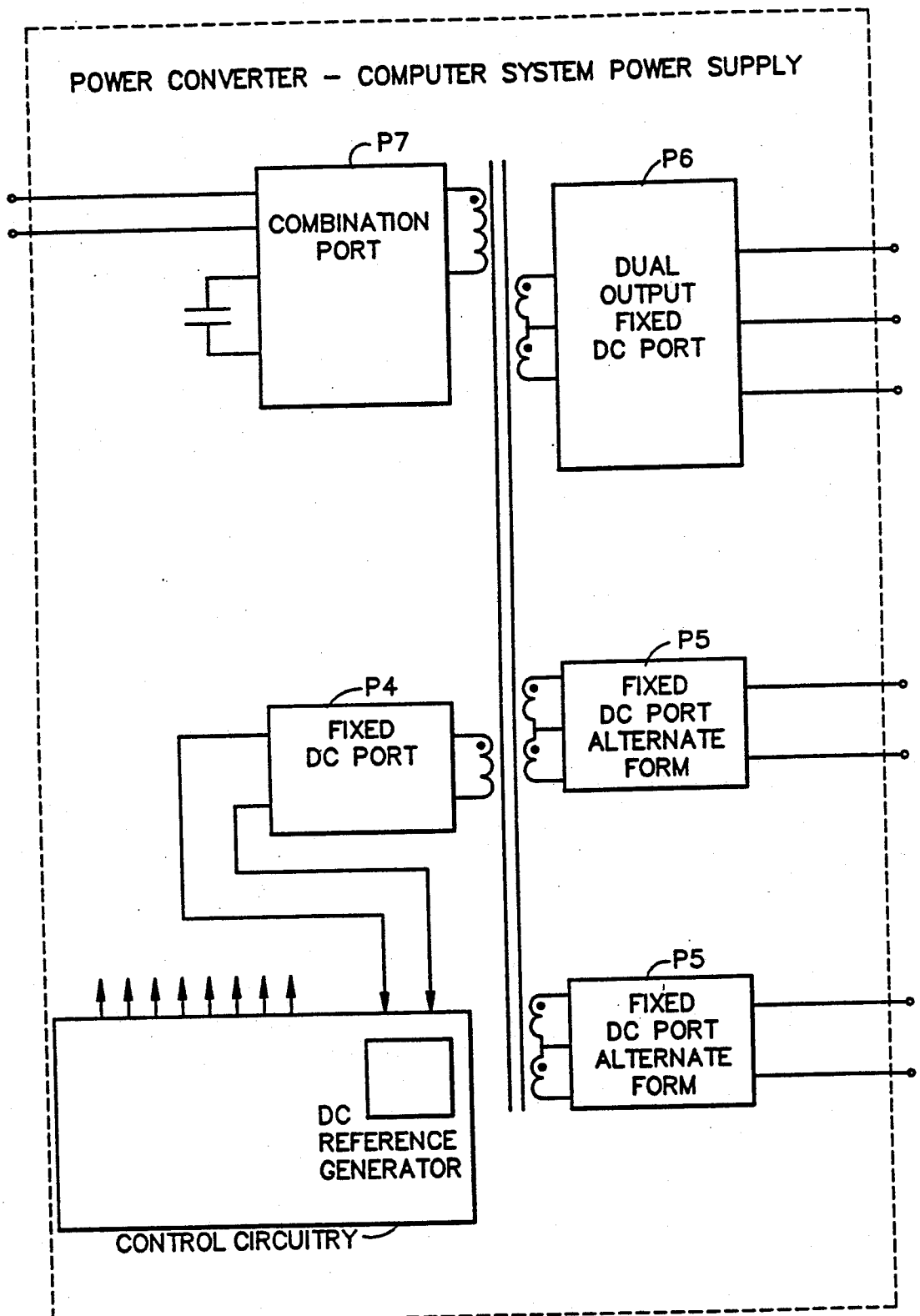
FIG. 20 is a block diagram of a particular embodiment of a power converter, called a "COMPUTER SYSTEM POWER SUPPLY", in accordance with the present invention.

A block diagram of an embodiment of the power converter in accordance with the present invention as a COMPUTER SYSTEM POWER SUPPLY is shown in FIG. 20. This embodiment permits the control loop that stabilizes the HOUSEKEEPING POWER to regulate all of the outputs against line variations as well as to eliminate load induced cross talk between outputs. Outputs do not have individual regulation against voltage changes due to load current changes. Such voltage changes are, however, quite small due to the very low intrinsic output impedance of the fixed ports.

The control loops of the embodiment are as follows:

First, the energy portion of the left COMBINATION PORT is controlled for the sake of the housekeeping power.

Second, the line portion of the COMBINATION PORT is controlled for the sake of the average voltage on the ENERGY CAPACITOR.

5.7 Embodiment Of The Power Converter As A TEST SYSTEM FOR A POWER SOURCE

Figure 21:
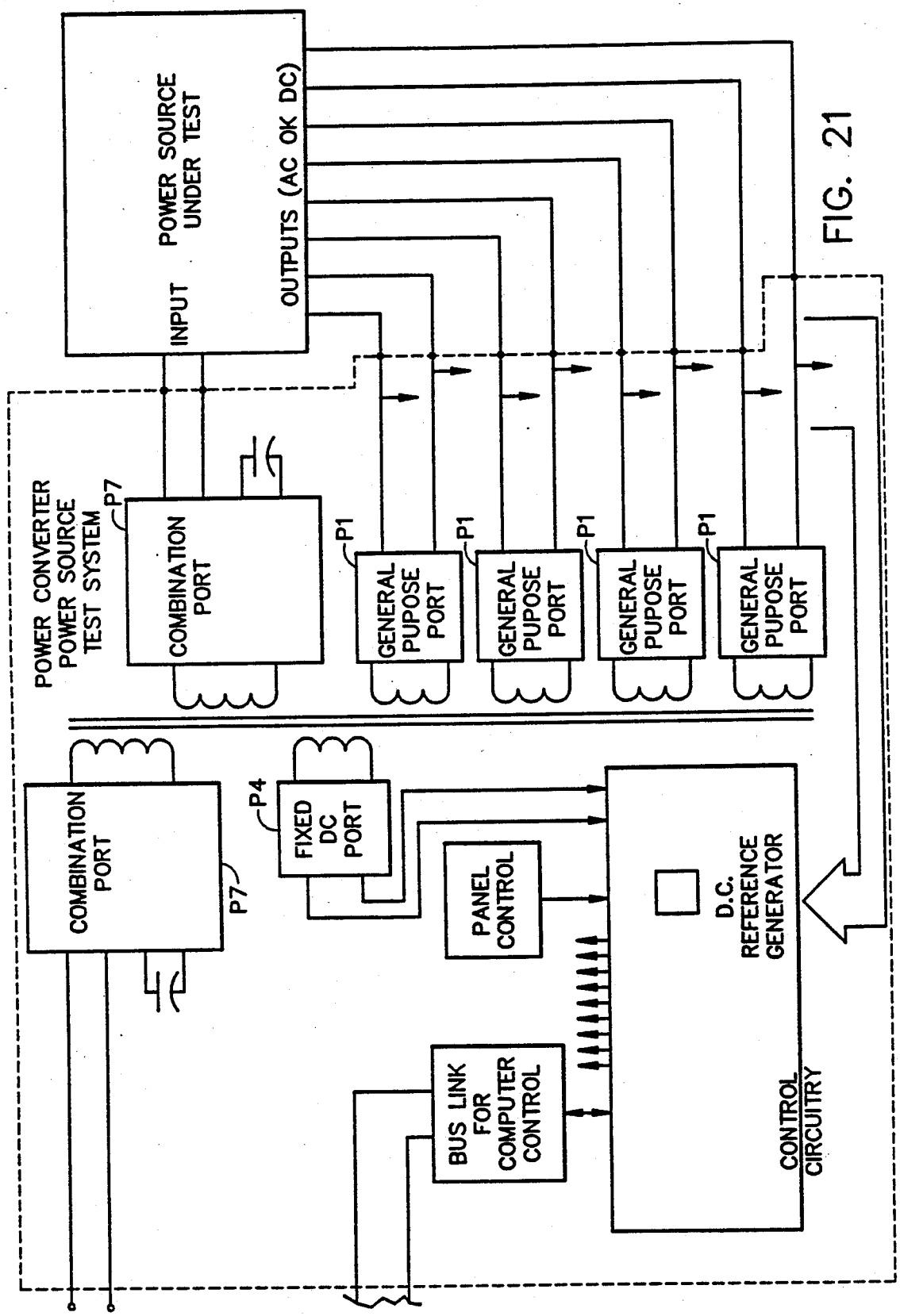
FIG. 21 is a block diagram of a particular embodiment of a power converter, called a "POWER SOURCE TEST SYSTEM", in accordance with the present invention.

A block diagram of an embodiment of the power converter in accordance with the present invention as a TEST SYSTEM FOR A POWER SOURCE is shown in FIG. 21. This embodiment replaces a large collection of controllable loads, heatsinks, and fans previously used to test power sources. It dramatically reduces the power needed from the line in order to conduct tests since the load power is returned to the input of the power source under test, and only the power source and converter losses need to be drawn from the line.

All except the first two control loops are under panel control or under computer control via the BUS LINK FOR COMPUTER CONTROL. The first two control loops are as follows:

First, the energy portion of the left COMBINATION PORT is controlled for the sake of the housekeeping power.

Second, the line portion of the COMBINATION PORT is controlled for the sake of the average voltage on the ENERGY CAPACITOR.

5.8 Embodiment Of The Power Converter As A RURAL POWER CONTROL SYSTEM

Figure 22:
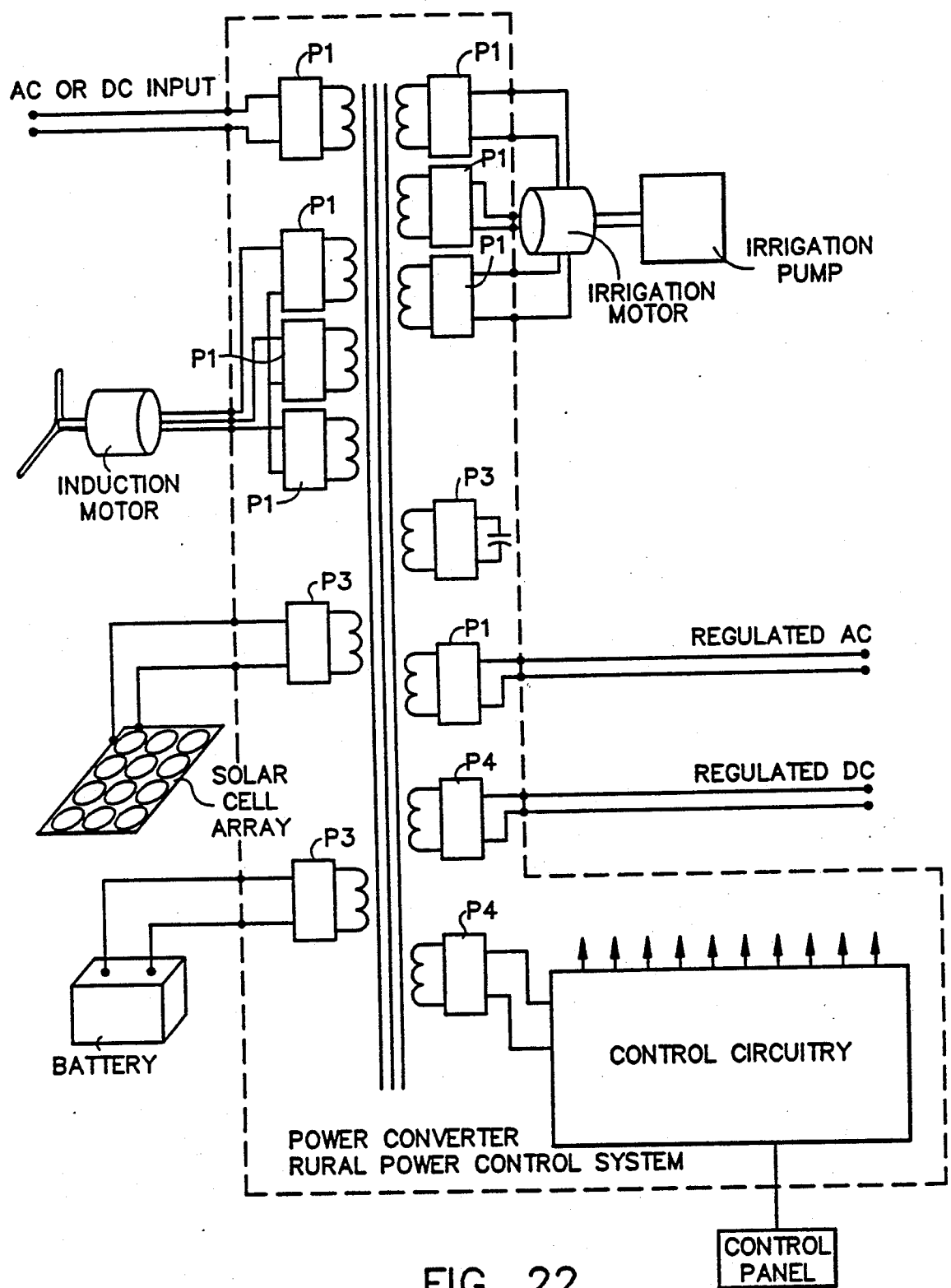
FIG. 22 is a block diagram of a particular embodiment of a power converter, called a "RURAL POWER CONTROL SYSTEM", in accordance with the present invention.

A block diagram of an embodiment of the power converter in accordance with the present invention as a RURAL POWER CONTROL SYSTEM is shown in FIG. 22. This embodiment illustrates that a large number of control loops, and a great variety of control loops, can be active in a single power converter at the same time. Note that there is only one high frequency power transformer.

The COMMUTATING ENERGY STORAGE port is operated for the sake of the HOUSEKEEPING POWER.

The operation of the other control loops is under sequencer control and/or panel control and is not explained in detail in this specification.

6.0 Advantages Of Power Converters In Accordance With The Present Invention

Power converters, and power conversion, in accordance with the present invention offer many and diverse advantages.

6.1 Controlled Power Transfer Among Three Or More Ports

Switching power systems that form transformer-like links between low frequency signal are suggested by McMurray and others. However the present invention is believed to be unique in using substantially constant, controlled amplitude, square wave voltage in the high frequency power transformer to implement controlled power transfer among three or more ports.

6.2 Negative Feedback Loops, And More Than One Such Loop, Concurrently Control Power Transfer Within A Same Single Power Transformer Switching power systems that form transformer-like links between low frequency signals are suggested by McMurray and others. However, the present invention is believed to be unique in using substantially constant controlled amplitude square wave voltage in the high frequency power transformer so as to thereby permit more than one negative feedback loop to control power transfer concurrently within the same single power transformer.

6.3 A Negative Feedback Control Loop And Open Loop Power Amplification May Be Concurrently Active For Control Of Power Conversion Within A Sin'- sole Power Transformer Switching power systems that form transformer-like links between low frequency signals are suggested by McMurray and others. However, the present invention is believed to be unique in using substantially constant controlled amplitude square wave voltage in the high frequency power transformer to permit both (i) a negative feedback loop and (ii) an open loop power amplification to be active concurrently within the single power transformer.

6.4 Electronically-Generated Counter emf

Power converters, and power conversion, in accordance with the present invention apply an electronically-generated counter emf, which counter emf is generated by processing a signal level representative of the line voltage, to the line terminals in order to control power flow to or from the line power in accordance with signal level control.

This electronically-generated counter emf enables the power converter/power conversion to "accept" (or to "produce", since all conversion is bidirectional) as the line voltage for controlled power input/output and without internal change: (i) a.c. of any frequency low with respect to the carrier frequency, (ii) d.c. of either polarity, (iii) composites of (i) and (ii) above, and (iv) stochastic voltage waveforms.

The electronically-generated counter emf eliminates or reduces the size of large electrolytic capacitors and-/or eliminate the surge currents drawn from the line by the peak-hold rectifier system that is currently widely used.

6.5 Reversible Ports

The present invention teaches use of reversible ports of diverse configurations, including wholey new configurations, to eliminate power rectifier diodes and thus the reverse recovery problems occurring with these diodes.

One new port configuration is the alternate form general purpose port.

Another new port is the combination port.

A signal-controlled port permits commutating energy storage use of this commutating energy storage port in a power convert permits the use of a single phase line as the only power source.

The present invention teaches means of generating a substantially constant amplitude square wave voltage on the windings of the power transformer for the purposes 6.1-6.3 above. The preferred means may consist of connecting a fixed port to a battery. It may alternatively consist of connecting a fixed port to a d.c. voltage (that is itself generated from housekeeping power developed from coupling in the fixed port the square wave within the transformer!), a commutating energy port to an energy storage element, and a (typically) general purpose port to an input electrical potential. These means should not, however, be considered to be the sole or only means by which the substantially constant amplitude square wave may be generated within the transformer's windings. Once it is understood how any waveform may be coupled to the substantially constant amplitude square wave in accordance with the present invention, then literally any waveform can become the source utilizable by some means to generate the square wave. Consider an extreme case. Suppose a computer analysis of the waveform of an input voltage potential, even a stochastic waveform, were made in real time. The results of the analysis could be used to control switching in a switching circuit of a port so as to generate the square wave the analog feedback control systems of the preferred embodiments of the power converter becomes supplanted with digital intelligence. Nonetheless, the essence of the invention remains the same: some electric potential or potentials will be coupled so as to generate a substantially constant amplitude square wave within the windings of a transformer.

This simple concept warrants restatement. The present invention shows generating a substantially constant square wave voltage on the windings of the power transformer for the purposes of 6.1-6.3 above by connecting a fixed port to a battery. The present invention shows generating a substantially constant square wave voltage on the windings of the power transformer for the purposes of 6.1-6.3 above by connecting a fixed port to an otherwise regulated d.c. power supply. The present invention shows generating a substantially constant square wave voltage on the windings of the power transformer for the purposes of 6.1-6.3 above by closed loop control of a variable port of the system to keep the input/output of a fixed port constant. By these variations it is manifest that the present invention cannot be simplistically identified by simply the preferred circuits that it uses, but should rather be identified by the preferred power conversion methodology of the invention.

6.6 Particular Embodiments Of Power Converters Perform Useful Functions Uniquely Well Embodiments of power converter circuits in accordance with the present invention bring the magnitude, direction of rotation, and angular velocity of the rotating magnetic field in an induction or synchronous motor/generator under continuous small signal control. These same embodiments return excess shaft kinetic energy to the power line.

Embodiments of power converters in accordance with the present invention make use of commutating energy storage for compatibility coupling any number of output electrical potentials having any number of voltage waveforms a single phase input a.c. line.

Use of a variable frequency carrier is permitted.

Simultaneous semi-regulation of multiple outputs of fixed ports having voltage that are turns-ratio-related to each other is possible. Such semiregulation reduces the size, weight, or cost of filter components at the outputs due to the low ripple nature of the unfiltered voltages produced by conversion in accordance with the present invention.

6.7 A.C. Waveforms Are Coupled Through Three-State Signal Demodulation

The present invention combines the phasecontrolled square wave gate drive of Harada with a bridge switch configuration in order to produce three-state-demodulated waveforms.

As compared to a two-state demodulator, a three-state demodulator produces fewer harmonics. In the output of the three-state demodulator, the carrier frequency, harmonics of the carrier frequency, and all even-order sidebands are suppressed (have zero amplitude). Except for the absent frequencies in three-state modulation, the amplitudes of all harmonics is identical for the two-state demodulator.

Accordingly, if the output of the two-state demodulator is analyzed as a distorted sine wave, and defined to be 100%, then the distortion ratio of the output of the three-state demodulator is 50%.

If the output of the two-state demodulator were operated into a resistive load, then, in order to deliver 100 watts of sine wave power, the two-state demodulator would have to deliver 200 watts of total power. Operated into the same resistive load, the three-state demodulator can deliver 100 watts of sine wave power by delivering 125 watts of total power. Three-state demodulation in accordance with the present invention is thusly superior to two-state demodulation.

7.0 Expansion of the Invention

In accordance with the preceding explanation, certain other embodiments of the invention will suggest themselves to practitioners of the electronic design arts. For example, a single port that is subject to control of counter emf in accordance with the present invention may be connected to a transformer that is otherwise employed for a pulse width modulated or other power conversion scheme. Appropriate control of the phase switched variable port in accordance with the principles of the present invention will permit this port to offer a controlled counter emf to a source of power to which it connects regardless that the overall power conversion scheme is not based on phase-switched technology.

Accordingly, the present invention should be interpreted in accordance with the scope of the following claims, only, and not solely in accordance with those particular embodiments within which the invention has been taught.

What is claimed is:

1. A power converter comprising:
   a transformer including a plurality of windings;
   a plurality of port means, at least one of which is for coupling, from an associated external reservoir of electrical energy, electrical energy having any of an a.c., d.c., combination a.c. and d.c., or stochastic voltage waveform, to an associated transformer winding; and
   means for controlling the at least one port means so that it presents a counter emf to the external reservoir of electrical energy, which counter emf is controllable in its waveform so as to produce any desired current waveform and any desired direction of current flow between the external reservoir of electrical energy and the at least one port means.

2. The power converter according to claim 1 wherein the means for controlling comprises:

counter-emf-amplitude means for controlling the amplitude of the counter emf to be respectively instantaneously (i) greater than, (ii) equal to, or (iii) less than the voltage waveform of the source of energy dependent upon whether instantaneous current flow between the external reservoir of electrical energy and the at least one port means is respectively desired to be (i) from the at least one port means to the external reservoir of electrical energy, (ii) null, or (iii) from the external reservoir of electrical energy to the port means.

3. The power converter according to claim 2 wherein the counter-emf-waveform-shape means for controlling the shape of the waveform of the counter emf relative to the shape of an a.c. voltage waveform of the reservoir of electrical energy dependent upon when current flow is desired to be (i) from the at least one port means to the external reservoir of electrical energy, (ii) null, or (iii) from the external reservoir of electrical energy to the port means, during each cycle of the a.c. voltage waveform.

4. The power converter according to claim 1 wherein the means for controlling comprises:
counter-emf-phase-shifting-and-amplitude-controlling means for controlling both a phase and an amplitude of the waveform of the counter emf relative to a phase and to an amplitude of an a.c. voltage waveform of the reservoir of electrical energy to be respectively instantaneously equal in amplitude and (i) lagging, (ii) in phase, or (iii) leading the a.c. voltage waveform of the source of energy dependent upon whether an instantaneous power factor between the external reservoir of electrical energy and the at least one port means is respectively desired to be (i) lagging less than one (ii) one, or (iii) leading less than one.

5. The power converter according to claim 1 wherein the means for controlling comprises:
counter-emf-phase-shifting-and-amplitude-controlling means for controlling both a phase and an amplitude of the waveform of the counter emf to be identical in phase and in amplitude of an a.c. voltage waveform of the reservoir of electrical energy, therein to produce an unitary instantaneous load factor of the at least one port means to the external reservoir of electrical energy.

6. A power converter comprising:
a transformer including a plurality of windings;
a plurality of port means at least one of which is for coupling electrical energy from an associated external source of electrical energy having any of an a.c., d.c., combination a.c. and d.c., or stochastic voltage waveform to an associated transformer winding; and
means for controlling the at least one port means so that it presents a controllable counter emf to the external source of electrical energy that it couples, this counter emf being controlled so as to produce at the one port a current waveform that is in a predetermined point-by-point relationship to the voltage waveform regardless that the voltage waveform should be any of a.c., d.c., combination a.c. and d.c., or stochastic.

7. The power converter according to claim 6 wherein the means for controlling is controling the at least one port means to present a counter emf that is controlled so as to produce a current waveform that is of equivalent amplitude and phase to the voltage waveform;
wherein the at least one port presents a unitary load factor to the source of electrical energy that it couples.

8. The power converter according to claim 6 wherein the means for controlling is for controlling the at least one port means to present a counter emf controlled so as to produce a current waveform that is controllably phase-shifted relative to the impressed voltage waveform;
wherein the at least one port presents a controllable power factor to the source of electrical energy that is couples.

9. The power converter according to claim 6 wherein the means for controlling controls the at least one port means to present a sinusoidal counter emf to the source of electrical energy that it couples;
wherein if the voltage waveform of the source of electrical energy is distorted from a sinusoid, this distortion is improved by connection to the at least one port means.

10. A phase-controlled power converter comprising:
a transformer including a plurality of inductively coupled windings;
a plurality of ports each including (i) a pair of terminals to which are connectable an associated external source of electrical energy having a voltage waveform, and (ii) a switching circuit, having controllable switches, connected between the terminals and an associated winding of the transformer; and
control means for rendering conductive at least one switch in the switching circuit of one of the plurality of ports simultaneously that another switch within the same switching circuit is rendered nonconductive, and for continuing the rendering in phased sequence between all the switches of the switching circuit of the one port and among all the switches of all the switching circuit of all the plurality of ports, so that at least one port presents a controllable counter emf to its associated source of electrical energy, this counter emf being controlled so as to produce at the at least one port a current waveform that is in a predetermined point-by-point relationship to the voltage waveform regardless that the voltage waveform should be any of a.c., d.c., combination a.c. and d.c., or stochastic.

11. The power converter circuit according to claim 10 wherein the control means comprises:
load factor means, responsive to a voltage waveform of the source of electrical energy connected to the one port, for producing variable-phase switching control signals that cause the one port to present a counter emf to the source of electrical energy to which it is connected that will produce a current waveform equivalent in amplitude and phase to the voltage waveform of this electrical potential;
therein making the power converter exhibit a unitary load factor to this electrical potential.

12. The power converter according to claim 10 wherein the load factor means comprises:
a negative feedback control loop responsive to an average net of energy delivered by the electrical potential into the power converter versus energy delivered out of the power converter into its loads, as well as to the voltage waveform of the electrical potential, to produce the variable-phase switching control signals.

13. The power converter according to claim 10 wherein the control means comprises:
phase-shifting means for producing a waveform that is phase-shifted from the voltage waveform of the source of electrical energy connected to the one port; and
power factor means responsive to the phase-shifted voltage waveform for producing variable-phase switching control signals that cause the one port to present a counter emf to the source of electrical energy that leads or lags the voltage waveform thereof by the amount and direction of the phase shift;
therein making the power converter circuit to exhibit a leading or a lagging power factor.

14. The power converter according to claim 10 wherein the control means comprises:
oscillator means for producing a sinusoidal waveform in phase synchronization with the voltage waveform of the source of electrical energy connected to the one port; and
means responsive to the phase-locked sinusoid for producing variable-phase switching control signals that cause the one port to present a sinusoidal counter emf to the source of electrical energy;
therein not adding any distortion to the source of electrical energy and reducing any distortion that is present.

15. The power converter circuit according to claim 10 wherein at least one of the plurality of ports comprises:
a first pair of terminals to which is connected a source of power supplying a first external electric potential, called an IMPRESSED VOLTAGE;
a filter, having at least one inductor, connected to the pair of terminals;
a switching circuit, having controllable switches, connected between the filter and an associated transformer winding;
this at least one port being called an INPUT LINE PORT because it connects to a source of power.

16. The power converter circuit according to claim 10 wherein at least one of the plurality of ports comprises:
a pair of terminals to which is connected a load and in which appears an external electrical potential, called an OUTPUT VOLTAGE;
a filter, having at least one inductor, connected to the pair of terminals;
a switching circuit having controllable switches, connected between the filter and an associated transformer winding;
this at least one port being called an OUTPUT PORT because it is connected to a load.

17. A phase-controlled power converter comprising:
a transformer including a plurality of inductively coupled windings;
a plurality of ports each including (i) a pair of terminals to which are connectable an associated external electrical potential, and (ii) a switching circuit, having controllable switches, connected between the terminals and an associated winding of the transformer wherein one of the plurality of ports comprises:

a pair of terminals in which appears an external direct current electrical potential, called a D.C. VOLTAGE, AND
a switching circuit, having controllable switches, connected between the pair of terminals and an associated third transformer winding;
this one of the plurality of ports being called a FIXED D.C. PORT because it connects to the D.C. VOLTAGE; and
control means for rendering conductive at least one switch in the switching circuit of one of the plurality of ports simultaneously that another switch within the same switching circuit is rendered nonconductive, and for continuing the rendering in phased sequence between all the switches of the switching circuit of the one port and among all the switches of all the switching circuits of all the plurality of ports, so that at least one port presents a controllable counter emf to its associated external electrical potential.

18. A phase-controlled power converter comprising:
a transformer including a plurality of inductively coupled windings;
a plurality of ports each including (i) a pair of terminals to which are connectable an associated external electrical potential, and (ii) a switching circuit, having controllable switches, connected between the terminals and an associated winding of the transformer wherein at least one of the plurality of ports comprises:
a filter, having at least one inductor, connected to a pair of terminals in which appears a direct current electrical potential that may vary;
a switching circuit, having controllable switches, connected between the filter and an associated transformer winding; and
a capacitor, called an ENERGY CAPACITOR, connected across the pair of terminals and across which appears the direct current electrical potential that may vary;
this at least one port being called a VARIABLE D.C. PORT because it connects to a direct current electrical potential that may vary; and
control means for rendering conductive at least one switch in the switching circuit of one of the plurality of ports simultaneously that another switch within the same switching circuit is rendered nonconductive, and for continuing the rendering in phased sequence between all the switches of the switching circuit of the one port and among all the switches of all the switching circuits of all the plurality of ports, so that at least one port presents a controllable counter emf to its associated external electrical potential.

19. A phase-controlled power converter comprising:
a transformer including a plurality of inductively coupled windings;
a plurality of ports each including (i) a pair of terminals to which are connectable an associated external electrical potential, and (ii) a switching circuit, having controllable switches, connected between the terminals and an associated winding of the transformer wherein each of the plurality of ports comprises:
a switching circuit including switches; wherein at least a one, called an INPUT LINE PORT, of the plurality of ports comprises:

a pair of terminals to which is connected an external source of electrical potential, and in which appears an impressed voltage; and control means for rendering conductive at least one switch in the switching circuit of one of the plurality of ports simultaneously that another switch within the same switching circuit is rendered non-conductive, and for continuing the rendering in phased sequence between all the switches of the switching circuit of the one port and among all the switches of all the switching circuits of all the plurality of ports, so that at least one port presents a controllable counter emf to its associated external electrical potential, wherein the control means comprises:

a switching control means for temporally rendering conductive at least one switch in each of the switching circuits, and for alternately temporally rendering conductive another switch in each of the switching circuits, at a switching frequency that is relatively high compared to a frequency of the impressed voltage appearing at the pair of terminals of the INPUT LINE PORT, wherein the switching control means comprises:

an oscillator producing an a.c. carrier waveform at a frequency that is relatively high compared to the frequency of the impressed voltage;

a d.c. reference source producing a substantially constant reference d.c. voltage;

first means, responsive to the a.c. carrier waveform, for controlling the switches of a one, called a FIXED D.C. PORT, of the plurality of ports to couple a first external d.c. voltage to a corresponding transformer winding so as to maintain therein a square wave of a frequency and a phase equal to the a.c. carrier waveform and of an amplitude equal to the first external d.c. voltage;

second means, responsive to any difference between the first external d.c. voltage and the reference d.c. voltage, for controlling the switches of another one, a so-called VARIABLE D.C. PORT, of the plurality of ports so that the first external d.c. voltage equals the reference d.c. voltage; and third means, responsive to any difference between another, variable, second external d.c. voltage and the reference d.c. voltage, for controlling the switches of the INPUT LINE PORT so that an emf presented this one of the plurality of ports to the external source of electrical potential has an equivalent waveform to the impressed voltage, whatsoever its shape and distortion, thereby making the power factor of the power converter circuit to be essentially unity.

20. A phase-controlled reversible power conversion method performed in a power converter circuit having (i) a high frequency power transformer with a plurality of inductively-coupled windings, and (ii) a plurality of ports, each with a switching circuit employing controlled switches, connected between an associated electrical potential and an associated transformer winding, the method comprising:

rendering in phased sequence switches in two of the ports to be conductive, and alternately rendering other switches in two of the ports to be conductive, in such a sequence, and phase, so that one of the two ports presents to its associated electrical potential a counter emf of controlled waveshape and controlled amplitude to it's terminals, with the amplitude determining the direction and magnitude of the flow of power at the terminals, the rendering comprising:

first coupling, in a first port including a first switching circuit under first switching control, a.c. power, called IMPRESSED VOLTAGE, received from a source of power to a first winding of a transformer in which appears an a.c. waveform of relatively higher frequency than the a.c. power;

inductively coupling the a.c. waveform in the first winding of the transformer to additional second and subsequent windings of the transformer;

second coupling, in a second port including a second switching circuit under second switching control, the inductively coupled a.c. waveform appearing in a second winding of the transformer to a voltage, called OUTPUT VOLTAGE, that is delivered into a load;

third coupling, in a third port including a third switching circuit under third switching control, the inductively coupled a.c. waveform appearing in a third winding of the transformer to a direct current electrical potential, called D.C. VOLTAGE, that becomes fixed by operation of the power converter circuit;

fourth coupling, in a fourth port including a fourth switching circuit under forth switching control, the inductively coupled a.c. waveform appearing in a fourth winding of the transformer to an electrical potential appearing across a capacitor, called an ENERGY CAPACITOR;

first generating an a.c. carrier waveform of relatively higher frequency than the IMPRESSED VOLTAGE;

second generating a fixed d.c. reference voltage;

first developing, in a first control circuit responsive to the a.c. carrier waveform, the first switching control;

second developing, in a second control circuit proportionately to a difference between the D.C. VOLTAGE and the fixed d.c. reference voltage, the fourth switching control; and third developing, in a third control circuit proportionately to a difference between the electrical potential across the ENERGY CAPACITOR and the fixed d.c. reference voltage, the first switching control so that, when this third-developed first switching control is used to control switching in the first port's first switching circuit, the emf presented to the source of electrical power will be of equivalent waveform to the IMPRESSED VOLTAGE, whatsoever its shape and distortion.

21. The method of converting electrical power according to claim 20 further for producing the OUTPUT VOLTAGE to be substantially invariant with impedance changes in the load, the method further comprising:

third generating an a.c. reference voltage;

fourth developing, in a fourth control circuit proportionately to a difference between (i) the OUTPUT VOLTAGE at whatsoever load it is delivered into and (ii) the a.c. reference voltage, the second switching control so that, when this fourth-developed second switching control is used to control switching in the second port's second switching circuit, a waveform of the OUTPUT VOLTAGE will be substantially identically proportional to the waveform of the second reference voltage despite any changes in the impedance of the load.

22. The method of converting electrical power according to claim 21 expanded for producing the OUTPUT VOLTAGE to be of variably controllable amplitude, the improvement further comprising:

varying the magnitude of the third-generated a.c. reference voltage in order to vary the fourth-developed second switching control, and the amplitude of the waveform of the OUTPUT VOLTAGE that is coupled in the second switching circuit responsively thereto.

* * * * *